US012780719B2

(12) United States Patent
Shiota et al.

(10) Patent No.: US 12,780,719 B2
(45) **Date of Patent: *Nov. 3, 2026**

(54) NEAR-INFRARED ABSORBING GLASS AND NEAR-INFRARED CUT FILTER

(71) Applicant: HOYA CORPORATION, Tokyo (JP)

(72) Inventors: Yuki Shiota, Tokyo (JP); Masashi Kaneko, Tokyo (JP); Koichi Sato, Tokyo (JP)

(73) Assignee: HOYA CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 19/249,756

(22) Filed: Jun. 25, 2025

(65) Prior Publication Data

US 2025/0320151 A1 Oct. 16, 2025

Related U.S. Application Data

(63) Continuation of application No. 18/013,977, filed as application No. PCT/JP2021/020579 on May 31, 2021.

(30) Foreign Application Priority Data

Jul. 10, 2020 (JP) ................................ 2020-119553

(51) Int. Cl.
*C03C 3/16* (2006.01)
*C03C 4/08* (2006.01)
*G02B 5/20* (2006.01)
*G02B 5/22* (2006.01)

(52) U.S. Cl.
CPC ................ *C03C 3/16* (2013.01); *C03C 4/082* (2013.01); *G02B 5/208* (2013.01); *G02B 5/22* (2013.01)

(58) Field of Classification Search
CPC ........... C03C 3/16; C03C 4/082; G02B 5/208; G02B 5/22
See application file for complete search history.

(56) References Cited

U.S. PATENT DOCUMENTS

| | | | |
|---|---|---|---|
| 4,217,382 A | 8/1980 | Toratani | |
| 4,229,220 A | 10/1980 | Hirota | |
| 2013/0135714 A1 | 5/2013 | Kondo et al. | |
| 2013/0344343 A1 | 12/2013 | Schreder et al. | |
| 2014/0154292 A1 | 6/2014 | Borrelli et al. | |
| 2018/0037492 A1 | 2/2018 | Sakagami et al. | |
| 2024/0116802 A1* | 4/2024 | Sato | G02B 5/22 |

FOREIGN PATENT DOCUMENTS

| | | | | |
|---|---|---|---|---|
| CN | 107561613 A | | 1/2018 | |
| CN | 110156321 A | * | 8/2019 | G02B 5/208 |
| CN | 110255886 A | | 9/2019 | |
| CN | 110255897 A | | 9/2019 | |
| JP | 54-038311 A | | 3/1979 | |
| JP | 55-003336 A | | 1/1980 | |
| JP | 57-149845 A | | 9/1982 | |
| JP | 2004-083290 A | | 3/2004 | |
| JP | 2004-137100 A | | 5/2004 | |
| JP | 2014-012630 A | | 1/2014 | |
| JP | 5862566 B2 | | 2/2016 | |
| JP | 2016-506350 A | | 3/2016 | |
| WO | 2011/046155 A1 | | 4/2011 | |
| WO | 2012/018026 A1 | | 2/2012 | |
| WO | 2014/085379 A1 | | 6/2014 | |
| WO | 2016/171255 A1 | | 10/2016 | |
| WO | WO-2019189039 A1 | * | 10/2019 | G02B 5/28 |

OTHER PUBLICATIONS

English text CN-110156321-A (Year: 2019).*
English text WO-2019189039-A1 (Year: 2019).*
CN 104788019 A (Year: 2015).*
Office Action issued in TW Patent Application No. 110119635, Nov. 5, 2025, translation.
Office Action issued in U.S. Appl. No. 18/013,977, dated Jul. 31, 2025.
ISR issued in WIPO Patent Application No. PCT/JP2021/020579, Aug. 10, 2021, translation.
IPRP issued in WIPO Patent Application No. PCT/JP2021/020579, Jan. 10, 2023, translation.
Office Action issued in Chinese Patent Application No. 202180049196.1, Mar. 27, 2024, translation.
Office Action issued in Korean Patent Application No. 10-2023-7000639, Apr. 9, 2024, translation.
Office Action issued in TW Patent Application No. 110119635, Feb. 5, 2025, translation.
Office Action issued in KR Patent Application No. 10-2025-7008232, Feb. 20, 2026, translation.
Office Action issued in Japanese Divisional Patent Application No. 2024-224633, dated Mar. 31, 2026, translation.

* cited by examiner

*Primary Examiner* — Melvin C. Mayes
(74) *Attorney, Agent, or Firm* — GREENBLUM & BERNSTEIN, P.L.C.

(57) ABSTRACT

Near-infrared absorbing glass contains at least four kinds of main cations selected from P, Li, Cu, Al, Ba, Sr, Ca, Mg, Zn, K, Na, La, Gd, and Y, contains P, Li, and Cu, and contains at least O as anions, wherein a ratio (O ion/P ion) is 3.15 or less; in a glass composition indicated by anion %, a content of O ions is 90.0 anion % or more; and in an oxide-based glass composition on a molar basis, a total content of oxides of the main cations is 90.0% or more, a total content ($MgO+Al_2O_3$) is 8.0% or less, a ratio (($Na_2O+K_2O+ZnO$)/$Li_2O$) is 2.4 or less, a total content ($B_2O_3+SiO_2$) is 3.0% or less, and a content of CuO is $\alpha_1$% or more, where $\alpha_1$ is calculated by Equation 1 below, and in Equation 1, R is the ratio (O ion/P ion).

$$\alpha_1 = 70400 \times \exp(-2.855 \times R) \quad \text{(Equation 1)}$$

16 Claims, 1 Drawing Sheet

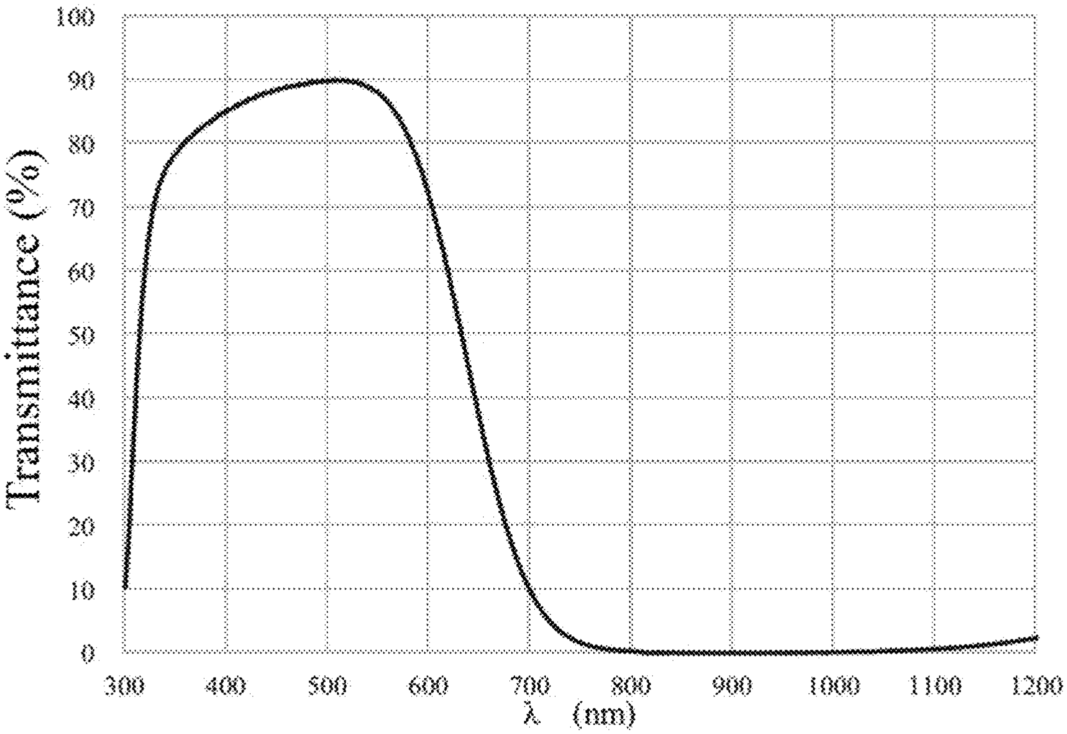
Transmittance (%)
100
90
80
70
60
50
40
30
20
10
0
300
400
500
600
700
800
900
1000
1100
1200
λ (nm)

NEAR-INFRARED ABSORBING GLASS AND NEAR-INFRARED CUT FILTER

This application is a Continuation Application of U.S. patent application Ser. No. 18/013,977, filed Dec. 30, 2022, which is a National Stage Entry of PCT/JP2021/020579, filed May 31, 2021, and which claims the benefit of Japanese Patent Application No. 2020-119553, filed Jul. 10, 2020. The contents of each of the above-identified applications are incorporated herein by reference in their entirety.

TECHNICAL FIELD

The present invention relates to a near-infrared absorbing glass and a near-infrared cut filter.

BACKGROUND ART

In recent years, image data obtained from compact cameras such as smartphones is not only digitized, but images are reconfigured by subjecting such image data to a variety of computational processes. For example, it is now common practice to extract a specific object and adjust the color and contrast of an image. During this process, if color data that was not originally present is inputted into an image element as a result of reflection of light in an optical element, this data must be removed, which is not desirable.

Near-infrared cut filters have the function of cutting out unnecessary near-infrared light (which has a wavelength of 700 to 1200 nm) in the sensitive wavelength region of an image element. A near-infrared cut filter is generally provided immediately in front of an image element.

Filters which comprise a near-infrared absorbing glass as a base material and which are polished on a flat plate are widely used as near-infrared cut filters.

Near-infrared absorbing glasses generally contain Cu ions. FIG. 1 shows an example of spectral transmission properties of a near-infrared absorbing glass. However, FIG. 1 in no way limits the present invention. Light absorption characteristics at wavelengths in the vicinity of 700 to 1200 nm are exhibited by Cu ions ($Cu^{2+}$) in the glass. A glass that contains both Cu ions and P ions can exhibit near-infrared absorption characteristics, which are inherent in Cu ions ($Cu^{2+}$), across a broad wavelength range, and is therefore useful as a glass for a near-infrared cut filter (for example, see PTL 1).

CITATION LIST

Patent Literature

[PTL 1] Japanese Patent Application Publication No. 2014-12630

Beyond a wavelength of 600 nm in the transmittance curve in FIG. 1, the wavelength at which the transmittance becomes 50% is known as the "half value", and is a primary standard for the near-infrared cut filter. The half value varies according to filter specifications, but is often set to fall within the wavelength range of 600 nm to 650 nm. Ordinary methods for setting the half value to be a prescribed value include adjusting the thickness of a glass base material or the concentration of Cu ions ($Cu^{2+}$) in a glass, in accordance with the Beer-Lambert law.

SUMMARY OF INVENTION

Technical Problem

It is required for near-infrared cut filters to exhibit excellent capacity for cutting near-infrared rays (that is, need to have low transmittance of near-infrared light while having a prescribed half value), and is also required to exhibit high transmittance of light in the visible region (the violet region to the red region).

In recent years, image element modules fitted to smartphones and the like have needed to be smaller in size and higher in performance, and the thickness of near-infrared cut filters has needed to be reduced. As a result, the thickness of near-infrared absorbing glasses has been reduced from 1 mm in the past to 0.45 mm, 0.3 mm or 0.2 mm in recent years, and there have been demands for further reductions in thickness to the 0.1 mm level.

Simply reducing the thickness of a near-infrared absorbing glass leads to a reduction in the optical density of CuO (number of moles×thickness), which is required for near-infrared absorption, and this causes a reduction in the efficiency of absorption of near-infrared rays. Increasing the amount of CuO has been considered as a means for solving the above situation. However, simply increasing the amount of CuO means that CuO absorbs visible light close to a wavelength of 600 nm (that is, the red region), and because transmittance on the short wavelength side also tends to decrease, it is difficult to maintain both transmittance of light in the visible region (the violet region to the red region) and absorption of near-infrared rays.

Furthermore, in order to provide a near-infrared cut filter suitable for use in high temperature high humidity environments, it is desirable to suppress a decrease in weathering resistance of a near-infrared absorbing glass in high temperature high humidity environments. According to investigations by the present inventors, however, it is not easy to suppress a decrease in weathering resistance while maintaining both transmittance of light in the visible region (the violet region to the red region) and absorption of near-infrared rays.

With these circumstances in mind, the object of one aspect of the present invention is to provide a near-infrared absorbing glass which exhibits excellent transmittance of light in the visible region (the violet region to the red region) and near-infrared cutting performance even if the thickness of the glass is reduced and which can suppress a decrease in weathering resistance, and also to provide a near-infrared cut filter comprised of this near-infrared absorbing glass.

Solution to Problem

One aspect of the present invention relates to:

a near-infrared absorbing glass (hereinafter also referred to as "Glass 1") which contains at least four kinds of main cations selected from the group consisting of P ions, Li ions, Cu ions, Al ions, Ba ions, Sr ions, Ca ions, Mg ions, Zn ions, K ions, Na ions, La ions, Gd ions, and Y ions, contains P ions, Li ions, and Cu ions as essential cations, and contains at least O ions as anions, wherein:

the ratio of the content of O ions relative to the content of P ions (O ion/P ion) is 3.15 or less;

in a glass composition indicated by anion %, the content of O ions is 90.0 anion % or more; and in an oxide-based glass composition on a molar basis, the total content of oxides of the main cations is 90.0% or more, the total content of MgO and $Al_2O_3$ ($MgO+Al_2O_3$) is 8.0% or less, the ratio of the total content of $Na_2O$, $K_2O$, and ZnO relative to the content of $Li_2O$ (($Na_2O+K_2O+ZnO$)/$Li_2O$) is 2.4 or less, the total content of $B_2O_3$ and $SiO_2$ ($B_2O_3$+$SiO_2$) is 3.0% or less, and the content of CuO is $\alpha_1$% or more, where $\alpha_1$ is a value calculated by Equation 1 below, $$\alpha_1 = 70400 \times \exp(-2.855 \times R) \quad \text{(Equation 1)}$$

and in Equation 1 above,

R is the ratio (O ion/P ion).

Another aspect of the present invention relates to:

a near-infrared absorbing glass (hereinafter also referred to as "Glass 2") which contains at least four kinds of main cations selected from the group consisting of P ions, Li ions, Cu ions, Al ions, Ba ions, Sr ions, Ca ions, Mg ions, Zn ions, K ions, Na ions, La ions, Gd ions, and Y ions, contains P ions, Li ions, and Cu ions as essential cations, and contains at least O ions as anions, wherein:

the ratio of the content of O ions relative to the content of P ions (O ion/P ion) is 3.15 or less;

in a glass composition indicated by anion %, the content of O ions is 90.0 anion % or more; and in an oxide-based glass composition on a molar basis, the total content of oxides of the main cations is 90.0% or more, the total content of MgO and $Al_2O_3$ (MgO+$Al_2O_3$) is 8.0% or less, the ratio of the total content of $Na_2O$, $K_2O$, and ZnO relative to the content of $Li_2O$ (($Na_2O$+$K_2O$+ZnO)/$Li_2O$) is 2.4 or less, the total content of $B_2O_3$ and $SiO_2$ ($B_2O_3$+$SiO_2$) is 3.0% or less, and which satisfies Equation 2 below:

$$C - 3200 \times \exp(-2.278 \times R) \geq 0 \quad \text{(Equation 2)}$$

and in Equation 2 above,

C is the content of CuO (units: mmol/cc) per molar volume of the glass, and

R is the ratio (O ion/P ion).

Another aspect of the present invention relates to:

a near-infrared absorbing glass (hereinafter also referred to as "Glass 3") which contains at least four kinds of main cations selected from the group consisting of P ions, Li ions, Cu ions, Al ions, Ba ions, Sr ions, Ca ions, Mg ions, Zn ions, K ions, Na ions, La ions, Gd ions, Y ions, B ions and Si ions, contains P ions, Li ions, and Cu ions as essential cations, and contains at least O ions as anions, wherein:

the ratio of the content of O ions relative to the content of P ions (O ion/P ion) is 3.15 or less;

in a glass composition indicated by anion %, the content of O ions is 90.0 anion % or more; and in an oxide-based glass composition on a molar basis, the total content of oxides of the main cations is 90.0% or more, the total content of MgO and $Al_2O_3$ (MgO+$Al_2O_3$) is 8.0% or less, the ratio of the total content of $Na_2O$, $K_2O$, and ZnO relative to the content of $Li_2O$ (($Na_2O$+$K_2O$+ZnO)/$Li_2O$) is 2.4 or less, $A_1$, which is calculated by Equation 3 below, is 2500 or more, $$A_1 = \{O(P) - O(\text{others})\} \times Cu \quad \text{(Equation 3)}$$

and in Equation 3 above,

O(P) denotes the amount of oxygen that constitutes the oxide of P ions in the oxide-based glass composition, O(others) denotes the amount of oxygen determined by subtracting the value of O(P) from the amount of oxygen that constitutes the oxides of the main cations in the oxide-based glass composition, and Cu denotes the content of CuO on a molar basis in the oxide-based glass composition.

Another aspect of the present invention relates to:

a near-infrared absorbing glass (hereinafter also referred to as "Glass 4") which contains at least four kinds of main cations selected from the group consisting of P ions, Li ions, Cu ions, Al ions, Ba ions, Sr ions, Ca ions, Mg ions, Zn ions, K ions, Na ions, La ions, Gd ions, Y ions, B ions and Si ions, contains P ions, Li ions, and Cu ions as essential cations, and contains at least O ions as anions, wherein:

the ratio of the content of O ions relative to the content of P ions (O ion/P ion) is 3.15 or less;

in a glass composition indicated by anion %, the content of O ions is 90.0 anion % or more; and in an oxide-based glass composition on a molar basis, the total content of oxides of the main cations is 90.0% or more, the total content of MgO and $Al_2O_3$ (MgO+$Al_2O_3$) is 8.0% or less, the ratio of the total content of $Na_2O$, $K_2O$, and ZnO relative to the content of $Li_2O$ (($Na_2O$+$K_2O$+ZnO)/$Li_2O$) is 2.4 or less, $A_2$, which is calculated by Equation 4 below, is 700 or more, $$A_2 = \{O(P) - O(\text{others})\} \times C \quad \text{(Equation 4)}$$

and in Equation 4 above,

C is the content of CuO (units: mmol/cc) per molar volume of the glass,

O(P) denotes the amount of oxygen that constitutes the oxide of P ions in the oxide-based glass composition, and O(others) denotes the amount of oxygen determined by subtracting the value of O(P) from the amount of oxygen that constitutes the oxides of the main cations in the oxide-based glass composition.

One aspect of the present invention relates to:

a near-infrared absorbing glass (hereinafter also referred to as "Glass 5") which contains at least four kinds of main cations selected from the group consisting of P ions, Li ions, Cu ions, Al ions, Ba ions, Sr ions, Ca ions, Mg ions, Zn ions, K ions, Na ions, La ions, Gd ions, and Y ions, contains P ions, Li ions, and Cu ions as essential cations, and contains at least O ions as anions, wherein:

the ratio of the content of O ions relative to the content of P ions (O ion/P ion) is 3.15 or less;

in a glass composition indicated by anion %, the content of O ions is 90.0 anion % or more; and in an oxide-based glass composition on a molar basis, the total content of oxides of the main cations is 90.0% or more, the total content of MgO and $Al_2O_3$ ($MgO+Al_2O_3$) is 8.0% or less, the ratio of the total content of $Na_2O$, $K_2O$, and ZnO relative to the content of $Li_2O$ ($(Na_2O+K_2O+ZnO)/Li_2O$) is 2.4 or less, the content of CuO is $\alpha_2$% or more, where $\alpha_2$ is a value calculated by Equation 5 below $$\alpha_2 = (76522) \times \exp(-2.855 \times R) \quad \text{(Equation 5)}$$

and in Equation 5 above,

R is the ratio (O ion/P ion).

Another aspect of the present invention relates to:

a near-infrared absorbing glass (hereinafter also referred to as "Glass 6") which contains at least four kinds of main cations selected from the group consisting of P ions, Li ions, Cu ions, Al ions, Ba ions, Sr ions, Ca ions, Mg ions, Zn ions, K ions, Na ions, La ions, Gd ions, and Y ions, contains P ions, Li ions, and Cu ions as essential cations, and contains at least O ions as anions, wherein the ratio of the content of O ions relative to the content of P ions (O ion/P ion) is 3.15 or less;

in a glass composition indicated by anion %, the content of O ions is 90.0 anion % or more; and in an oxide-based glass composition on a molar basis, the total content of oxides of the main cations is 90.0% or more, the total content of MgO and $Al_2O_3$ ($MgO+Al_2O_3$) is 8.0% or less, the ratio of the total content of $Na_2O$, $K_2O$, and ZnO relative to the content of $Li_2O$ ($(Na_2O+K_2O+ZnO)/Li_2O$) is 2.4 or less, and which satisfies Equation 6 below:

$$C - (3478) \times \exp(-2.278 \times R) \geq 0 \quad \text{(Equation 6)}$$

and in Equation 6 above,

C is the content of CuO (units: mmol/cc) per molar volume of the glass, and

R is the ratio (O ion/P ion).

Effects of Invention

According to one aspect of the present invention, it is possible to provide a near-infrared absorbing glass which exhibits excellent transmittance of light in the visible region (the violet region to the red region) and near-infrared cutting performance even if the thickness of the glass is reduced and which can suppress a decrease in weathering resistance. According to a further aspect of the present invention, it is possible to provide a near-infrared cut filter comprised of the above near-infrared absorbing glass.

BRIEF DESCRIPTION OF DRAWINGS

FIG. 1 shows an example of spectral transmission properties of a near-infrared absorbing glass.

DESCRIPTION OF EMBODIMENTS

[Near-Infrared Absorbing Glass]

Hereinafter, Glasses 1 to 6 are also collectively referred to simply as "glass" or "near-infrared absorbing glass". Unless explicitly stated otherwise, statements relating to the composition and physical properties of glasses apply to all of Glasses 1 to 6.

In the present invention and the present description, the term "near-infrared absorbing glass" means a glass having the property of absorbing at least light in all or part of the near-infrared wavelength region (wavelengths of 700 to 1200 nm). In addition, the near-infrared absorbing glass according to one aspect of the present invention can be an oxide glass because the glass contains O ions as constituent ions. An oxide glass is a glass in which the main network-forming components of the glass are oxides. Furthermore, the near-infrared absorbing glass according to one aspect of the present invention can be a phosphate glass because the glass contains O ions (anions) and P ions (cations) as constituent ions. O ions are anions of oxygen atoms, and are commonly referred to as oxide ions.

Detailed explanations will now be given for Glasses 1 to 6.

<Glass Composition>

(Analysis Methods)

For components that constitute a glass, the content values of elements (mass percentages of elements) contained in the glass can be quantified using well-known methods, for example inductively coupled plasma-atomic emission spectrometry (ICP-AES) or inductively coupled plasma-mass spectrometry (ICP-MS).

Anion components contained in a glass can be identified and quantified using well-known analysis methods, for example ion chromatography methods or non-dispersive infrared absorption methods (ND-IR).

In the present invention and the present description, a case where a constituent component has a content of 0% or is not contained or introduced means that this constituent component is substantially not contained and that this constituent component may be contained at an unavoidable impurity level.

(Representation of Oxide-Based Glass Composition)

Based on results obtained using the analyses mentioned above, it is possible to calculate content values (units: mol %) of components in the oxide-based glass composition. Specific methods are as follows.

By dividing the content of an element i (the mass percentage $P_i$ of the element), which is obtained using an analysis method mentioned above, by the atomic weight $M_i$ of the element, the number of moles $n_i$ ($=P_i/M_i$) of the element is determined.

In a case where the above element i is a cation component $A_i$, the thus obtained number of moles $n_i$ of the element is replaced by the number of moles $n'_i$ of the corresponding oxide. Specifically, if the compositional formula of the oxide of the cation component $A_i$ corresponding to the element i is represented by $A_i$xOy, then $n'i=n_i/x$.

In a case where the above element i is an anion component $B_i$ other than an O ion, the number of moles $n_i$ of the corresponding element is denoted by $m_i$ hereinafter.

The content $PA_i$ (mol %) of the oxide $A_i$xOy of the cation component $A_i$ in the oxide-based glass composition is represented by:

$$PA_i = n'_i(\sum n'_i + \sum m_i) \times 100$$

Content values in the oxide-based glass composition can also be referred to as oxide-based proportions.

In the oxide-based glass composition, the oxide-based proportion $PB_i$ (mol %) of an anion component $B_i$ other than an O ion is represented by:

$$PB_i = m_i / (\sum n'_i + \sum m_i) \times 100$$

Here, $\Sigma n'_i$ is the total number of moles of oxides $A_i$xOy of cation components contained in the glass. However, depending on the number of significant FIGURES in content values, ignoring trace components does not affect calculation results.

(Anion %)

"Anion %" is a value calculated as "(content, indicated by mol %, of anion i in question)/(total number, indicated by mol %, of anions contained in glass)×100", and refers to the molar ratio of the amount of the anion in question relative to the total amount of anions.

Based on the explanation above of the representation of the oxide-based glass composition, the anion % of O ions can be calculated as $$(\sum O_i - \sum (N_k/2)B_k) / (\sum O_i - \sum (N_k/2)B_k + \sum B_k) \times 100$$

where the compositional formula of an oxide of component $A_i$ that corresponds to the element i is represented by $A_i$xOy, the number of O contained in an oxide of a cation component $A_i$ is denoted by $O_i$=P$A_i$xy using the oxide-based proportion PA (mol %) of the cation component $A_i$, and the valency of an anion component $B_k$ is denoted by $N_k$, Here, $\Sigma O_i$ is the total number of moles of O ions in the oxide-based glass composition, and $\Sigma(N_k/2)B_k$ denotes the number of moles of O ions replaced by the anion component $B_k$. The numerator of the formula, $(\Sigma_i - \Sigma(N_k/2)B_k)$, is the number of moles of O ions contained in the glass.

Meanwhile, with regard to the content of oxygen in the present invention and the present description, if anion components other than oxygen are not detected by analysis using well-known methods, all anion components (that is, 100 anion %) are taken to be O ions.

(Cation Component)

The nominal valency of each cation is used as the valency of the cation component. The nominal valency of the cation in question is the valency required in order for the oxide of the cation to be electrically neutral when the valency of the O ion that constitutes the oxide is taken to be −2, and the nominal valency can be definitively determined from the chemical formula of the oxide.

For example, in the case of a Cu ion, the valency of Cu is +2 in order for $O^{2-}$ and Cu contained in the chemical formula of the oxide CuO to be electrically neutral. For example, in the case of a P ion, the valency of P is +2×5/2=+5 in order for $O^{2-}$ and P contained in the chemical formula of the oxide $P_2O_5$ to be electrically neutral. If this is generalized, the nominal valency of the cation $A_i$ contained in the oxide $A_i$xOy is "+2y/x". Therefore, when the glass composition is analyzed, the valency of cations need not be analyzed.

In addition, the valency of an anion (for example, the valency of an O ion is −2) is the nominal valency based on the understanding that an O ion receives 2 electrons to attain a closed shell structure. Therefore, when the glass composition is analyzed, the valency of anions need not be analyzed. In addition, some $Cu^{2+}$ may become Cut upon melting, but because the amount thereof is generally small, the valency of all the Cu can be taken to be +2.

(Anion Component)

The above glass contains at least O ions as anions, and the content thereof is 90.0 anion % or more in the glass composition indicated by anion %. The present inventors considered that if the O/P ratio is lowered in a glass containing mainly O ions as anions as described above, absorption by CuO in the red region can be shifted to the long wavelength side, and it is therefore possible to increase the content of CuO and improve near-infrared cutting performance without lowering the transmittance of light in the red region. The content of O ions in the glass composition, if expressed in terms of anion %, is 90.0% or more, preferably 95.0% or more, more preferably 98.0% or more, and further preferably 99.0% or more. A high proportion of O ions in the anion component is also preferable from the perspective of suppressing volatilization when the glass melts. Suppressing volatilization when the glass melts is preferable from the perspective of suppressing the occurrence of striation. It is particularly preferable for the content of O ions to be 100% from the perspectives of suppressing volatilization when the glass melts, increasing productivity and suppressing the generation of harmful gases during production. The nominal valency of an O ion is −2.

The above glass can contain only O ions as anions in one embodiment, and can contain O ions and one or more other types of anion in another embodiment. Examples of other anions include F ions, CI ions, Br ions and I ions. The nominal valency of F ions, Cl ions, Br ions and I ions is −1.

From the perspectives of improving the uniformity and strength of the glass, the content of F ions in the glass composition, if expressed in terms of anion %, is preferably 15.0 anion % or less, more preferably 10.0 anion % or less, further preferably 5.0 anion % or less, yet more preferably 2.0 anion % or less, and further preferably 1.0 anion % or less. It is particularly preferable for the glass to contain no F ions from the perspectives of suppressing volatilization when the glass melts, increasing productivity and suppressing the generation of harmful gases during production.

(O/P Ratio)

The molar ratio of the content of cations and the content of anions is the ratio of the content (expressed in mol %) of components in question, where the total amount of all cation components and all anion components is taken to be 100 mol %. Therefore, the ratio of the content of O ions relative to the content of P ions (O ions/P ions) is the ratio of the content of O ions (expressed in mol %) relative to the content of P ions (expressed in mol %), where the total amount of all cation components and all anion components is taken to be 100 mol %.

O/P Ratio Calculation Method 1

With regard to the O/P ratio (also denoted by R), the O/P ratio based on the explanation above of the representation of oxide-based glass composition can be determined from:

$$\sum O_i - \sum (N_k/2)B_k \quad \text{Equation D1}$$

R2=proportion (mol %) based on oxide of P ions (that is, $P_2O_5$)×2 Equation D2:

where the compositional formula of an oxide of component $A_i$ that corresponds to the element i is represented by $A_i$xOy, the number of O contained in an oxide of a cation component $A_i$ is denoted by $O_i$=P$A_i$×y using the oxide-based proportion PAi (mol %) of the cation component $A_i$, and the valency of an anion component $B_k$ is denoted by $N_k$, and the O/P ratio (R) can be determined from:

$$R = R1/R2 \qquad \text{Equation D3}$$

For example, in an explanation using Comparative Example A below as an example, content values, if expressed in mol %, in the oxide-based glass composition of Comparative Example A are $P_2O_5$=53.59, $Li_2O$=19.30 and CuO=27.11. The number of O in these molecular formulae are 5 in $P_2O_5$, 1 in $Li_2O$ and 1 in CuO. The number of moles of O in these molecular formulae are 267.95 in $P_2O_5$, 19.30 in $Li_2O$ and 27.11 in CuO.

The O/P ratio in the glass in this example can be determined in the following way.

The number $N_S$ of O ions is determined in the molecular formula of the glass: 53.59$P_2O_5$-19.30$Li_2O$-27.11CuO. The molecular formula of the glass is the compositional formula of the glass expressed in such a way that the total amount of molecules contained in the glass is 100.

That is, using the numbers of O ions contained in the molecular formula MxOy of the oxides (5 in $P_2O_5$, 1 in $Li_2O$, and 1 in CuO), the value of $N_S$ is calculated as:

$$N_S = 53.59 \times 5 + 19.30 \times 1 + 27.11 \times 2 = 314.36$$

In the glass in the example mentioned above, because the amount of O ions replaced by other anions in the molecular formula of the glass is 0, by dividing this $N_S$ value (314.36) by the number of moles of P contained in $P_2O_5$ (53.59)×2, the O/P ratio can be determined as 314.36/(53.59×2)=2.93 . . . .

O/P Ratio Calculation Method 2

In a case where one or more types of anion component other than oxygen are detected in analysis using a well-known method, the content of oxygen can be the content (units: anion %) calculated using a method shown in section (3) below from (1) the content of cations based on the valency of cation components contained in the glass and the molar percentages of elements, and (2) the content of anions based on the valency of anion components other than oxygen and the molar percentages of elements.

That is, based on results of identification and quantification analysis using a well-known method, (1) the total U of "the content of cations based on the number of oxygens per cation (y/x)×molar percentages of elements, where the number of oxygens is denoted by y and the number of cations is denoted by x in an oxide MxOy" is calculated for cation components contained in the glass, (2) the total V of "content of anions based on molar percentages of elements x number of substituted oxygens (z/2) per anion" is calculated for anion components other than oxygen based on results of identification and quantification analysis using well-known methods and the valency z of anions, and (3) the value of U-V can also be used as the content of O ions relative to the content of the P ions.

Calculation example 1 and calculation example 2 below are given as examples of calculation method 2.

Calculation example 1: when the molar percentages of elements of P ions, Li ions and Cu ions were quantitatively determined as 22.0, 8.0 and 5.5 (content values expressed as molar percentages of elements), the values of y/x in the corresponding oxides ($P_2O_5$, $Li_2O$ and CuO) are 2.5, 0.5 and 1.0 respectively, the value of U is 22×2.5+8×0.5+5.5×1.0=64.5, and the value of V is 0.

Therefore, the molar percentage of O ions based on the molar percentages of these elements is 64.5 (content expressed as molar percentage of element).

From the ratio of the value for O ions determined in this way and the analyzed molar percentage of P ions, the O/P ratio can be determined as 64.5/22=2.93 . . . .

Calculation example 2: when the molar percentages of elements of P ions, Li ions and Cu ions were quantitatively determined as 22.0, 8.0 and 5.5 (content values expressed as molar percentages of elements) and the molar percentage of the element in F ions was quantitatively determined as 4.0 (a content value expressed as the molar percentage of the element), the values of y/x in the corresponding oxides ($P_2O_5$, $Li_2O$ and CuO) are 2.5, 0.5 and 1.0 respectively, and because the valency of F is −1, the value of U is 22×2.5+8×0.5+5.5×1.0=64.5, and the value of V is 4×1/2=2.

Therefore, the molar percentage of O ions based on the molar percentages of these elements is 62.5 (content expressed as molar percentage of element).

From the ratio of the value for O ions determined in this way and the analyzed molar percentage of P ions, the O/P ratio can be determined as 62.5/22=2.84 . . . . In Glasses 1 to 6, the ratio (O/P ratio) of the content of O ions relative to the content of P ions is 3.15 or less from the perspective of achieving both improved transmittance of light in the visible region and improved near-infrared cutting performance and also from the perspective of improving the thermal stability of the glass.

In Glasses 1 to 6, the O/P ratio is preferably 3.14 or less, and is more preferably 3.13 or less, 3.12 or less, 3.11 or less, 3.10 or less, 3.09 or less, 3.08 or less, 3.07 or less, 3.06 or less, 3.05 or less, 3.04 or less, 3.03 or less, 3.02 or less, 3.01 or less, or 3.00 or less in that order.

On the other hand, the O/P ratio in Glasses 1 to 6 is preferably high from the perspectives of improving weathering resistance and/or suppressing a decrease in meltability. From this perspective, the O/P ratio in Glasses 1 to 6 is preferably 2.50 or more, and is more preferably 2.60 or more, 2.65 or more, 2.70 or more, 2.73 or more, 2.75 or more, 2.77 or more, 2.80 or more, 2.81 or more, 2.82 or more, 2.83 or more, 2.84 or more, 2.85 or more, 2.86 or more, 2.87 or more, 2.88 or more, 2.89 or more, or 2.90 or more in that order.

(Cation Component)

Glasses 1 to 6 contain at least four kinds of main cations selected from the group consisting of P ions, Li ions, Cu ions, Al ions, Ba ions, Sr ions, Ca ions, Mg ions, Zn ions, K ions, Na ions, La ions, Gd ions, and Y ions, and contain P ions, Li ions and Cu ions as essential cations. In the oxide-based glass composition (on a molar basis) of Glasses 1 to 6, the total content of oxides of the main cations is 90.0 mol % or more.

In Glasses 1 to 6, the total content of oxides of the main cations being 90.0% or more can contribute to an improvement in thermal stability of the glasses and/or an improvement in the optical uniformity of the glass by suppressing striation, volatilization, and the like. From the above perspective, the total content of oxides of the main cations in Glasses 1 to 6 is preferably 92.0% or more, is more preferably 93.0% or more, 95.1% or more, 96.1% or more, 97.1% or more, 98.1% or more, 98.6% or more, 99.1% or more, or 99.6% or more in that order, and can be 100%. In one embodiment, the total content of oxides of the main cations in Glasses 1 to 6 can be 100% or less, 99.5% or less, 99% or less, 98.5% or less, 98.0% or less, or 97.5% or less.

An explanation will now be given of the content of a cation component as the content (on a molar basis) in the oxide-based glass composition.

Because CuO is an essential component for imparting near-infrared cutting performance to the glass, Glasses 1 to 6 contain Cu ions as essential cations.

In Glass 1, the content of CuO is $\alpha_1$% or more. $\alpha_1$ can be calculated from Equation 1 below.

$$\alpha_1 = 70400 \times \exp(-2.855 \times R) \quad \text{(Equation 1)}$$

In Equation 1, R is the O/P ratio.

In Glass 2, the lower limit for the content of CuO is defined by Equation 2 below from the content of CuO per molar volume of the glass.

$$C - 3200 \times \exp(-2.278 \times R) \geq 0 \quad \text{(Equation 2)}$$

In Equation 2, C is the content of CuO (units: mmol/cc) per molar volume of the glass, and R is the O/P ratio.

In Equation 2, the value of C is determined using the following method.

C can be calculated as:

$$\text{C} = \text{mol \% of CuO}/(M/D) \times 1000(\text{units: } mmol/cc)$$

by measuring the specific gravity D (g/cc) of the glass, determining the mass per mole of the glass composition, that is, the molar molecular weight M (g/mol), on the basis of the glass composition obtained through analysis in the manner described above, and determining the molar volume M/D (units: cc/mol) of the glass.

The molar molecular weight M mentioned above can be calculated as $$M = \{\textstyle\sum(\text{P}A_i \times MA_i) + \sum(\text{PB}_k \times M\text{B}_k) - \sum(N_k/2)\text{Mo}\}/\sum \text{P}A_i$$

where the formula weight of an oxide corresponding to the cation component Ai mentioned above is denoted by $MA_i$, the atomic weight of the anion component $B_k$ is denoted by $MB_k$, and the atomic weight of oxygen is denoted by Mo, based on the explanation above of the representation of the oxide-based glass composition.

For example, if the glass composition is constituted from s mol % of a component $A_2O$ on an oxide basis, t mol % of a component BO on an oxide basis and u mol % of a component F, the value of s+t+u is 100(%), the formula weight of the component $A_2O$ is $M_A$ (g/mol), the formula weight of the component BO is $M_B$ (g/mol), the atomic weight of F is $M_F$ (g/mol), and the atomic weight of oxygen is $M_O$ (g/mol), then $$M = (s \times M_A + t \times M_B + u \times M_F - u/2 \times M_O)/(s+t)$$

For example, the molar molecular weight M of Comparative Example A below (in which content values expressed as molar percentages in the oxide-based glass composition are $P_2O_5$=53.59, $Li_2O$=19.30 and CuO=27.11) can be calculated as: M=(53.59×141.94+19.30×29.88+27.11×79.55)/(53.59+19.30+27.11)=103.40 (g/mol) using:

Formula weight of $P_2O_5$: 141.94 (g/mol)

Formula weight of $Li_2O$: 29.88 (g/mol)

Formula weight of CuO: 79.55 (g/mol)

As a result of extensive research by the present inventors, it was newly found that by lowering the O/P ratio in a glass containing mainly O ions as anions, absorption by CuO in the red region can be shifted to the long wavelength side, thereby suppressing a reduction in the transmittance of light in the red region and enabling the content of CuO to be increased. The present inventors also newly found that there is a strong correlation between the O/P ratio and the content of CuO, which is required in order to achieve a prescribed half value at a prescribed thickness, and the lower limit for the content of CuO ($\alpha_1$, $\alpha_2$) is specified by Equation 1 for Glass 1, in which the O/P ratio falls within the range mentioned above, and by Equation 5 for Glass 5. In addition, for Glass 2 in which the O/P ratio falls within the range mentioned above, the content of CuO per molar volume of the glass is specified by Equation 2, and for Glass 6, the content of CuO per molar volume of the glass is specified by Equation 6.

In Glass 3, the content of CuO is defined on the basis of A1, which is calculated from Equation 3 below, and the value of $A_1$ is 2500 or more.

$$A_1 = \{\text{O(P)} - \text{O(others)}\} \times \text{Cu} \quad \text{(Equation 3)}$$

In equation 3, O(P) denotes the amount of oxygen that constitutes the oxide of P ions in the oxide-based glass composition, O(others) denotes the amount of oxygen determined by subtracting the value of O(P) from the amount of oxygen that constitutes the oxides of the main cations already mentioned in Glass 3 in the oxide-based glass composition, and Cu denotes the content of CuO on a molar basis in the oxide-based glass composition.

In Equation 3, "O(P)" is calculated in the following way.

If the content (on a molar basis) of $P_2O_5$ in the oxide-based glass composition is denoted by M mol %, the value of O(P) is calculated as "O(P)=M×5" using the number of oxygens (5) included in the chemical formula $P_2O_5$.

Similarly, for main cations other than P ions, the amount of oxygen that constitutes the oxides of these cations is calculated using the content values of the oxides (on a molar basis) in the oxide-based glass composition and the number of oxygens contained in the oxides formed in a state where the cations have nominal valencies.

The value of "O(others)" is calculated as a value obtained by subtracting the value of O(P) from the total amount of oxygen calculated for the oxides of the main cations.

If the content of CuO (on a molar basis) in the oxide-based glass composition is denoted by N mol %, the value of "$A_1$" is calculated as $A_1=\{O(P)-O(others)\}\times N$.

As mentioned above, the present inventors newly found that by lowering the O/P ratio in a glass containing mainly O ions as anions, absorption by CuO in the red region can be shifted to the long wavelength side, thereby suppressing a reduction in the transmittance of light in the red region and enabling the content of CuO to be increased. It was also newly found that by using a chemical species which has a smaller ionic radius and a lower valency as a chemical species other than P—O that coordinates to CuO, it is possible to increase transmittance in the visible light region (the violet region to the red region) as a result of features 1) and 2) below. In view of these findings, the content of CuO in Glass 3 is defined on the basis of $A_1$, which is calculated from Equation 3.

1) By shifting absorption derived from $Cu^{2+}$ to the long wavelength side, it is possible to increase the transmittance of light in the red region.

2) By enabling the glass to be in a liquid phase state at a low temperature, it is possible to suppress the generation of $Cu^+$, which exhibits absorption of light in the violet region close to a wavelength of 400 nm.

For Glass 3, the value of $A_1$ is 2500 or more, is preferably 2800 or more, and is more preferably 2900 or more, 3000 or more, 3100 or more, 3200 or more, 3300 or more, 3400 or more, 3500 or more, 3600 or more, 3700 or more, 3800 or more, 3900 or more, 4000 or more, 4100 or more, 4200 or more, 4300 or more, 4400 or more, 4500 or more, 4600 or more, 4700 or more, 4800 or more, 4900 or more, 5000 or more, 5100 or more, 5200 or more, 5300 or more, 5400 or more, 5500 or more, 5600 or more, 5700 or more, 5800 or more, 5900 or more, 6000 or more, 6100 or more, 6200 or more, 6300 or more, 6400 or more, or 6500 or more in that order from the perspective of achieving both improved transmittance of light in the visible region and improved near-infrared cutting performance. On the other hand, from the perspectives of suppressing a decrease in the thermal stability of the glass due to a high content of Cu and O, suppressing a decrease in transmittance at a desired half value wavelength and/or suppressing a decrease in thermal stability or weathering resistance of the glass due to an excessively low O(others) value, the value of $A_1$ is preferably 20000 or less, and is more preferably 19000 or less, 18000 or less, 17000 or less, 16000 or less, 15000 or less, 14000 or less, 13000 or less, 12000 or less, 11000 or less, 10000 or less, 9000 or less, or 8000 or less. In order to achieve a desired half value at a lower thickness, it tends to be desirable for this numerical value to be high.

In Glass 4, the content of CuO is defined on the basis of $A_2$, which is calculated from Equation 4 below, and the value of $A_2$ is 700 or more.

$$A_2 = \{O(P) - O(others)\} \times C \quad \text{(Equation 4)}$$

In Equation 4, C is the content of CuO (units: mmol/cc) per molar volume of the glass. O(P) denotes the amount of oxygen that constitutes the oxide of P ions in the oxide-based glass composition, and O(others) denotes the amount of oxygen determined by subtracting the value of O(P) from the amount of oxygen that constitutes the oxides of the above main cations in the oxide-based glass composition.

For Glass 4, the value of $A_2$ is 700 or more, is preferably 800 or more, and is more preferably 850 or more, 890 or more, 1000 or more, 1100 or more, 1200 or more, 1300 or more, 1400 or more, 1500 or more, 1600 or more, 1700 or more, or 1800 or more in that order from the perspective of achieving both improved transmittance of light in the visible region and improved near-infrared cutting performance. On the other hand, from the perspectives of suppressing a decrease in the thermal stability of the glass due to a high content of Cu and O, suppressing a decrease in transmittance at a desired half value wavelength and/or suppressing a decrease in thermal stability or weathering resistance of the glass due to an excessively low O(others) value, the value of $A_2$ is preferably 5000 or less, and is more preferably 4000 or less, 3500 or less, 3000 or less, 2500 or less, or 2000 or less. In order to achieve a desired transmittance half value at a lower thickness, it tends to be desirable for this numerical value to be high.

In addition, in Glass 5, the content of CuO is $\alpha_2$% or more. $\alpha_2$ can be calculated from Equation 5 below.

$$\alpha_2 = 76522 \times \exp(-2.855 \times R) \quad \text{(Equation 5)}$$

In Equation 5, R is the O/P ratio.

In addition, in Glass 6, the lower limit for the content of CuO is defined by Equation 6 below from the content of CuO per molar volume of the glass.

$$C - 3478 \times \exp(-2.278 \times R) \geq 0 \quad \text{(Equation 6)}$$

In Equation 6, C is the content of CuO (units: mmol/cc) per molar volume of the glass, and R is the O/P ratio.

The content of CuO in the oxide-based glass composition (on a molar basis) of Glasses 1 to 6 is preferably 4.0% or more, and is more preferably 5.0% or more, 6.0% or more, 7.0% or more, 7.5% or more, 8.0% or more, 8.5% or more, 9.0% or more, 9.5% or more, 10.0% or more, 10.5% or more, 11.0% or more, 11.5% or more, 12.0% or more, 12.5% or more, 13.0% or more, 13.5% or more, 14.0% or more, 14.5% or more, 15.0% or more, 15.5% or more, 16.0% or more, 16.5% or more, 17.0% or more, 17.5% or more, 18.0% or more, 18.5% or more, 19.0% or more, 19.5% or more, or 20.0% or more in that order. From the perspectives of leaving room for introduction of glass-forming components and maintaining the thermal stability of the glass, the content of CuO is preferably 48.0% or less, and is more preferably 47.0% or less, 46.0% or less, 45.0% or less, 44.0% or less, 43.5% or less, 43.0% or less, 42.5% or less, 42.0% or less, 41.5% or less, 41.0% or less, 40.5% or less, 40.0% or less, 39.5% or less, 39.0% or less, 38.5% or less, 38.0% or less, 37.5% or less, 37.0% or less, 36.5% or less, 36.0% or less, 35.5% or less, 35.0% or less, 34.5% or less, 34.0% or less, 33.5% or less, 33.0% or less, 32.5% or less, 32.0% or less, 31.5% or less, or 31.0% or less in that order.

As a transmittance characteristic calculated at a thickness of 0.11 mm, in order for the wavelength $\lambda_T 50$, at which the external transmittance including reflection losses becomes 50%, to fall within the range 600 nm to 650 nm, the content of CuO in the oxide-based glass composition (on a molar basis) is preferably 15.0% or more, and is more preferably 15.5% or more, 16.0% or more, 16.5% or more, 17.0% or more, 17.5% or more, 18.0% or more, 18.5% or more, 19.0% or more, 19.5% or more, or 20.0% or more in that order.

As a transmittance characteristic calculated at a thickness of 0.21 mm, in order for the wavelength $\lambda_T50$, at which the external transmittance including reflection losses becomes 50%, to fall within the range 600 nm to 650 nm, the content of CuO in the oxide-based glass composition (on a molar basis) is preferably 10.0% or more, and is more preferably 10.5% or more, 11.0% or more, 11.5% or more, 12.0% or more, 12.5% or more, 13.0% or more, 13.5% or more, 14.0% or more, 14.5% or more, 15.0% or more, 15.5% or more, 16.0% or more, 16.5% or more, 17.0% or more, 17.5% or more, 18.0% or more, 18.5% or more, 19.0% or more, 19.5% or more, or 20.0% or more in that order.

As a transmittance characteristic calculated at a thickness of 0.25 mm, in order for the wavelength $\lambda_T50$, at which the external transmittance including reflection losses becomes 50%, to fall within the range 600 nm to 650 nm, the content of CuO in the oxide-based glass composition (on a molar basis) is preferably 10.0% or more, and is more preferably 10.5% or more, 11.0% or more, 11.5% or more, 12.0% or more, 12.5% or more, 13.0% or more, 13.5% or more, 14.0% or more, 14.5% or more, 15.0% or more, 15.5% or more, 16.0% or more, 16.5% or more, 17.0% or more, 17.5% or more, 18.0% or more, 18.5% or more, 19.0% or more, 19.5% or more, or 20.0% or more in that order.

On the other hand, because the transmittance characteristic calculated at a thickness of 0.25 mm is such that the wavelength $\lambda_T50$, at which the external transmittance including reflection losses becomes 50%, may be lower than 600 nm if the content of CuO is too high, the content of CuO is preferably 35.0% or less, and is more preferably 34.0% or less, 33.0% or less, 32.0% or less, 31.0% or less, 30.0% or less, 29.5% or less, 29.0% or less, 28.5% or less, 28.0% or less, 27.5% or less, 27.0% or less, 26.5% or less, 26.0% or less, 25.5% or less, 25.0% or less, 24.5% or less, 24.0% or less, 23.5% or less, 23.0% or less, 22.5% or less, 22.0% or less, 21.5% or less, 21.0% or less, 20.5% or less, or 20.0% or less in that order.

In order for the glass thickness at which the wavelength $\lambda_T50$, at which the external transmittance including reflection losses becomes 50% at a wavelength of 550 nm or longer, is 645 nm to be 0.25 mm or less, the content of CuO in the oxide-based glass composition (on a molar basis) is preferably 10.0% or more, and is more preferably 10.5% or more, 11.0% or more, 11.5% or more, 12.0% or more, 12.5% or more, 13.0% or more, 13.5% or more, 14.0% or more, 14.5% or more, 15.0% or more, 15.5% or more, 16.0% or more, 16.5% or more, 17.0% or more, 17.5% or more, 18.0% or more, 18.5% or more, 19.0% or more, 19.5% or more, or 20.0% or more in that order.

In order for the glass thickness at which the wavelength $\lambda_T50$, at which the external transmittance including reflection losses becomes 50% at a wavelength of 550 nm or longer, is 633 nm to be 0.25 mm or less, the content of CuO in the oxide-based glass composition (on a molar basis) is preferably 10.5% or more, and is more preferably 11.0% or more, 11.5% or more, 12.0% or more, 12.5% or more, 13.0% or more, 13.5% or more, 14.0% or more, 14.5% or more, 15.0% or more, 15.5% or more, 16.0% or more, 16.5% or more, 17.0% or more, 17.5% or more, 18.0% or more, 18.5% or more, 19.0% or more, 19.5% or more, or 20.0% or more in that order.

In Glass 2 and Glass 4, the value of C is preferably 3.0 or more, and is more preferably 3.1 or more, 3.3 or more, 3.5 or more, 3.7 or more, 3.9 or more, 4.0 or more, 4.1 or more, 4.2 or more, 4.3 or more, 4.4 or more, 4.5 or more, 4.6 or more, 4.7 or more, 4.8 or more, 4.9 or more, 5.0 or more, 5.1 or more, 5.2 or more, 5.3 or more, 5.4 or more, or 5.5 or more in that order. From the perspectives of leaving room for introduction of glass-forming components and maintaining the thermal stability of the glass, the value of C is preferably 16.0 or less, and is more preferably 15.0 or less, 14.0 or less, 13.5 or less, 13.0 or less, 12.5 or less, 12.0 or less, 11.9 or less, 11.8 or less, 11.7 or less, 11.6 or less, 11.5 or less, 11.4 or less, 11.3 or less, 11.2 or less, 11.1 or less, 11.0 or less, 10.9 or less, 10.8 or less, 10.7 or less, 10.6 or less, 10.5 or less, 10.4 or less, 10.3 or less, 10.2 or less, 10.1 or less, 10.0 or less, 9.9 or less, 9.8 or less, 9.7 or less, 9.6 or less, 9.5 or less, 9.4 or less, 9.3 or less, 9.2 or less, 9.1 or less, 9.0 or less, 8.9 or less, 8.8 or less, 8.7 or less, 8.6 or less, or 8.5 or less in that order.

In Glasses 1 to 6, the content of CuO can be $\alpha_3$% or more. $\alpha_3$ can be calculated from Equation 7 below.

$$\alpha_3 = (70400 \times 0.25/d) \times \exp(-2.855 \times R) \quad \text{(Equation 7)}$$

In Equation 7, R is the O/P ratio. The value of d can be more than 0 and not more than 0.25. For example, the value of d can be 0.25, 0.24, 0.23, 0.22, 0.21, 0.20, 0.19, 0.18, 0.17, 0.16, 0.15, 0.14, 0.13, 0.12, 0.11, 0.10, 0.09, 0.08, 0.07, 0.06, 0.05, 0.04, 0.03, 0.02, 0.01, and the like. However, the value of d is not limited to these values. In order to achieve a desired transmittance half value at a lower thickness, it tends to be desirable for the value of d to be low.

For example, if d=0.11, the content of CuO can be $\alpha_3$% or more, and the value of $\alpha_3$ is calculated from the equation below.

$$\alpha_3 = (70400 \times 0.25/0.11) \times \exp(-2.855 \times R)$$

In one embodiment, if D (mm) denotes the sheet thickness of the glass at which the external transmittance of light having a wavelength of 633 nm becomes 50%, it is possible for d=D in Equation 7 above.

$$\alpha_3 = (70400 \times 0.25/D) \times \exp(-2.855 \times R)$$

In Glasses 1 to 6, the lower limit for the content of CuO can be defined by Equation 8 below from the content of CuO per molar volume of the glass.

$$C - 3200 \times 0.25/d \times \exp(-2.855 \times R) \geq 0 \quad \text{(Equation 8)}$$

In Equation 8, the value of d can be more than 0 and not more than 0.25. For example, the value of d can be 0.25, 0.24, 0.23, 0.22, 0.21, 0.20, 0.19, 0.18, 0.17, 0.16, 0.15, 0.14, 0.13, 0.12, 0.11, 0.10, 0.09, 0.08, 0.07, 0.06, 0.05, 0.04, 0.03, 0.02, 0.01, and the like. However, the value of d is not limited to these values. In order to achieve a desired transmittance half value at a lower thickness, it tends to be desirable for the value of d to be low.

For example, if d=0.11, Equation 8 is the following equation.

$$C - 3300 \times 0.25/0.11 \times \exp(-2.855 \times R) \geq 0$$

In one embodiment, if D (mm) denotes the sheet thickness of the glass at which the external transmittance of light having a wavelength of 633 nm becomes 50%, it is possible for d=D in Equation 8 above.

With regard to the content of CuO, Glasses 1 to 6 can also satisfy one or more other glass-related equations.

Glasses 1 to 6 contain P ions as essential cations. As mentioned above, a low O/P ratio is preferred from the perspective of achieving both improved transmittance of light in the visible region and improved near-infrared cutting performance. It is preferable to increase the content of $P_2O_5$ in order to lower the O/P ratio. From this perspective, the content of $P_2O_5$ in the oxide-based glass composition (on a molar basis) is preferably 33.0% or more, and is more preferably 34.0% or more, 35.0% or more, 36.0% or more, 37.0% or more, 38.0% or more, 39.0% or more, 40.0% or more, 40.5% or more, 41.0% or more, 41.5% or more, 42.0% or more, 42.5% or more, 43.0% or more, 43.5% or more, 44.0% or more, 44.5% or more, 45.0% or more, 45.5% or more, 46.0% or more, 46.5% or more, 47.0% or more, 47.5% or more, 48.0% or more, 48.5% or more, 49.0% or more, 49.5% or more, or 50.0% or more in that order. Because $P_2O_5$ itself does not exhibit near-infrared absorption capacity, the content of $P_2O_5$ is preferably 72.0% or less, and is more preferably 71.0% or less, 70.0% or less, 69.5% or less, 69.0% or less, 68.5% or less, 68.0% or less, 67.5% or less, 67.0% or less, 66.5% or less, 66.0% or less, 65.5% or less, 65.0% or less, 64.5% or less, 64.0% or less, 63.5% or less, 63.0% or less, 62.5% or less, 62.0% or less, 61.5% or less, 61.0% or less, 60.5% or less, or 60.0% or less in that order from the perspective of increasing the content of CuO, which does exhibit near-infrared absorption capacity. In addition, it is preferable for the content of $P_2O_5$ to be not higher than the value mentioned above from the perspectives of further suppressing a decrease in weathering resistance and/or suppressing a decrease in meltability.

In the glasses mentioned above, it is preferable for the oxide-based glass composition to be constituted mainly from $P_2O_5$, $Li_2O$ and CuO in order to achieve the desired transmission characteristics. From this perspective, the total content of $P_2O_5$, $Li_2O$ and CuO($P_2O_5$+$Li_2O$+CuO) is preferably 50.0% or more, and is more preferably 55.0% or more, 60.0% or more, 65.0% or more, 70.0% or more, 75.0% or more, 80.0% or more, 83.0% or more, 86.0% or more, 88.0% or more, or 90.0% or more in that order. The glasses mentioned above contain P ions, Li ions and Cu ions as essential cations, and also contain one or more types of cation selected from among the main cation group in order for the glasses to exhibit thermal stability and/or chemical durability. Therefore, the total content ($P_2O_5$+$Li_2O$+CuO) is less than 100%, is preferably 99.9% or less, and is more preferably 99.8% or less, 99.7% or less, 99.6% or less, 99.5% or less, 99.4% or less, 99.2% or less, 99.0% or less, 98.0% or less, 97.0% or less, 96.0% or less, 95.0% or less, 94.0% or less, 93.0% or less, 92.0% or less, 91.0% or less, 90.0% or less, 89.0% or less, 88.0% or less, 87.0% or less, 86.0% or less, or 85.0% or less in that order.

As a transmittance characteristic calculated at a thickness of 0.11 mm, in order for the wavelength $\lambda_T50$, at which the external transmittance including reflection losses becomes 50%, to fall within the range 600 nm to 650 nm in one embodiment, the total content of $P_2O_5$, $Li_2O$ and CuO ($P_2O_5$+$Li_2O$+CuO) in the oxide-based glass composition (on a molar basis) is preferably 84.0% or more, and is more preferably 85.0% or more, 86.0% or more, 87.0% or more, 88.0% or more, 89.0% or more, or 90.0% or more in that order.

As a transmittance characteristic calculated at a thickness of 0.21 mm, in order for the wavelength $\lambda_T50$, at which the external transmittance including reflection losses becomes 50%, to fall within the range 600 nm to 650 nm, the total content of $P_2O_5$, $Li_2O$ and CuO($P_2O_5$+$Li_2O$+CuO) in the oxide-based glass composition (on a molar basis) is preferably 80.0% or more, and is more preferably 81.0% or more, 82.0% or more, 83.0% or more, 84.0% or more, 85.0% or more, 86.0% or more, 87.0% or more, 88.0% or more, 89.0% or more, or 90.0% or more in that order.

As a transmittance characteristic calculated at a thickness of 0.25 mm, in order for the wavelength $\lambda_T50$, at which the external transmittance including reflection losses becomes 50%, to fall within the range 600 nm to 650 nm, the total content of $P_2O_5$, $Li_2O$ and CuO($P_2O_5$+$Li_2O$+CuO) in the oxide-based glass composition (on a molar basis) is preferably 75.0% or more, and is more preferably 76.0% or more, 77.0% or more, 78.0% or more, 79.0% or more, 80.0% or more, 81.0% or more, 82.0% or more, 83.0% or more, 84.0% or more, 85.0% or more, 86.0% or more, 87.0% or more, 88.0% or more, 89.0% or more, or 90.0% or more in that order.

In order for the glass thickness at which the wavelength $\lambda_T50$, at which the external transmittance including reflection losses becomes 50% at a wavelength of 550 nm or longer, is 645 nm to be 0.25 mm or less, the total content of $P_2O_5$, $Li_2O$ and CuO($P_2O_5$+$Li_2O$+CuO) in the oxide-based glass composition (on a molar basis) is preferably 80.0% or more, and is more preferably 81.0% or more, 82.0% or more, 83.0% or more, 84.0% or more, 85.0% or more, 86.0% or more, 87.0% or more, 88.0% or more, 89.0% or more, or 90.0% or more in that order.

In order for the glass thickness at which the wavelength $\lambda_T50$, at which the external transmittance including reflection losses becomes 50% at a wavelength of 550 nm or longer, is 633 nm to be 0.25 mm or less, the total content of $P_2O_5$, $Li_2O$ and CuO($P_2O_5$+$Li_2O$+CuO) in the oxide-based glass composition (on a molar basis) is preferably 81.0% or more, and is more preferably 82.0% or more, 83.0% or more, 84.0% or more, 85.0% or more, 86.0% or more, 87.0% or more, 88.0% or more, 89.0% or more, or 90.0% or more in that order.

Glasses of Examples 1 to 60 below can be given as examples of glasses corresponding to the above embodiment.

On the other hand, as another embodiment, for a glass in which the molar ratio ((MgO+CaO+SrO+BaO+ZnO)/($Li_2O$+$Na_2O$+$K_2O$)) of the total content of MgO, CaO, SrO, BaO and ZnO (MgO+CaO+SrO+BaO+ZnO) relative to the total content of $Li_2O$, $Na_2O$ and $K_2O$ ($Li_2O$+$Na_2O$+$K_2O$) is 2.0 or more, in order for the wavelength $\Delta_T50$, at which the external transmittance including reflection losses becomes 50%, to fall within the range 600 nm to 650 nm as a transmittance characteristic calculated at a thickness of 0.11 mm, the total content of $P_2O_5$, $Li_2O$ and CuO($P_2O_5$+$Li_2O$+CuO) in the oxide-based glass composition (on a molar basis) is preferably 65.0% or more, and is more preferably 66.0% or more, 67.0% or more, 68.0% or more, 69.0% or more, or 70.0% or more in that order.

As a transmittance characteristic calculated at a thickness of 0.21 mm, in order for the wavelength $\lambda_T50$, at which the external transmittance including reflection losses becomes 50%, to fall within the range 600 nm to 650 nm in another embodiment mentioned above, the total content of $P_2O_5$, $Li_2O$ and CuO ($P_2O_5$+$Li_2O$+CuO) in the oxide-based glass composition (on a molar basis) is preferably 60.0% or more, and is more preferably 61.0% or more, 62.0% or more, 63.0% or more, 64.0% or more, or 65.0% or more in that order.

As a transmittance characteristic calculated at a thickness of 0.25 mm, in order for the wavelength $\lambda_T 50$, at which the external transmittance including reflection losses becomes 50%, to fall within the range 600 nm to 650 nm in another embodiment mentioned above, the total content of $P_2O_5$, $Li_2O$ and CuO ($P_2O_5$+$Li_2O$+CuO) in the oxide-based glass composition (on a molar basis) is preferably 55.0% or more, and is more preferably 56.0% or more, 57.0% or more, 58.0% or more, 59.0% or more, or 60.0% or more in that order.

In order for the glass thickness at which the wavelength $\lambda_T 50$, at which the external transmittance including reflection losses becomes 50% at a wavelength of 550 nm or longer, is 645 nm to be 0.25 mm or less in another embodiment mentioned above, the total content of $P_2O_5$, $Li_2O$ and CuO($P_2O_5$+$Li_2O$+CuO) in the oxide-based glass composition (on a molar basis) is preferably 60.0% or more, and is more preferably 61.0% or more, 62.0% or more, 63.0% or more, 64.0% or more, or 65.0% or more in that order.

In order for the glass thickness at which the wavelength $\lambda_T 50$, at which the external transmittance including reflection losses becomes 50% at a wavelength of 550 nm or longer, is 633 nm to be 0.25 mm or less in another embodiment mentioned above, the total content of $P_2O_5$, $Li_2O$ and CuO($P_2O_5$+$Li_2O$+CuO) in the oxide-based glass composition (on a molar basis) is preferably 61.0% or more, and is more preferably 62.0% or more, 63.0% or more, 64.0% or more, 65.0% or more, or 66.0% or more in that order.

Glasses of Examples 61 to 66 below can be given as examples of glasses corresponding to another embodiment mentioned above.

For Glasses 3 and 4, the main cation group mentioned above includes B ions and Si ions. For Glasses 1, 2, 5 and 6, on the other hand, the main cation group mentioned above does not include B ions or Si ions, which tend to increase the melting temperature. In one embodiment, Glasses 1 to 6 can be glasses which contain B ions and/or Si ions, which shift the half value to the short wavelength side, from the perspectives of increasing the near-infrared cutting performance of the glass and improving the transmittance of light in the visible region, and can be glasses that contain no B ions and no Si ions in another embodiment.

From the perspective of improving the transmittance of light in the visible region, the total content of $B_2O_3$ and $SiO_2$ ($B_2O_3$+$SiO_2$) in the oxide-based glass composition (on a molar basis) of Glass 1 and Glass 2 is 3.0% or less, is preferably 2.5% or less, and is more preferably 2.0% or less, 1.5% or less, 1.0% or less, or 0.5% or less in that order.

From the perspective of further improving the transmittance of light in the visible region, the total content of $B_2O_3$ and $SiO_2$ ($B_2O_3$+$SiO_2$) in the oxide-based glass composition (on a molar basis) of Glasses 3 to 6 is preferably 3.0% or less, and is more preferably 2.5% or less, 2.0% or less, 1.5% or less, 1.0% or less, or 0.5% or less in that order.

In Glasses 1 to 6, the total content of $B_2O_3$ and $SiO_2$ ($B_2O_3$+$SiO_2$) can be 0%, 0% or more, or more than 0%.

From the perspective of greatly improving the transmittance of light in the visible region, the content of $B_2O_3$ in Glasses 1 to 6 is preferably 3.0% or less, and is more preferably 2.5% or less, 2.0% or less, 1.5% or less, 1.0% or less, or 0.5% or less in that order. The content of $B_2O_3$ can be 0%.

For Glasses 1 to 6, on the other hand, in a case where a quartz crucible is used for crudely melting the glass in order to facilitate homogenization of the glass, the content of $SiO_2$ is preferably more than 0%, and is more preferably 0.01% or more, 0.02% or more, 0.03% or more, 0.04% or more, 0.05% or more, 0.1% or more, 0.2% or more or 0.3% or more in that order. However, excessive introduction of $SiO_2$ into the glass tends to lower the optical uniformity of the glass. From this perspective, the content of $SiO_2$ in Glasses 1 to 6 is preferably 2.0% or less, and is more preferably 1.4% or less, 0.9% or less, 0.8% or less, 0.6% or less, or 0.4% or less in that order.

Glasses 1 to 6 contain Li ions as essential cations. Compared to a variety of glass components, $Li_2O$ has a high ability to maintain absorption by CuO in the long wavelength region, and has small adverse effect on weathering resistance. From this perspective, the content of $Li_2O$ is preferably 0.1% or more, and is more preferably 0.5% or more, 1.0% or more, 1.5% or more, 2.0% or more, 2.5% or more, 3.0% or more, 3.5% or more, 4.0% or more, 4.5% or more, 5.0% or more, 5.5% or more, 6.0% or more, 6.5% or more, 7.0% or more, 7.5% or more, or 8.0% or more in that order. On the other hand, from the perspective of ensuring thermal stability of the glass and/or the perspective of further suppressing a decrease in weathering resistance, the content of $Li_2O$ is preferably 35.0% or less, and is more preferably 34.0% or less, 33.0% or less, 32.0% or less, 31.0% or less, 30.0% or less, 29.5% or less, 29.0% or less, 28.5% or less, 28.0% or less, 27.5% or less, 27.0% or less, 26.5% or less, 26.0% or less, 25.5% or less, 25.0% or less, 24.5% or less, 24.0% or less, 23.5% or less, 23.0% or less, 22.5% or less, 22.0% or less, 21.5% or less, 21.0% or less, 20.5% or less, or 20.0% or less in that order.

From the perspectives of improving meltability and improving the transmittance of light in the visible region, the total content of MgO and $Al_2O_3$ (MgO+$Al_2O_3$) in Glasses 1 to 6 is 8.0% or less, is preferably 7.5% or less, is more preferably 7.0% or less, 6.5% or less, 6.0% or less, 5.5% or less, 5.0% or less, 4.5% or less, 4.0% or less, 3.5% or less, 3.0% or less, 2.5% or less, 2.0% or less, 1.8% or less, 1.6% or less, 1.5% or less or 1.4% or less in that order, and can be 0%. On the other hand, from the perspectives of increasing the weathering resistance of the glass and improving the mechanical strength of the glass, the total content of MgO and $Al_2O_3$ (MgO+$Al_2O_3$) can be more than 0%, is preferably 0.1% or more, and is more preferably 0.2% or more, 0.3% or more, 0.4% or more, 0.5% or more, 0.6% or more, 0.7% or more, 0.8% or more, 0.9% or more, 1.0% or more, 1.1% or more, or 1.3% or more in that order.

$Al_2O_3$ is a component that can contribute to an increase in weathering resistance in particular. The content of $Al_2O_3$ can be 0%, 0% or more, or more than 0%, and from the perspective of increasing the weathering resistance of the glass, is preferably 0.1% or more, and is more preferably 0.2% or more, 0.3% or more, 0.4% or more, 0.5% or more, 0.6% or more, 0.7% or more, 0.9% or more, 1.1% or more, 1.3% or more, or 1.5% or more in that order. On the other hand, from the perspective of further suppressing a decrease in the transmittance of light in the visible region, the content of $Al_2O_3$ is preferably 8.0% or less, and is more preferably 7.5% or less, 7.0% or less, 6.0% or less, 5.5% or less, 5.0% or less, 4.5% or less, 4.0% or less, 3.5% or less, 3.0% or less, or 2.5% or less in that order. In one embodiment, from the perspectives of prioritizing improving near-infrared absorption properties rather than maintaining the weather resistance of the glass, increasing the transmittance of light in the visible region by suppressing a short-wavelength shift of CuO absorption, and improving near-infrared absorption properties, the content of $Al_2O_3$ is preferably less than 2.0%, and is more preferably 1.9% or less, 1.8% or less, 1.7% or less, 1.6% or less, 1.5% or less, 1.4% or less, 1.3% or less, 1.2% or less, 1.1% or less, 1.0% or less, 0.9% or less, 0.8% or less, 0.7% or less, 0.6% or less, or 0.5% or less in that order.

MgO is a component that can be added, as appropriate, in order to adjust the thermal stability of the glass, but MgO shifts absorption by CuO to the short wavelength side, and it therefore tends to be difficult to increase the content of CuO. In addition, as the content of MgO increases, the meltability of the glass tends to decrease. From these perspectives, the content of MgO is preferably 9.0% or less, and is more preferably 8.0% or less, 7.0% or less, 6.0% or less, 5.0% or less, 4.0% or less, 3.0% or less, or 2.0% or less in that order. The content of MgO can be 0%. In one embodiment, the content of MgO can be more than 0%, is preferably 0.5% or more, and is more preferably 1.0% or more from the perspective of improving the mechanical strength of the glass.

$La_2O_3$ is a component that can contribute to an increase in weathering resistance without sacrificing the near-infrared absorption characteristics of the glass. The content of $La_2O_3$ is preferably 0.10% or more, and is more preferably 0.15% or more, 0.18% or more, or 0.21% or more in that order. On the other hand, from the perspective of further suppressing a decrease in the transmittance of light in the visible region, the content of $La_2O_3$ is preferably 8.0% or less, and is more preferably 7.0% or less, 6.5% or less, 6.0% or less, 5.5% or less, 5.0% or less, 4.5% or less, 4.0% or less, 3.5% or less, 3.0% or less, 2.5% or less, 2.0% or less, 1.5% or less, or 1.0% or less in that order.

$Y_2O_3$ is also a component that can contribute to an increase in weathering resistance without sacrificing the near-infrared absorption characteristics of the glass. The content of $Y_2O_3$ is preferably 0.10% or more, and is more preferably 0.15% or more, 0.20% or more, 0.25% or more, 0.30% or more, 0.35% or more, 0.40% or more, 0.45% or more, or 0.50% or more in that order. On the other hand, from the perspective of further suppressing a decrease in the transmittance of light in the visible region, the content of $Y_2O_3$ is preferably 8.0% or less, and is more preferably 7.0% or less, 6.5% or less, 6.0% or less, 5.5% or less, 5.0% or less, 4.5% or less, 4.0% or less, 3.5% or less, 3.0% or less, 2.5% or less, 2.0% or less, 1.5% or less, or 1.0% or less in that order. It is possible to introduce $Y_2O_3$ from the perspective of increasing the molar volume of the glass without increasing the specific gravity of the glass.

$Gd_2O_3$ is also a component that can contribute to an increase in weathering resistance. The content of $Gd_2O_3$ is preferably 0.10% or more, and is more preferably 0.15% or more, 0.18% or more, or 0.21% or more in that order. On the other hand, from the perspective of further suppressing a decrease in the transmittance of light in the visible region, the content of $Gd_2O_3$ is preferably 8.0% or less, and is more preferably 7.0% or less, 6.5% or less, 6.0% or less, 5.5% or less, 5.0% or less, 4.5% or less, 4.0% or less, 3.5% or less, 3.0% or less, 2.5% or less, 2.0% or less, 1.5% or less, or 1.0% or less in that order.

The oxide-based glass composition may, or may not, contain one or more rare earth oxides other than those mentioned above, such as $Lu_2O_3$ or $Sc_2O_3$. Because these components are generally expensive components, the content of a rare earth oxide other than $La_2O_3$, $Y_2O_3$ and $Gd_2O_3$ (the total content of these if two or more types thereof are contained) is preferably 2.5% or less, is more preferably 1.5% or less, 1.0% or less or 0.5% or less, and can be 0%.

From the perspective of improving weathering resistance, the total content of $Al_2O_3$, $La_2O_3$, $Y_2O_3$ and $Gd_2O_3$ ($Al_2O_3$+$La_2O_3$+$Y_2O_3$+$Gd_2O_3$) in Glasses 1 to 6 is preferably 0.1% or more, and is more preferably 0.15% or more, 0.20% or more, 0.25% or more, 0.30% or more, 0.35% or more, 0.40% or more, 0.45% or more, or 0.50% or more in that order. On the other hand, from the perspectives of ensuring the thermal stability of the glass and/or lowering the melting temperature of the glass, the total content ($Al_2O_3$+$La_2O_3$+$Y_2O_3$+$Gd_2O_3$) is preferably 8.0% or less, and is more preferably 7.0% or less, 6.5% or less, 6.0% or less, 5.5% or less, 5.0% or less, 4.5% or less, 4.0% or less, 3.5% or less, 3.0% or less, 2.5% or less, 2.0% or less, 1.5% or less or 1.0% or less in that order.

If cations having a nominal valency of +2 are seen in the overall glass composition, it tends to be difficult to achieve prominent effects in terms of weathering resistance and improving the transmittance of light in the visible region. Therefore, the total content of MgO, CaO, SrO and BaO, which are oxides of cations having a nominal valency of +2, is preferably such that the molar ratio relative to the content of $Li_2O$ ((MgO+CaO+SrO+BaO)/$Li_2O$), which is an oxide of Li ions, which are essential cations, is 2.0 or less, and is more preferably 1.5 or less, 1.3 or less, 1.2 or less, 1.1 or less, 1.0 or less, 0.9 or less, 0.8 or less, 0.7 or less, 0.6 or less, 0.5 or less, 0.4 or less, 0.3 or less or 0.2 or less. As mentioned later, the components mentioned above are optional components that can be used together with some alkali components in order to adjust the half value.

In addition, the total content of MgO, CaO, SrO, BaO and ZnO, which are oxides of cations having a nominal valency of +2, is preferably such that the molar ratio relative to the content of $Li_2O$ ((MgO+CaO+SrO+BaO+ZnO)/$Li_2O$), which is an oxide of Li ions, which are essential cations, is 2.0 or less, and is more preferably 1.5 or less, 1.3 or less, 1.2 or less, 1.1 or less, 1.0 or less, 0.9 or less, 0.8 or less, 0.7 or less, 0.6 or less, 0.5 or less, 0.4 or less, 0.3 or less or 0.2 or less from the perspective of improving the transmittance of light in the visible region. On the other hand, from the perspective of improving weathering resistance, the value of ((MgO+CaO+SrO+BaO+ZnO)/$Li_2O$) is preferably 2.0 or more, and is more preferably 2.5 or more, 3.0 or more, 3.5 or more, or 4.0 or more in that order. As mentioned later, the components mentioned above are optional components that can be used together with some alkali components in order to adjust the half value.

The content of BaO can be 0%, 0% or more, or more than 0%. BaO is a component that can increase weathering resistance when introduced at a certain quantity, and causes little change in the value of T600 when introduced. T600 will be explained later. BaO can be added in order to increase the thermal stability of the glass and adjust the meltability of the glass. In addition, BaO can be used in order to adjust the concentration of CuO. The content of BaO is preferably 0.5% or more, and is more preferably 1.0% or more, 1.5% or more, 2.0% or more, 2.5% or more, 3.0% or more, 3.5% or more, 4.0% or more, 4.5% or more, 5.0% or more, 5.5% or more, 6.0% or more, 6.5% or more, or 7.0% or more in that order. However, excessive introduction tends to lead to a decrease in the value of T400. T400 will be explained later. From the perspectives mentioned above, the content of BaO is preferably 36.0% or less, and is more preferably 35.0% or less, 34.0% or less, 33.0% or less, 32.0% or less, 31.0% or less, 30.0% or less, 29.0% or less, 28.0% or less, 27.0% or less, 26.0% or less, 25.0% or less, 24.0% or less, 23.0% or less, 22.0% or less, 21.0% or less, 20.0% or less, 19.0% or less, 18.0% or less, 17.0% or less, 16.0% or less, 15.0% or less, 14.0% or less, 13.0% or less, 12.0% or less, 11.0% or less, 10.0% or less, or 9.0% or less in that order.

The content of SrO can be 0%, 0% or more, or more than 0%. Like BaO, SrO is a component that is unlikely to lower weathering resistance, and is a component that can be added, as appropriate, for reasons such as adjusting the thermal stability of the glass, and the like. SrO can also be used in order to adjust to the concentration of CuO. The content of SrO is preferably 0.5% or more, and is more preferably 1.0% or more, 1.5% or more, 2.0% or more, 2.5% or more, 3.0% or more, 3.5% or more, 4.0% or more, 4.5% or more, 5.0% or more, 5.5% or more, 6.0% or more, 6.5% or more, or 7.0% or more in that order. However, because excessive introduction tends to lead to a decrease in the value of T400, the content of SrO is preferably 30.0% or less, and is more preferably 29.0% or less, 28.0% or less, 27.0% or less, 26.0% or less, 25.0% or less, 24.0% or less, 23.0% or less, 22.0% or less, 21.0% or less, 20.0% or less, 19.0% or less, 18.0% or less, 17.0% or less, 16.0% or less, 15.0% or less, 14.0% or less, 13.0% or less, 12.0% or less, 11.0% or less, 10.0% or less, or 9.0% or less in that order.

The content of CaO can be 0%, 0% or more, or more than 0%. CaO is a component that is unlikely to lower weathering resistance, and is a component that can be added, as appropriate, for reasons such as adjusting the thermal stability of the glass, and the like. CaO can also be used in order to adjust to the concentration of CuO. The content of CaO is preferably 0.5% or more, and is more preferably 1.0% or more, 1.5% or more, 2.0% or more, 2.5% or more, 3.0% or more, 3.5% or more, 4.0% or more, 4.5% or more, 5.0% or more, 5.5% or more, 6.0% or more, 6.5% or more, or 7.0% or more in that order. However, because excessive introduction tends to lead to a decrease in the value of T400, the content of CaO is preferably 30.0% or less, and is more preferably 29.0% or less, 28.0% or less, 27.0% or less, 26.0% or less, 25.0% or less, 24.0% or less, 23.0% or less, 22.0% or less, 21.0% or less, 20.0% or less, 19.0% or less, 18.0% or less, 17.0% or less, 16.0% or less, 15.0% or less, 14.0% or less, 13.0% or less, 12.0% or less, 11.0% or less, 10.0% or less, or 9.0% or less in that order.

Among the cations included in the main cation group mentioned above, Na ions, K ions and Zn ions tend to cause a deterioration in the weathering resistance of the glass, and it is therefore difficult to freely use these ions instead of Li ions, which are essential cations. From the additional perspective of improving the transmittance of light in the visible region or near-infrared region, the ratio of the total content of $Na_2O$, $K_2O$ and ZnO relative to the content of $Li_2O$ (($Na_2O$+$K_2O$+ZnO)/$Li_2O$) in Glasses 1 to 6 is 2.4 or less, is preferably 2.3 or less, is more preferably 2.2 or less, 2.1 or less, 2.0 or less, 1.9 or less, 1.8 or less, 1.7 or less, 1.6 or less, 1.5 or less, 1.4 or less, 1.3 or less, 1.2 or less, 1.1 or less, 0.9 or less, 0.8 or less, 0.7 or less, 0.6 or less, 0.5 or less, 0.4 or less, 0.3 or less, 0.2 or less, 0.1 or less or 0.05 or less in that order, and can be 0.00. On the other hand, from the perspective of lowering raw material costs of the glass, the molar ratio (($Na_2O$+$K_2O$+ZnO)/$Li_2O$) can be 0, 0 or more, or more than 0, and is preferably 0.05 or more, and can be 0.1 or more, 0.2 or more or 0.3 or more, from the perspective of facilitating a decrease in the value of Tg or Tm, which are explained later, by mixing a plurality of components.

In addition, it becomes difficult to introduce a large quantity of $P_2O_5$ in order to maintain weathering resistance as the content of Na ions, K ions and Zn ions increases, and it is therefore difficult to introduce a required amount of $P_2O_5$. From these perspectives and the perspective of suppressing a reduction in weathering resistance such as that mentioned above, the total content of $Na_2O$, $K_2O$ and ZnO ($Na_2O$+$K_2O$+ZnO) is preferably 30.0% or less, and is more preferably 25.0% or less, 20.0% or less, 15.0% or less, 12.0% or less, 10.0% or less, 9.0% or less, 8.0% or less, 7.0% or less, 6.0% or less, 5.0% or less, 4.0% or less, 3.0% or less, 2.0% or less, or 1.0% or less in that order. The above total content can be 0%. On the other hand, from the perspective of lowering raw material costs of the glass, the total content ($Na_2O$+$K_2O$+ZnO) can be 1.0% or more, 2.0% or more, 3.0% or more or 5.0% or more.

The content of $Na_2O$ can be 0%, 0% or more, or more than 0%. $Na_2O$, if introduced excessively, tends to cause a decrease in weathering resistance. Therefore, the content of $Na_2O$ is preferably 20.0% or less, and is more preferably 19.0% or less, 18.0% or less, 17.0% or less, 16.0% or less, 15.0% or less, 14.0% or less, 13.0% or less, 12.0% or less, 11.0% or less, 10.0% or less, 9.0% or less, or 8.0% or less in that order. On the other hand, because $Na_2O$ is a raw material that can be easily and inexpensively procured, and can be added, as appropriate, in order to improve meltability, the content of $Na_2O$ can be, for example, 0.5% or more, and can be 1.0% or more, 1.5% or more, 2.0% or more, 2.5% or more, 3.0% or more, 3.5% or more, 4.0% or more, or 5.0% or more.

The content of $K_2O$ can be 0%, 0% or more, or more than 0%. $K_2O$, if introduced excessively, also tends to cause a decrease in weathering resistance. Furthermore, it is preferable not to actively introduce $K_2O$, which tends to shift absorption by CuO to the short wavelength side. From these perspectives, the content of $K_2O$ is preferably 20.0% or less, and is more preferably 19.0% or less, 18.0% or less, 17.0% or less, 16.0% or less, 15.0% or less, 14.0% or less, 13.0% or less, 12.0% or less, 11.0% or less, 10.0% or less, 9.0% or less, or 8.0% or less in that order. On the other hand, $K_2O$ can be added, as appropriate, in order to improve the meltability of the glass. From this perspective, the content of $K_2O$ is preferably 0.2% or more, and is more preferably 0.5% or more, 1.0% or more, 1.5% or more, 2.0% or more, 2.5% or more, 3.0% or more, 3.5% or more, 4.0% or more, or 5.0% or more in that order.

The content of $Cs_2O$ can be 0%, 0% or more, or more than 0%. It is preferable not to actively introduce $Cs_2O$, which tends to cause a decrease in weathering resistance. The content of $Cs_2O$ is more preferably 15.0% or less, 14.0% or less, 13.0% or less, 12.0% or less, 11.0% or less, 10.0% or less, 9.0% or less, 8.0% or less, 7.0% or less, or 6.0% or less in that order. On the other hand, in order to adjust thermal stability and meltability, the content of $Cs_2O$ can be 0.5% or more, and can be 1.0% or more, 1.5% or more, 2.0% or more, 2.5% or more, 3.0% or more, 3.5% or more, or 4.0% or more.

From the perspective of increasing the meltability of the glass, the total content of $Li_2O$, $Na_2O$ and $K_2O$ ($Li_2O$+$Na_2O$+$K_2O$) is preferably 1.8% or more, and is more preferably 2.1% or more, 2.3% or more, 2.5% or more, 3.5% or more, 4.5% or more, 5.5% or more, 6.5% or more, 7.5% or more, 8.5% or more, 9.5% or more, 10.0% or more, or 10.5% or more in that order.

On the other hand, from the perspective of further suppressing a decrease in weathering resistance, the total content ($Li_2O$+$Na_2O$+$K_2O$) is preferably 35.0% or less, and is more preferably 33.5% or less, 32.5% or less, 31.5% or less, 30.5% or less, 29.5% or less, 28.5% or less, 27.5% or less, 26.5% or less, 25.5% or less, 24.5% or less, 23.5% or less, 21.5% or less, 20.5% or less, 19.5% or less, 18.5% or less, 17.5% or less, 16.6% or less, 15.5% or less, 14.5% or less, or 13.5% or less in that order. It is preferable for the total content ($Li_2O+Na_2O+K_2O$) to be not higher than the values mentioned above from the perspectives of preventing the occurrence of chipping and cracking in the glass as a result of stress exerted on the glass when the amount of expansion and shrinkage of the glass, which is caused by an increase in the coefficient of thermal expansion, increases and a change in volume of the glass is suppressed by another member.

From the perspective of suppressing deliquescence of the glass, the total content of $Na_2O$ and $K_2O$ ($Na_2O+K_2O$) is preferably 30.0% or less, and is more preferably 29.0% or less, 28.0% or less, 27.0% or less, 26.0% or less, 25.0% or less, 24.0% or less, 23.0% or less, 22.0% or less, 21.0% or less, 20.0% or less, 19.0% or less, 18.0% or less, 17.0% or less, 16.0% or less, 15.0% or less, 14.0% or less, 13.0% or less, 12.0% or less, 11.0% or less, 10.0% or less, 9.0% or less, 8.0% or less, 7.0% or less, 6.0% or less, 5.0% or less, 4.0% or less, 3.0% or less, 2.0% or less, 1.0% or less, or 0.5% or less in that order. By setting the total content of $Na_2O$ and $K_2O$ ($Na_2O+K_2O$) to be 0%, it is possible to obtain a glass having further reduced deliquescence. On the other hand, from the perspective of lowering raw material costs of the glass while suppressing meltability of the glass and suppressing a decrease in the value of T600, the total content ($Na_2O+K_2O$) can be 1.0% or more, and can be 2.0% or more, 3.0% or more, 4.0% or more, 5.0% or more, 6.0% or more, 7.0% or more, 8.0% or more, 9.0% or more, 10.0% or more, 11.0% or more, 12.0% or more, 13.0% or more, 14.0% or more, or 15.0% or more.

CuO can be replaced with other components in order to adjust the thickness of the glass, but on such occasion, by forming a glass in which the total content of $Na_2O$, $K_2O$, CaO, SrO and BaO ($Na_2O+K_2O+CaO+SrO+BaO$) is 0% or more, it is possible to adjust the concentration of CuO without greatly altering the position of near-infrared absorption. The total content ($Na_2O+K_2O+CaO+SrO+BaO$) is preferably 0.5% or more, and is more preferably 1.0% or more, 1.5% or more, 2.0% or more, 2.5% or more, 3.0% or more, 3.5% or more, 4.0% or more, 4.5% or more, 5.0% or more, 5.5% or more, 6.0% or more, 6.5% or more, or 7.0% or more in that order. However, because excessive introduction tends to lead to a decrease in the value of T400, the total content ($Na_2O+K_2O+CaO+SrO+BaO$) is preferably 36.0% or less, and is more preferably 35.0% or less, 34.0% or less, 33.0% or less, 32.0% or less, 31.0% or less, 30.0% or less, 29.0% or less, 28.0% or less, 27.0% or less, 26.0% or less, 25.0% or less, 24.0% or less, 23.0% or less, 22.0% or less, 21.0% or less, 20.0% or less, 19.0% or less, 18.0% or less, 17.0% or less, 16.0% or less, 15.0% or less, 14.0% or less, 13.0% or less, 12.0% or less, 11.0% or less, 10.0% or less, or 9.0% or less in that order. From the perspective of maximizing the near-infrared absorption characteristics of the glass, the total content ($Na_2O+K_2O+CaO+SrO+BaO$) can be 8.0% or less, 7.0% or less, 6.0% or less, 5.0% or less, or 4.0% or less.

With regard to weathering resistance, the matter that deliquescence in the glass is reduced and/or the matter that the occurrence of precipitates at the surface of the glass is suppressed in high temperature high humidity environments can be used as an indicator of weathering resistance. This is explained later. In order to further improve weathering resistance, it is more preferable to introduce $Al_2O_3$, and it is preferable to then introduce one or more of $Y_2O_3$, $La_2O_3$ and $Gd_2O_3$. In addition, BaO can improve the weathering resistance if introduced at a relatively large quantity, and SrO and CaO need to be introduced at an even larger quantity from the perspective of improving weathering resistance, and a value calculated as "($3\times Al_2O_3+Y_2O_3+La_2O_3+Gd_2O_3+BaO/3+(CaO+SrO)/6$)" (units: mol %) is preferably 0% or more, is more preferably more than 0%, and is preferably 0.5% or more, 1.0% or more, 2.0% or more, 3.0% or more, 4.0% or more, 5.0% or more, 6.0% or more, 7.0% or more, or 8.0% or more. If emphasis is to be placed on the weathering resistance and mechanical strength of the glass, this value is more preferably 9.0% or more, 10.0% or more, 11.0% or more, 12.0% or more, 13.0% or more, 14.0% or more, 15.0% or more, 16.0% or more, 17.0% or more, 18.0% or more, or 19.0% or more in that order. In the expression "($3\times Al_2O_3+Y_2O_3+La_2O_3+Gd_2O_3+BaO/3+(CaO+SrO)/6$)", "$Al_2O_3$" denotes the content of $Al_2O_3$, "$Y_2O_3$" denotes the content of $Y_2O_3$, "$La_2O_3$" denotes the content of $La_2O_3$, "$Gd_2O_3$" denotes the content of $Gd_2O_3$, "BaO" denotes the content of BaO, "CaO" denotes the content of CaO, and "SrO" denotes the content of SrO. That is, the expression "($3\times Al_2O_3+Y_2O_3+La_2O_3+Gd_2O_3+BaO/3+(CaO+SrO)/6$)" is the sum of a value calculated by multiplying the content of $Al_2O_3$ by 3, the content of $Y_2O_3$, the content of $La_2O_3$, the content of $Gd_2O_3$, a value calculated by dividing the content of BaO by 3, and a value calculated by dividing the sum of the content of CaO and the content of SrO by 6, and units for the thus calculated value are % (mol %).

On the other hand, a glass in which the value of "($3\times Al_2O_3+Y_2O_3+La_2O_3+Gd_2O_3+BaO/3+(CaO+SrO)/6$)" is excessively high tends to be poor in terms of meltability and tends to be such that the position of near-infrared absorption shifts towards the visible light side, and the value calculated as "($3\times Al_2O_3+Y_2O_3+La_2O_3+Gd_2O_3+BaO/3+(CaO+SrO)/6$)" is therefore preferably 40.0% or less, and is more preferably 37.0% or less, 35.0% or less, 33.0% or less, 32.0% or less, 30.0% or less, 28.0% or less, 26.0% or less, 25.0% or less, 24.0% or less, 23.0% or less, 22.0% or less or 21.0% or less in that order.

The ratio of the value calculated as "($3\times Al_2O_3+Y_2O_3+La_2O_3+Gd_2O_3+BaO/3+(CaO+SrO)/6$)" relative to the total content of $P_2O_5$, $Li_2O$ and CuO, that is, "($3\times Al_2O_3+Y_2O_3+La_2O_3+Gd_2O_3+BaO/3+(CaO+SrO)/6)/(P_2O_5+Li_2O+CuO$)" can be 0.0 or more. Components selected from the group consisting of $Al_2O_3$, $Y_2O_3$, $La_2O_3$, $Gd_2O_3$, BaO, CaO and SrO are preferably introduced at a certain quantity or more relative to the quantity of $P_2O_5$, $Li_2O$ and CuO, which are essential components. Therefore, the above ratio is preferably 0.01 or more, and is more preferably 0.02 or more, 0.03 or more, 0.04 or more, 0.05 or more, 0.06 or more, 0.07 or more, 0.08 or more, or 0.09 or more in that order. If weathering resistance is to be further increased, the above ratio is more preferably 0.10 or more, and is further preferably 0.11 or more, 0.12 or more, 0.13 or more, 0.14 or more, 0.15 or more, 0.16 or more, 0.17 or more, 0.18 or more, 0.19 or more, 0.20 or more, 0.21 or more, 0.22 or more, 0.23 or more, 0.24 or more, or 0.25 or more in that order.

On the other hand, because the transmittance characteristics of the glass decrease and the tendency for the stability of the glass to decrease becomes stronger if the above ratio is excessively high, the above ratio is preferably 0.36 or less, and is more preferably 0.35 or less, 0.34 or less, 0.33 or less, 0.32 or less, 0.31 or less, 0.30 or less, 0.29 or less or 0.28 or less in that order.

The content of ZnO can be 0%, 0% or more, or more than 0%. ZnO is a component that can be added, as appropriate, for reasons such as adjusting the thermal stability of the glass, and the like, but from the perspective that ZnO tends to cause a decrease in the weathering resistance of the glass and the perspective of ensuring that the introduced amount of $P_2O_5$, which is an essential component, is sufficient, the upper limit for the content thereof is preferably 20.0% or less, and is more preferably 19.0% or less, 18.0% or less, 17.0% or less, 16.0% or less, 15.0% or less, 14.0% or less, 13.0% or less, 12.0% or less, 11.0% or less, 10.0% or less, 9.0% or less, 8.0% or less, 7.0% or less, 6.0% or less or 5.0% or less in that order. If the effect of introducing another component is a priority, the content of ZnO can be 4.0% or less, 3.0% or less, 2.0% or less, or 1.0% or less. On the other hand, if ZnO is introduced in order to adjust the thermal stability of the glass and lower the value of Tg and/or Tm, the content of ZnO is more preferably 0.4% or more, 0.6% or more, 0.8% or more, 1.0% or more, 1.2% or more, 1.4% or more, 1.6% or more, 1.8% or more or 2.0% or more in that order.

The above glass is preferably constituted essentially from the components mentioned above, but may contain other components as long as the operational effects achieved by the components mentioned above are not impaired. In addition, inclusion of unavoidable impurities in the glass is not excluded.

For example, $Nb_2O_5$ and $ZrO_2$ can be introduced, as appropriate, respectively, at quantities of more than 0%, 0.1% or more, or 0.2% or more, as components other than the components mentioned above in order to adjust the weathering resistance and mechanical strength and improve the thermal stability of the glass, but the content of each of these components is preferably 5.0% or less, and are more preferably 4.0% or less, 3.0% or less, 2.0% or less, 1.0% or less, 0.5% or less or 0.3% or less in that order. The content of each of these components can be 0%.

$TiO_2$, $WO_3$ and $Bi_2O_3$ can be introduced, as appropriate to the extent that the transmittance of glass is not affected, respectively, at quantities of more than 0%, 0.1% or more, or 0.2% or more, as components other than the components mentioned above in order to adjust the weathering resistance and mechanical strength and improve the thermal stability of the glass, but the content of each of these components is preferably 4.0% or less, and are more preferably 3.0% or less, 2.0% or less, 1.0% or less, 0.5% or less or 0.3% or less in that order. The content of each of these components can be 0%.

Pb, As, Cd, TI, Be and Se are all toxic. Therefore, it is preferable for the above glass not to contain these as glass components.

U, Th and Ra are all radioactive elements. Therefore, it is preferable for the above glass not to contain these as glass components.

V, Cr, Mn, Fe, Co, Ni, Pr, Nd, Pm, Sm, Eu, Tb, Dy, Ho, Er and Tm increase coloration of a glass and can be a source of fluorescence. Therefore, in the above glass, the total content on an oxide basis of these elements in the oxide-based glass is preferably 10 ppm by mass or less, and it is more preferable for these elements not to be contained as glass components.

Of these, $V_2O_5$ is preferably not used due to being toxic. In one embodiment, Glasses 1 to 6 are preferably glasses that do not contain V ions, and the content (on an oxide basis) of $V_2O_5$ in the oxide-based glass composition is preferably 1.0% or less, is more preferably 0.3% or less, 0.1% or less and 0.01% or less in that order, and it is more preferable for these glasses to contain no $V_2O_5$.

As one example, the ratio of $V_2O_5$ and $Li_2O$, which is an essential component, is such that the ratio of the content of $V_2O_5$ relative to the content of $Li_2O$ ($V_2O_5/Li_2O$) is preferably 0.0080 or less, and is more preferably 0.0048 or less, 0.0028 or less, 0.0018 or less or 0.0014 or less in that order.

CoO causes a decrease in the transmittance of light in the visible region of the glass, and is toxic, and is therefore preferably not used. In one embodiment, Glasses 1 to 6 are preferably glasses that do not contain Co ions, and it is preferable for the oxide-based glass composition to contain no CoO.

Raw materials for introducing Ge and Ta into the glass are expensive. Therefore, it is preferable for the above glass not to contain these as glass components.

Sb ($Sb_2O_3$), Sn ($SnO_2$), Ce ($CeO_2$) and $SO_3$ are elements that can be optionally added as clarifying agents. Of these, Sb ($Sb_2O_3$) is a clarifying agent having a high clarifying effect.

Sn ($SnO_2$) and Ce ($CeO_2$) have a lower clarifying effect than Sb ($Sb_2O_3$). These clarifying agents, if added at large quantities, tend to enhance coloration of the glass. Therefore, in a case where a clarifying agent is added, it is preferable to add Sb ($Sb_2O_3$) in view of the effect on coloration caused by the addition.

The content values of the components listed below that are able to function as clarifying agents are expressed as oxide-based values in the glass composition.

The content of $Sb_2O_3$ is expressed as an outer percentage. That is, if the total content as oxides of all glass components other than $Sb_2O_3$, $SnO_2$, $CeO_2$ and $SO_3$ is taken to be 100.0 mass %, the content of $Sb_2O_3$ is preferably less than 2.0 mass %, and is more preferably 1.5 mass % or less, 1.2 mass % or less, 1.0 mass % or less, 0.9 mass % or less, 0.8 mass % or less, 0.7 mass % or less, 0.6 mass % or less, 0.5 mass % or less, 0.4 mass % or less, 0.3 mass % or less, 0.2 mass % or less or less than 0.1 mass % in that order. The content of $Sb_2O_3$ may be 0 mass %. However, from the perspectives of facilitating oxidation of the glass and increasing the transmittance of light in the visible region, the content of $Sb_2O_3$ can be 0.01 mass % or more, and can be 0.02 mass % or more, 0.03 mass % or more, 0.04 mass % or more, 0.05 mass % or more, 0.06 mass % or more, or 0.08 mass % or more.

The content of $SnO_2$ is also expressed as an outer percentage. That is, if the total content as oxides of all glass components other than $SnO_2$, $Sb_2O_3$, $CeO_2$ and $SO_3$ is taken to be 100.0 mass %, the content of $SnO_2$ is preferably less than 2.0 mass % or less than 1.0 mass %, and is more preferably 0.9 mass % or less, 0.8 mass % or less, 0.7 mass % or less, 0.6 mass % or less, 0.5 mass % or less, 0.4 mass % or less, 0.3 mass % or less, 0.2 mass % or less or 0.1 mass % in that order. The content of $SnO_2$ may be 0 mass %. If the content of $SnO_2$ falls within the range mentioned above, it is possible to improve the clarity of the glass.

The content of $CeO_2$ is also expressed as an outer percentage. That is, if the total content as oxides of all glass components other than $CeO_2$, $Sb_2O_3$, $SnO_2$ and $SO_3$ is taken to be 100.0 mass %, the content of $CeO_2$ is preferably less than 2.0 mass % or less than 1.0 mass %, and is more preferably 0.9 mass % or less, 0.8 mass % or less, 0.7 mass % or less, 0.6 mass % or less, 0.5 mass % or less, 0.4 mass % or less, 0.3 mass % or less, 0.2 mass % or less or less than 0.1 mass % in that order. The content of $CeO_2$ may be 0 mass %. If the content of $CeO_2$ falls within the range mentioned above, it is possible to improve the clarity of the glass.

The content of $SO_3$ is also expressed as an outer percentage. That is, if the total content as oxides of all glass components other than $SO_3$, $Sb_2O_3$, $SnO_2$ and $CeO_2$ is taken to be 100.0 mass %, the content of $SO_3$ is preferably less than 2.0 mass %, more preferably less than 1.0 mass %, further preferably less than 0.5 mass %, and yet more preferably less than 0.1 mass %. The content of $SO_3$ may be 0 mass %. If the content of $SO_3$ falls within the range mentioned above, it is possible to improve the clarity of the glass.

<Physical Properties of Glass>

(Transmittance Characteristics)

The above glass is suitable for use as a glass for a near-infrared cut filter. In the present invention and the present description, the term "transmittance" means external transmittance including reflection losses, unless explicitly indicated otherwise.

The half value $\lambda_T50$, which is the wavelength at which the transmittance becomes 50% at a wavelength of 550 nm or longer, the transmittance T1200 at a wavelength of 1200 nm, the average transmittance value within the wavelength range from 1100 nm to 800 nm (referred to as "Ave. T1100-800"), and the transmittance T750 at a wavelength of 750 nm can be used as indicators of near-infrared cutting performance.

In addition, the above glass can exhibit high transmittance of light in the visible region. The transmittance T400 at a wavelength of 400 nm and the transmittance T600 at a wavelength of 600 nm can be used as indicators of transmittance of light in the visible region.

Transmittance characteristics of the glass are determined using the methods described below.

A glass sample is processed so as to have optically polished flat surfaces that are parallel to each other, and external transmittance is measured at wavelengths of 200 to 1200 nm. The external transmittance includes reflection losses of light rays at the sample surface.

The intensity of light rays incident perpendicularly to one of the optically polished flat surfaces is denoted by the intensity A, and the intensity of light rays emitted from the other flat surface is denoted by the intensity B, and the spectral transmittance including reflection losses is calculated as the value of B/A. The wavelength at which the spectral transmittance becomes 50% at a wavelength of 550 nm or longer is taken to be the half value $\lambda_T50$. The spectral transmittance at a wavelength of 400 nm is denoted by T400, the spectral transmittance at a wavelength of 600 nm is denoted by T600, and the spectral transmittance at a wavelength of 1200 nm is denoted by T1200. The average value of the spectral transmittance within the wavelength range from 1100 nm to 800 nm is denoted by Ave. T1100-800, and the spectral transmittance at a wavelength of 750 nm is denoted by T750.

In addition, in a case where a glass to be measured is not a glass having a thickness to be calculated, the thickness of the glass is denoted by d, the transmittance at each wavelength λ is calculated using Equation A below, and calculated values can be determined from spectral transmittance values obtained from the calculations $$T(\lambda) = (1-R(\lambda))^2 \times \exp\left(\log_e\left((T_0(\lambda)/100)/(1-R(\lambda))^2\right) \times d/d_0\right) \times 100 \quad \text{Equation A}$$

In Equation A, T(λ) denotes the transmittance (%) calculated for a wavelength λ, $T_0(\lambda)$ denotes the measured transmittance (%) at the wavelength λ, d denotes the thickness (mm) to be calculated, do denotes the thickness of the glass (mm), R(λ) denotes the reflectance at the wavelength λ, which is represented by $((n(\lambda)-1)/(n(\lambda)+1))^2$, and n(λ) denotes the refractive index at the wavelength λ. Here, calculations are performed using the constants n(λ)=1.51680 and R(λ)=0.042165.

If the value of T600, which is the transmittance of light in the red region, is high and the value of T1200, which is the transmittance of light in the near-infrared region, is low, this can mean that the transmittance of light in the visible region is improved and near-infrared cutting performance is also improved. In addition, if the value of T400, which is the transmittance of light in the violet region, is high, this can mean that the transmittance of light in the visible region is improved.

From the perspectives mentioned above, preferred ranges for the values of T400, T600 and T1200 are as indicated below.

The value of T400 is preferably 70% or more, and is more preferably 71% or more, 72% or more, 73% or more, 74% or more, 75% or more, 76% or more, 77% or more, 78% or more, 79% or more, or 80% or more in that order. The value of T400 can be, for example, 98% or less, 97% or less or 96% or less, but because a high T400 value can mean superior transmittance of light in the visible region, it is preferable for this value to be higher than the values shown above.

The value of T600 is preferably 50% or more, and is more preferably 55% or more, 56% or more, 57% or more, 58% or more, 59% or more, 60% or more, 61% or more, 62% or more, 63% or more, 64% or more, 65% or more, 66% or more, 67% or more, 68% or more, 69% or more, 70% or more, 71% or more, 72% or more, 73% or more, 74% or more, or 75% or more in that order. The value of T600 can be, for example, 90% or less, 85% or less or 80% or less, but because a high T600 value can mean superior transmittance of light in the visible region, it is preferable for this value to be higher than the values shown above.

The value of T1200 is preferably 30% or less, and is more preferably 29% or less, 28% or less, 27% or less, 26% or less, 25% or less, 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less in that order. In order to also achieve the transmittance of light in the visible region, the value of T1200 can be, for example, 1% or more, 3% or more, 5% or more or 7% or more, but because a low T1200 value can mean superior near-infrared cutting performance, it is preferable for this value to be lower than the values shown above.

In one embodiment, the value of T1200 can be β1% or less.

β1 is calculated using Equation B1 below. In Equation B1, R is the O/P ratio.

$$\beta 1 = 64 \times R - 170 \quad \text{(Equation B1)}$$

In one embodiment, T1200 can be not higher than a numerical value (units: %) represented by β2, β3, β4, β5 or β6, which are shown in Equations B2 to B6 below. In the equations below, R is the O/P ratio.

$$\beta 2 = 64 \times R - 175 \quad \text{Equation B2}$$

$$\beta 3 = 64 \times R - 180 \quad \text{Equation B3}$$

$$\beta 4 = 80 \times R - 220 \quad \text{Equation B4}$$

-continued $$\beta 5=80\times R-224 \quad \text{Equation B5}$$

$$\beta 6=80\times R-228 \quad \text{Equation B6}$$

The half value $\lambda_T50$, which is the wavelength at which the spectral transmittance becomes 50% at a wavelength of 550 nm or longer, is preferably 600 nm or more, and is more preferably 610 nm or more, 613 nm or more, 615 nm or more, 617 nm or more, 620 nm or more, 623 nm or more, 625 nm or more, or 628 nm or more in that order. The half value $\lambda_T50$ is preferably 650 nm or less, and is more preferably 647 nm or less, 645 nm or less, 643 nm or less, 641 nm or less, 640 nm or less, 639 nm or less, or 638 nm or less in that order. Being able to achieve the half value $\lambda_T50$, which is the wavelength at which the transmittance becomes 50% at a wavelength of 550 nm or longer, at a prescribed glass thickness or less is preferable from the perspective of achieving both reducing the thickness of the glass and improving near-infrared cutting performance. A prescribed glass thickness or less is preferably a thickness of 0.25 mm or less.

In addition, because the above glass exhibits excellent near-infrared absorption characteristics, the value of "Ave. T1100-800" can be suppressed to 15% or less. The value of "Ave. T1100-800" is preferably 14% or less, and is more preferably 13% or less, 12% or less, 11% or less, 10% or less, 9% or less, 8% or less, 7% or less, 6% or less, 5% or less, 4% or less, 3% or less, 2% or less, 1.3% or less, 1.0% or less, 0.3% or less, 0.1% or less, 0.03% or less, or 0.01% or less in that order.

In addition, because the above glass exhibits excellent near-infrared absorption characteristics, the value of T750 can be suppressed to 25% or less. The value of T750 is preferably 24% or less, and is more preferably 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1.3% or less, 1.0% or less, 0.3% or less, 0.1% or less, 0.03% or less, or 0.01% or less in that order.

In one embodiment, the above glass can be used as a glass for a near-infrared cut filter having a thickness of 0.25 mm or less, as described in detail below.

For the above glass, characteristics (a) to (h) below can be given as transmittance characteristics that are preferred for a thin glass for a near-infrared cut filter having a thickness of 0.25 mm or less. The above glass preferably satisfies one or more of characteristics (a) to (h) below, and can satisfy two or more of these characteristics. By adjusting the glass composition in the manner explained above, it is possible to obtain a glass having preferred transmittance characteristics.

(a) A glass for which the wavelength $\lambda_T50$, at which the external transmittance including reflection losses becomes 50% at a wavelength of 550 nm or longer, is 633 nm has a thickness of 0.25 mm or less, and at this thickness, the external transmittance T600 including reflection losses at a wavelength of 600 nm is 50% or more, and the external transmittance T1200 including reflection losses at a wavelength of 1200 nm is 30% or less.

For characteristic (a), a glass for which the wavelength $\lambda_T50$, at which the external transmittance including reflection losses becomes 50% at a wavelength of 550 nm or longer, is 633 nm has a thickness of 0.25 mm or less, and it is more preferable that the above thickness is within the thickness range described later for the thickness of a near-infrared cut filter. This is applied to characteristics (b), (e) and (f) below.

(b) A glass for which the wavelength at which the external transmittance including reflection losses becomes 50% at a wavelength of 550 nm or longer is 633 nm has a thickness of 0.25 mm or less, and at this thickness, the external transmittance T600 including reflection losses at a wavelength of 600 nm is 50% or more, and the external transmittance T1200 including reflection losses at a wavelength of 1200 nm is β1% or less. β1 is calculated from Equation $B_1$ below. In Equation B1, R is the O/P ratio in the above glass.

$$\beta 1=64\times R-170 \quad \text{(Equation B1)}$$

As mentioned above, the value of T1200 can be β2% or less, β3% or less, β4% or less, β5% or less, or β6% or less.

(c) As transmittance characteristics calculated at a thickness of 0.11 mm, the wavelength $\lambda_T50$, at which the external transmittance including reflection losses becomes 50%, falls within the range 600 nm to 650 nm, the external transmittance T1200 including reflection losses at a wavelength of 1200 nm is 30% or less, and the external transmittance T400 including reflection losses at a wavelength of 400 nm is 70% or more.

(d) As transmittance characteristics calculated at a thickness of 0.21 mm, the wavelength $\lambda_T50$, at which the external transmittance including reflection losses becomes 50%, falls within the range 600 nm to 650 nm, the external transmittance T1200 including reflection losses at a wavelength of 1200 nm is 25% or less, and the external transmittance T400 including reflection losses at a wavelength of 400 nm is 70% or more.

(e) A glass for which the wavelength at which the external transmittance including reflection losses becomes 50% at a wavelength of 550 nm or longer is 645 nm has a thickness of 0.25 mm or less, and at this thickness, the external transmittance T600 including reflection losses at a wavelength of 600 nm is 50% or more, and the external transmittance T1200 including reflection losses at a wavelength of 1200 nm is 30% or less.

(f) A glass for which the wavelength $\lambda_T50$, at which the external transmittance including reflection losses becomes 50% at a wavelength of 550 nm or longer, is 645 nm has a thickness of 0.25 mm or less, and at this thickness, the external transmittance T600 including reflection losses at a wavelength of 600 nm is 50% or more, the external transmittance T1200 including reflection losses at a wavelength of 1200 nm is β1% or less, and β1 is a value calculated using β1 above.

(g) As transmittance characteristics calculated at a thickness of 0.23 mm, the wavelength $\lambda_T50$, at which the external transmittance including reflection losses becomes 50%, falls within the range 600 nm to 650 nm, the external transmittance T1200 including reflection losses at a wavelength of 1200 nm is 18% or less, and the external transmittance T400 including reflection losses at a wavelength of 400 nm is 70% or more.

(h) As transmittance characteristics calculated at a thickness of 0.25 mm, the wavelength $\lambda_T50$, at which the external transmittance including reflection losses becomes 50%, falls within the range 600 nm to 650 nm, the external transmittance T1200 including reflection losses at a wavelength of 1200 nm is 16% or less, and the external transmittance T400 including reflection losses at a wavelength of 400 nm is 70% or more.

(Weathering resistance)

The above glass can exhibit excellent weathering resistance by having the composition described above. Examples of indicators for weathering resistance can include weathering resistance evaluation results evaluated by eye using a method that is described in Examples section below, and any of evaluation results S to D are preferred, any of the evaluation results S to C are more preferred, any of evaluation results S to B are further preferred, evaluation results S and A are yet more preferred, and evaluation result S is further preferred.

Furthermore, haze value measured using a haze meter can also be used as an indicator of weathering resistance. A glass having a haze value of 15% or less can be given as an example of a glass having further superior weathering resistance.

For weathering resistance, a glass which has an evaluation result of S or A (and especially S) when evaluated by eye using the method mentioned above and which has a haze value, as measured using a haze meter, of 15% or less is yet more preferred.

(Glass Transition Temperature Tg and Temperature Tm at which an Endothermic Reaction Concludes Due to Melting)

The glass transition temperature of the above glass is not particularly limited. From the perspective of increasing the transmittance of light in the short wavelength region of the glass by improving the meltability of the glass and reducing the burden on an annealing furnace or molding device, the Tg value is preferably 450° C. or lower, and is more preferably 440° C. or lower, 430° C. or lower, 420° C. or lower, 410° C. or lower, or 400° C. or lower in that order. From the perspective of increasing the chemical durability and/or heat resistance of the glass, the Tg value is preferably 250° C. or higher, and is more preferably 260° C. or higher, 270° C. or higher, 280° C. or higher, 290° C. or higher, or 300° C. or higher in that order.

The Tg value of the glass can be controlled by adjusting the content of $Li_2O$, $Na_2O$ or $K_2O$ or the total content of these, or by adjusting the content of ZnO, the content of MgO, the content of $Al_2O_3$ or the total content of these.

The Tm value, which is the temperature at which an endothermic reaction concludes due to melting, is not particularly limited. As the Tm value decreases, meltability improves and devitrification is less likely to occur even if molding is carried out at a higher viscosity. In addition, as the meltability of the glass improves, it tends to be possible to increase transmittance by the glass of visible light in the short wavelength region. From these perspectives, the Tm value is preferably 890° C. or lower, and is more preferably 880° C. or lower, 870° C. or lower, 860° C. or lower, 850° C. or lower, 840° C. or lower, 830° C. or lower, 820° C. or lower, 810° C. or lower, 800° C. or lower, 790° C. or lower, 780° C. or lower, 770° C. or lower, 760° C. or lower, 750° C. or lower, 740° C. or lower, 730° C. or lower, 720° C. or lower, 710° C. or lower, 700° C. or lower, 690° C. or lower, 680° C. or lower, 670° C. or lower, 660° C. or lower, or 650° C. or lower in that order. The lower limit of the Tm value is not particularly limited, but because the weathering resistance of the glass tends to deteriorate if the Tm value is too low, the Tm value can be 500° C. or higher, 550° C. or higher, 580° C. or higher, 600° C. or higher, 620° C. or higher, or 640° C. or higher.

The Tm value of the glass can be controlled by adjusting the content of $Li_2O$, $Na_2O$ or $K_2O$ or the total content of these, or by adjusting the content of ZnO, the content of MgO, the content of $Al_2O_3$ or the total content of these.

(Specific Gravity)

The near-infrared cut filter is preferably lightweight in order to reduce the weight of an element or device in which the filter is incorporated. From this perspective, the specific gravity of the above glass is preferably 3.40 or less, and is more preferably 3.35 or less, 3.30 or less, 3.25 or less, 3.20 or less, 3.15 or less, 3.10 or less, 3.05 or less, 3.00 or less, 2.95 or less, 2.90 or less, 2.85 or less, 2.80 or less, 2.75 or less, 2.70 or less, 2.65 or less, or 2.60 or less in that order.

The specific gravity can be, for example, 2.0 or more or 2.4 or more, but because a low specific gravity is preferred from the perspective mentioned above, it is preferable for the specific gravity to be lower than the values listed above.

(Molar Volume)

The molar volume (M/D) of the glass is not particularly limited. From the perspective of increasing near-infrared absorption capacity by increasing the amount of CuO per unit volume, the molar volume of the glass is preferably lower. The molar volume can be lowered by replacing $P_2O_5$, $La_2O_3$, $Y_2O_3$, $Gd_2O_3$, BaO, $K_2O$, or the like, with $Li_2O$, and can be somewhat lowered by replacing $Al_2O_3$, CuO or $Na_2O$ with $Li_2O$. On the other hand, the molar volume does not significantly change if CaO, ZnO or SrO is replaced with $Li_2O$, and the molar volume tends to increase if MgO is replaced with $Li_2O$. In view of these tendencies, the molar volume of the glass can be adjusted by adjusting the glass composition. The molar volume is preferably 45 cc/mol or less, and is more preferably 43 cc/mol or less, 42 cc/mol or less, 41 cc/mol or less, 40 cc/mol or less, 39.5 cc/mol or less, 39.0 cc/mol or less, 38.5 cc/mol or less, 38.0 cc/mol or less, or 37.5 cc/mol or less in that order.

On the other hand, the molar volume can be increased from the perspective of maintaining the weathering resistance of the glass, and from this perspective, the molar volume of the above glass can be 34.0 cc/mol or more, and can be 35.0 cc/mol or more, 36.0 cc/mol or more, 36.5 cc/mol or more, 37.0 cc/mol or more, 37.5 cc/mol or more, 38.0 cc/mol or more, 38.5 cc/mol or more, 39.0 cc/mol or more, or 39.5 cc/mol or more.

<Method for Producing Glass>

The above glass can be obtained by mixing, melting and molding the glass raw materials. For the production method, the following descriptions can also be referred.

The above near-infrared absorbing glass is suitable for use as a glass for a near-infrared cut filter. In addition, the above near-infrared absorbing glass can be used in optical elements (lenses and the like) in addition to a near-infrared cut filter, can also be used in a variety of glass products, and can be modified in various ways.

[Near-Infrared Cut Filter]

One aspect of the present invention relates to a near-infrared cut filter (hereinafter also referred to simply as a "filter") comprised of the above near-infrared absorbing glass.

The glass that constitutes the above filter is as described above.

A specific example of a method for producing the above filter will be explained below. However, the production method described below is merely an example, and does not limit the present invention.

A molten glass is obtained by using glass raw materials such as phosphates, oxides, carbonates, nitrates, sulfates and fluorides as appropriate, the raw materials are weighed out so as to attain a prescribed composition, mixed, and then melted at a temperature of, for example, 800° C. to 1100° C. in a melting vessel such as a platinum crucible. During this process, a lid of platinum or the like can be used in order to suppress volatilization of volatile components. In addition, the melting can be carried out in air, and can also be carried out in an oxygen atmosphere or while bubbling oxygen into the molten glass in order to suppress changes in valency of Cu. A homogenized molten glass in which the amount of bubbles is reduced (and which preferably contains no bubbles) is obtained by agitating and clarifying the molten glass. A glass can be obtained after clarifying the glass at 900° C. to 1100° C. and then lowering the temperature of the glass 800° C. to 1000° C. in order to facilitate oxidation of the glass. However, it is not desirable for the melting temperature or clarification temperature to be lower than the liquidus temperature of the glass for a long period of time.

After agitating and clarifying the molten glass, the glass is poured out, gradually cooled, and then molded into a prescribed shape. It is preferable to pour the glass out after cooling the glass to a temperature close to the liquidus temperature and increasing the viscosity of the glass because convection is less likely to occur in the poured out glass and striation is less likely to occur. The gradual cooling speed can be selected within the range −50° C./hr to −1° C./hr, and can be −30° C./hr or −10° C./hr.

Well-known methods such as casting, pipe outflow, rolling and pressing can be used as the method for molding the glass. The molded glass is transferred to an annealing furnace that has been heated in advance to a temperature close to the transition temperature of the glass, and allowed to cool gradually to room temperature. A near-infrared cut filter can be produced in this way.

An example of a molding method will be explained below. A mold is prepared so as to be configured from: a flat horizontal bottom surface; a pair of side walls which face each other in parallel across the bottom surface; and a barrier plate which is positioned between the pair of side walls and blocks one opening part. A homogenized molten glass is poured into this mold from a platinum alloy pipe at a fixed outflow speed. The poured molten glass spreads inside the mold, and a glass plate is formed so as to have a fixed width that is regulated by the pair of side walls. The formed glass plate is continuously drawn from the opening of the mold. By appropriately specifying molding conditions such as the shape and dimensions of the mold and the outflow speed of the molten glass, it is possible to form a large, thick glass block. The molded glass body is transferred to an annealing furnace that has been heated in advance to a temperature close to the glass transition temperature of the molded body, and allowed to cool gradually to room temperature. The molded glass body, in which strain has been eliminated through gradual cooling, is subjected to mechanical processing such as slicing, grinding and polishing. In this way, it is possible to obtain a near-infrared cut filter having a shape that is suitable for an application, such as plate-shaped or lens-shaped. Alternatively, it is also possible to use a method comprising molding a preform from the above glass, and then heating, softening and press molding the preform (in particular, a precision press molding method comprising press molding a finished product without subjecting an optically functional surface to mechanical processing such as grinding or polishing). An optical multilayer film may, if necessary, be formed on a surface of the filter.

The above near-infrared cut filter can exhibit both excellent near-infrared cutting performance and high transmittance of light in the visible region. According to this near-infrared cut filter, the color sensitivity of a semiconductor image element can be favorably corrected.

In addition, the above near-infrared cut filter can also be combined with a semiconductor image sensor and used in an imaging device. A semiconductor image sensor is a product obtained by attaching a semiconductor image element such as a CCD or a CMOS in a package and then covering a light-receiving part with a translucent member. The near-infrared cut filter can also serve as the translucent member, or the translucent member and the near-infrared cut filter can be separate components.

The imaging device described above can comprise a lens for forming an image of a subject on a light-receiving surface of a semiconductor image sensor, or an optical element such as a prism.

According to the above near-infrared cut filter, it is possible to provide an imaging device in which color sensitivity correction can be favorably achieved and which can yield an image having excellent image quality.

In one embodiment, the above near-infrared cut filter can be a near-infrared cut filter having a thickness of 0.25 mm or less. With the appearance of smartphones in recent years, the trend for the camera thickness of image elements to become smaller has been remarkable, and this has led to demands for near-infrared cut filters to exhibit performance at lower thicknesses. The above near-infrared cut filter is suitable for use as this type of near-infrared cut filter. The thickness of the above near-infrared cut filter can be 0.24 mm or less, 0.23 mm or less, 0.22 mm or less, 0.21 mm or less, 0.20 mm or less, 0.19 mm or less, 0.18 mm or less, 0.17 mm or less, 0.16 mm or less, 0.15 mm or less, 0.14 mm or less, 0.13 mm or less, or 0.12 mm or less. The thickness of the above near-infrared cut filter can be, for example, 0.21 mm or 0.11 mm. In addition, the thickness of the above near-infrared cut filter can be, for example, 0.50 mm or more, but the thickness is not limited to this. In the present invention and the present description, the term "thickness" means the thickness of a sample in a region where transmittance is measured, and can be measured using a thickness gauge, a micrometer, or the like. For example, the thickness may be measured at the approximate center of a position through which transmitted light passes, or the thickness of multiple points within a spot of transmitted light may be measured, with the average value of these measurements used.

For transmittance characteristics of the above near-infrared cut filter, earlier descriptions relating to Glasses 1 to 6 can be referred. For physical properties of the above near-infrared cut filter, earlier descriptions relating to Glasses 1 to 6 can be referred.

EXAMPLES

The present invention will be explained in further detail below through the use of Examples. However, the present invention is not limited to embodiments in Examples.

Examples 1 to 66 and Comparative Examples X and a to D

As glass raw materials, phosphates, fluorides, carbonates, nitrates, oxides, and the like, were weighed out and mixed so as to obtain 150 g to 300 g of a glass having a composition shown in Table 1, the obtained mixture was placed in a platinum crucible or a quartz crucible, melted for 80 minutes to 100 minutes at 800° C. to 1000° C., defoamed and homogenized by being agitated, and then flowed onto a preheated mold and molded into a prescribed shape. The obtained glass molded body was transferred to an annealing furnace that had been heated to a temperature close to the glass transition temperature and gradually cooled to room temperature. A test piece was cut from the obtained glass, both surfaces of the test piece were polished to a mirror finish to attain a thickness of approximately 0.2 mm, and evaluations were then carried out using the following methods.

Evaluation Methods

<Transmittance Characteristics>

Transmittance of test pieces were measured at wavelengths of 200 to 1200 nm using a spectrophotometer. From the measurement results, half values (units: nm), T400, T600, T1200 and Ave. T1100-800 (units: %) were determined as values calculated at half values of 645 nm and 633 nm and calculated at thicknesses of 0.11 mm, 0.21 mm, 0.23 mm and 0.25 mm.

<Glass Transition Temperature Tg and Temperature Tm at which an Endothermic Reaction Concludes Due to Melting>

Using a differential scanning calorimeter produced by Rigaku (DSC8270), the glass transition temperature Tg and the temperature Tm at which an endothermic reaction concludes due to melting were measured at a temperature increase rate of 10° C./min. The measurement temperature range was from room temperature to 1050° C.

<Specific Gravity>

Specific gravity was measured using the Archimedes method.

<Molar Volume>

Molar volume was calculated from the measured specific gravity using the method described above.

<Weathering Resistance Evaluation Classifications>

Each test piece was held for 3.5 hours in a constant-temperature constant-humidity chamber at a temperature of 85° C. and a relative humidity of 85%. The appearance of the test pieces was then evaluated by eye under a fluorescent lamp. Weathering resistance was evaluated from the evaluation results using the following criteria.

S: Clouding and/or precipitates seen at the surface were extremely slight.

A: Clouding and/or precipitates seen at the surface were slight.

B: Strong clouding was seen at the surface and/or precipitates were generated.

C: Surface wetting that indicated deliquescence was observed, albeit to a low degree, and/or thick precipitates were produced.

D: Deliquescence occurred to an extent whereby clear sheet thickness reduction was not observed, and/or precipitates that covered the base glass were produced.

E: Deliquescence occurred to an extent whereby a clear sheet thickness reduction was observed, and/or precipitates were produced to such an extent that the base glass could not be seen.

TABLE 1

| Example Comparative Example No | $P_2O_5$ (mol %) | $Li_2O$ (mol %) | CuO (mol %) | $Al_2O_3$ (mol %) | $Y_2O_3$ (mol %) | $La_2O_3$ (mol %) | $Gd_2O_3$ (mol %) | $Na_2O$ (mol %) | $K_2O$ (mol %) | MgO (mol %) | CaO (mol %) | SrO (mol %) | BaO (mol %) | ZnO (mol %) |
|---|---|---|---|---|---|---|---|---|---|---|---|---|---|---|
| Example 1 | 61.36 | 10.15 | 26.31 | 1.45 | 0.50 | 0.22 | 0.00 | 0.00 | 0.00 | 0.00 | 0.00 | 0.00 | 0.00 | 0.00 |
| Example 2 | 59.16 | 10.34 | 26.80 | 1.48 | 0.00 | 0.00 | 0.00 | 0.00 | 0.00 | 2.22 | 0.00 | 0.00 | 0.00 | 0.00 |
| Example 3 | 60.04 | 10.50 | 27.21 | 1.50 | 0.52 | 0.23 | 0.00 | 0.00 | 0.00 | 0.00 | 0.00 | 0.00 | 0.00 | 0.00 |
| Example 4 | 57.87 | 10.67 | 27.65 | 1.52 | 0.00 | 0.00 | 0.00 | 0.00 | 0.00 | 2.29 | 0.00 | 0.00 | 0.00 | 0.00 |
| Example 5 | 58.76 | 10.83 | 28.08 | 1.55 | 0.54 | 0.23 | 0.00 | 0.00 | 0.00 | 0.00 | 0.00 | 0.00 | 0.00 | 0.00 |
| Example 6 | 57.56 | 11.15 | 28.90 | 1.60 | 0.55 | 0.24 | 0.00 | 0.00 | 0.00 | 0.00 | 0.00 | 0.00 | 0.00 | 0.00 |
| Example 7 | 56.61 | 10.99 | 28.48 | 1.57 | 0.00 | 0.00 | 0.00 | 0.00 | 0.00 | 2.35 | 0.00 | 0.00 | 0.00 | 0.00 |
| Example 8 | 57.72 | 7.87 | 30.59 | 0.00 | 2.68 | 1.14 | 0.00 | 0.00 | 0.00 | 0.00 | 0.00 | 0.00 | 0.00 | 0.00 |
| Example 9 | 56.73 | 10.31 | 30.06 | 0.00 | 2.03 | 0.87 | 0.00 | 0.00 | 0.00 | 0.00 | 0.00 | 0.00 | 0.00 | 0.00 |
| Example 10 | 57.22 | 9.10 | 30.32 | 0.00 | 2.36 | 1.00 | 0.00 | 0.00 | 0.00 | 0.00 | 0.00 | 0.00 | 0.00 | 0.00 |
| Example 11 | 58.23 | 6.62 | 30.86 | 0.00 | 3.01 | 1.29 | 0.00 | 0.00 | 0.00 | 0.00 | 0.00 | 0.00 | 0.00 | 0.00 |
| Example 12 | 56.24 | 11.50 | 29.81 | 0.00 | 1.72 | 0.73 | 0.00 | 0.00 | 0.00 | 0.00 | 0.00 | 0.00 | 0.00 | 0.00 |
| Example 13 | 56.24 | 11.50 | 29.81 | 0.00 | 1.47 | 0.98 | 0.00 | 0.00 | 0.00 | 0.00 | 0.00 | 0.00 | 0.00 | 0.00 |
| Example 14 | 56.24 | 11.50 | 29.81 | 0.00 | 1.96 | 0.49 | 0.00 | 0.00 | 0.00 | 0.00 | 0.00 | 0.00 | 0.00 | 0.00 |
| Example 15 | 56.24 | 11.50 | 29.81 | 0.00 | 2.20 | 0.25 | 0.00 | 0.00 | 0.00 | 0.00 | 0.00 | 0.00 | 0.00 | 0.00 |
| Example 16 | 56.24 | 11.50 | 29.81 | 0.00 | 2.45 | 0.00 | 0.00 | 0.00 | 0.00 | 0.00 | 0.00 | 0.00 | 0.00 | 0.00 |
| Example 17 | 56.24 | 11.50 | 29.80 | 0.83 | 1.14 | 0.49 | 0.00 | 0.00 | 0.00 | 0.00 | 0.00 | 0.00 | 0.00 | 0.00 |
| Example 18 | 56.24 | 11.50 | 29.80 | 1.23 | 0.86 | 0.37 | 0.00 | 0.00 | 0.00 | 0.00 | 0.00 | 0.00 | 0.00 | 0.00 |
| Example 19 | 56.24 | 11.50 | 29.80 | 0.42 | 1.43 | 0.61 | 0.00 | 0.00 | 0.00 | 0.00 | 0.00 | 0.00 | 0.00 | 0.00 |
| Example 20 | 56.24 | 11.50 | 29.80 | 1.65 | 0.25 | 0.57 | 0.00 | 0.00 | 0.00 | 0.00 | 0.00 | 0.00 | 0.00 | 0.00 |
| Example 21 | 56.24 | 11.50 | 29.80 | 1.65 | 0.57 | 0.25 | 0.00 | 0.00 | 0.00 | 0.00 | 0.00 | 0.00 | 0.00 | 0.00 |
| Example 22 | 56.24 | 11.50 | 29.80 | 2.46 | 0.00 | 0.00 | 0.00 | 0.00 | 0.00 | 0.00 | 0.00 | 0.00 | 0.00 | 0.00 |
| Example 23 | 55.33 | 16.23 | 24.40 | 1.62 | 0.00 | 0.00 | 0.00 | 0.00 | 0.00 | 2.42 | 0.00 | 0.00 | 0.00 | 0.00 |
| Example 24 | 55.33 | 11.31 | 29.32 | 1.62 | 0.00 | 0.00 | 0.00 | 0.00 | 0.00 | 2.42 | 0.00 | 0.00 | 0.00 | 0.00 |
| Example 25 | 56.24 | 11.50 | 21.44 | 1.65 | 0.57 | 0.25 | 0.00 | 0.00 | 0.00 | 0.00 | 0.00 | 0.00 | 8.37 | 0.00 |
| Example 26 | 56.24 | 11.50 | 22.48 | 1.65 | 0.57 | 0.25 | 0.00 | 0.00 | 0.00 | 0.00 | 0.00 | 0.00 | 7.33 | 0.00 |
| Example 27 | 56.24 | 20.55 | 20.76 | 1.65 | 0.57 | 0.25 | 0.00 | 0.00 | 0.00 | 0.00 | 0.00 | 0.00 | 0.00 | 0.00 |
| Example 28 | 56.24 | 19.87 | 21.44 | 1.65 | 0.57 | 0.25 | 0.00 | 0.00 | 0.00 | 0.00 | 0.00 | 0.00 | 0.00 | 0.00 |
| Example 29 | 53.59 | 15.72 | 23.64 | 0.00 | 0.00 | 0.00 | 0.00 | 0.00 | 0.00 | 2.35 | 0.00 | 0.00 | 4.71 | 0.00 |
| Example 30 | 53.59 | 15.72 | 23.64 | 0.00 | 0.00 | 0.00 | 0.00 | 0.00 | 0.00 | 4.70 | 0.00 | 0.00 | 2.35 | 0.00 |
| Example 31 | 53.59 | 9.23 | 23.64 | 0.00 | 0.00 | 0.00 | 0.00 | 0.00 | 0.00 | 0.00 | 13.55 | 0.00 | 0.00 | 0.00 |
| Example 32 | 53.59 | 9.23 | 23.64 | 0.00 | 0.00 | 0.00 | 0.00 | 0.00 | 0.00 | 0.00 | 0.00 | 13.55 | 0.00 | 0.00 |
| Example 33 | 53.59 | 9.23 | 23.64 | 0.00 | 0.00 | 0.00 | 0.00 | 0.00 | 0.00 | 0.00 | 0.00 | 0.00 | 13.55 | 0.00 |
| Example 34 | 56.35 | 9.71 | 31.37 | 2.57 | 0.00 | 0.00 | 0.00 | 0.00 | 0.00 | 0.00 | 0.00 | 0.00 | 0.00 | 0.00 |
| Example 35 | 54.44 | 15.97 | 24.01 | 0.80 | 0.00 | 0.00 | 0.00 | 0.00 | 0.00 | 4.78 | 0.00 | 0.00 | 0.00 | 0.00 |
| Example 36 | 55.27 | 11.75 | 30.46 | 1.68 | 0.58 | 0.25 | 0.00 | 0.00 | 0.00 | 0.00 | 0.00 | 0.00 | 0.00 | 0.00 |
| Example 37 | 54.34 | 11.56 | 29.97 | 1.65 | 0.00 | 0.00 | 0.00 | 0.00 | 0.00 | 2.48 | 0.00 | 0.00 | 0.00 | 0.00 |
| Example 38 | 57.72 | 10.56 | 25.97 | 5.65 | 0.00 | 0.00 | 0.00 | 0.00 | 0.00 | 0.00 | 0.00 | 0.00 | 0.00 | 0.00 |

TABLE 1-continued

| Example Comparative Example No | $P_2O_5$ (mol %) | $Li_2O$ (mol %) | CuO (mol %) | $Al_2O_3$ (mol %) | $Y_2O_3$ (mol %) | $La_2O_3$ (mol %) | $Gd_2O_3$ (mol %) | $Na_2O$ (mol %) | $K_2O$ (mol %) | MgO (mol %) | CaO (mol %) | SrO (mol %) | BaO (mol %) | ZnO (mol %) |
|---|---|---|---|---|---|---|---|---|---|---|---|---|---|---|
| Example 39 | 54.63 | 10.09 | 32.61 | 2.67 | 0.00 | 0.00 | 0.00 | 0.00 | 0.00 | 0.00 | 0.00 | 0.00 | 0.00 | 0.00 |
| Example 40 | 54.17 | 12.04 | 31.21 | 1.73 | 0.60 | 0.26 | 0.00 | 0.00 | 0.00 | 0.00 | 0.00 | 0.00 | 0.00 | 0.00 |
| Example 41 | 53.19 | 12.30 | 31.88 | 1.76 | 0.61 | 0.26 | 0.00 | 0.00 | 0.00 | 0.00 | 0.00 | 0.00 | 0.00 | 0.00 |
| Example 42 | 55.89 | 16.92 | 21.29 | 5.90 | 0.00 | 0.00 | 0.00 | 0.00 | 0.00 | 0.00 | 0.00 | 0.00 | 0.00 | 0.00 |
| Example 43 | 55.89 | 22.72 | 15.49 | 5.90 | 0.00 | 0.00 | 0.00 | 0.00 | 0.00 | 0.00 | 0.00 | 0.00 | 0.00 | 0.00 |
| Example 44 | 52.07 | 8.48 | 26.70 | 2.25 | 0.00 | 0.00 | 0.00 | 2.56 | 5.11 | 0.83 | 0.00 | 0.00 | 1.64 | 0.37 |
| Example 45 | 55.42 | 22.23 | 15.48 | 5.90 | 0.00 | 0.00 | 0.00 | 0.00 | 0.00 | 0.00 | 0.00 | 0.00 | 0.00 | 0.96 |
| Example 46 | 52.18 | 12.56 | 32.56 | 1.80 | 0.62 | 0.27 | 0.00 | 0.00 | 0.00 | 0.00 | 0.00 | 0.00 | 0.00 | 0.00 |
| Example 47 | 52.89 | 23.50 | 16.37 | 6.24 | 0.00 | 0.00 | 0.00 | 0.00 | 0.00 | 0.00 | 0.00 | 0.00 | 0.00 | 1.02 |
| Example 48 | 50.85 | 25.32 | 17.26 | 6.57 | 0.00 | 0.00 | 0.00 | 0.00 | 0.00 | 0.00 | 0.00 | 0.00 | 0.00 | 0.00 |
| Example 49 | 50.32 | 24.78 | 17.26 | 6.58 | 0.00 | 0.00 | 0.00 | 0.00 | 0.00 | 0.00 | 0.00 | 0.00 | 0.00 | 1.07 |
| Example 50 | 51.36 | 5.60 | 26.83 | 1.48 | 0.00 | 0.00 | 0.00 | 4.28 | 8.57 | 0.54 | 0.00 | 0.00 | 1.08 | 0.25 |
| Example 51 | 52.52 | 21.41 | 14.07 | 5.68 | 0.00 | 0.00 | 0.00 | 0.00 | 0.00 | 0.00 | 0.00 | 0.00 | 0.00 | 6.33 |
| Example 52 | 49.60 | 19.99 | 13.70 | 5.31 | 0.00 | 0.00 | 0.00 | 0.00 | 0.00 | 0.00 | 0.00 | 0.00 | 0.00 | 11.40 |
| Example 53 | 56.24 | 8.50 | 32.80 | 1.65 | 0.57 | 0.25 | 0.00 | 0.00 | 0.00 | 0.00 | 0.00 | 0.00 | 0.00 | 0.00 |
| Example 54 | 56.24 | 5.50 | 35.80 | 1.65 | 0.57 | 0.25 | 0.00 | 0.00 | 0.00 | 0.00 | 0.00 | 0.00 | 0.00 | 0.00 |
| Example 55 | 56.24 | 2.50 | 38.80 | 1.65 | 0.57 | 0.25 | 0.00 | 0.00 | 0.00 | 0.00 | 0.00 | 0.00 | 0.00 | 0.00 |
| Example 56 | 53.66 | 15.03 | 14.16 | 3.98 | 0.00 | 0.00 | 0.00 | 2.71 | 5.42 | 1.46 | 0.00 | 0.00 | 2.92 | 0.66 |
| Example 57 | 52.92 | 12.01 | 14.23 | 3.18 | 0.00 | 0.00 | 0.00 | 4.54 | 9.09 | 1.17 | 0.00 | 0.00 | 2.33 | 0.52 |
| Example 58 | 52.18 | 8.95 | 14.31 | 2.37 | 0.00 | 0.00 | 0.00 | 6.40 | 12.79 | 0.87 | 0.00 | 0.00 | 1.74 | 0.39 |
| Example 59 | 53.59 | 15.72 | 23.64 | 0.00 | 0.00 | 0.00 | 0.00 | 0.00 | 0.00 | 7.05 | 0.00 | 0.00 | 0.00 | 0.00 |
| Example 60 | 53.59 | 9.23 | 23.64 | 0.00 | 0.00 | 0.00 | 0.00 | 0.00 | 0.00 | 0.00 | 0.00 | 0.00 | 0.00 | 13.55 |
| Comp. Ex. X | 50.67 | 2.76 | 14.45 | 0.73 | 0.00 | 0.00 | 0.00 | 10.15 | 20.30 | 0.27 | 0.00 | 0.00 | 0.54 | 0.12 |
| Comp. Ex. A | 53.59 | 19.30 | 27.11 | 0.00 | 0.00 | 0.00 | 0.00 | 0.00 | 0.00 | 0.00 | 0.00 | 0.00 | 0.00 | 0.00 |
| Comp. Ex. B | 53.59 | 12.73 | 33.68 | 0.00 | 0.00 | 0.00 | 0.00 | 0.00 | 0.00 | 0.00 | 0.00 | 0.00 | 0.00 | 0.00 |
| Comp. Ex. C | 53.59 | 22.77 | 23.64 | 0.00 | 0.00 | 0.00 | 0.00 | 0.00 | 0.00 | 0.00 | 0.00 | 0.00 | 0.00 | 0.00 |
| Comp. Ex. D | 36.07 | 23.63 | 9.87 | 3.32 | 0.00 | 0.00 | 0.00 | 0.00 | 10.45 | 2.74 | 5.31 | 1.99 | 6.61 | 0.00 |
| Example 61 | 51.65 | 1.09 | 16.9 | 1.66 | 0.00 | 0.00 | 0.00 | 0.00 | 0.00 | 0.00 | 0.00 | 0.00 | 28.63 | 0.00 |
| Example 62 | 51.16 | 1.10 | 16.2 | 1.50 | 0.44 | 0.20 | 0.00 | 0.00 | 0.00 | 0.00 | 0.00 | 0.00 | 29.40 | 0.00 |
| Example 63 | 53.00 | 1.28 | 17.7 | 2.97 | 0.00 | 0.00 | 0.00 | 0.00 | 2.63 | 0.00 | 0.00 | 0.00 | 22.34 | 0.00 |
| Example 64 | 51.16 | 1.16 | 20.7 | 1.50 | 0.44 | 0.20 | 0.00 | 0.00 | 0.00 | 0.00 | 0.00 | 0.00 | 24.85 | 0.00 |
| Example 65 | 50.60 | 0.40 | 17.8 | 2.80 | 0.46 | 0.21 | 0.00 | 0.00 | 0.80 | 0.00 | 0.00 | 0.00 | 26.89 | 0.00 |
| Example 66 | 50.79 | 0.40 | 17.82 | 1.53 | 0.99 | 0.46 | 0.00 | 0.00 | 0.78 | 0.00 | 0.00 | 0.00 | 27.19 | 0.00 |

TABLE 2

| Example Comparative Example No | $B_2O_3$ (mol %) | $SiO_2$ (mol %) | $Ta_2O_5$ (mol %) | $TiO_2$ (mol %) | $ZrO_2$ (mol %) | $Nb_2O_5$ (mol %) | $WO_3$ (mol %) | $Bi_2O_3$ (mol %) | $Cs_2O$ (mol %) | $V_2O_5$ (mol %) | Total (mol %) | Molar molecular weight M(g/mol) | Specific gravity (g/cc) | Molar volume (cc/mol) | Number of cations selected from main cation group | O/P ratio | Total content of oxides of main cations (mo %) | O ion content (anionic %) |
|---|---|---|---|---|---|---|---|---|---|---|---|---|---|---|---|---|---|---|
| Example 1 | 0.00 | 0.00 | 0.00 | 0.00 | 0.00 | 0.00 | 0.00 | 0.00 | 0.00 | 0.00 | 100 | 114.39 | 2.78 | 41.103 | 6 | 2.850 | 100.00 | 100.00 |
| Example 2 | 0.00 | 0.00 | 0.00 | 0.00 | 0.00 | 0.00 | 0.00 | 0.00 | 0.00 | 0.00 | 100 | 110.79 | 2.78 | 39.823 | 5 | 2.870 | 100.00 | 100.00 |
| Example 3 | 0.00 | 0.00 | 0.00 | 0.00 | 0.00 | 0.00 | 0.00 | 0.00 | 0.00 | 0.00 | 100 | 113.45 | 2.80 | 40.517 | 6 | 2.870 | 100.00 | 100.00 |
| Example 4 | 0.00 | 0.00 | 0.00 | 0.00 | 0.00 | 0.00 | 0.00 | 0.00 | 0.00 | 0.00 | 100 | 109.80 | 2.80 | 39.202 | 5 | 2.890 | 100.00 | 100.00 |
| Example 5 | 0.00 | 0.00 | 0.00 | 0.00 | 0.00 | 0.00 | 0.00 | 0.00 | 0.00 | 0.00 | 100 | 112.54 | 2.82 | 39.908 | 6 | 2.890 | 100.00 | 100.00 |
| Example 6 | 0.00 | 0.00 | 0.00 | 0.00 | 0.00 | 0.00 | 0.00 | 0.00 | 0.00 | 0.00 | 100 | 111.68 | 2.84 | 39.379 | 6 | 2.910 | 100.00 | 100.00 |
| Example 7 | 0.00 | 0.00 | 0.00 | 0.00 | 0.00 | 0.00 | 0.00 | 0.00 | 0.00 | 0.00 | 100 | 108.84 | 2.82 | 38.583 | 5 | 2.911 | 100.00 | 100.00 |
| Example 8 | 0.00 | 0.00 | 0.00 | 0.00 | 0.00 | 0.00 | 0.00 | 0.00 | 0.00 | 0.00 | 100 | 118.39 | 2.94 | 40.269 | 5 | 2.933 | 100.00 | 100.00 |
| Example 9 | 0.00 | 0.00 | 0.00 | 0.00 | 0.00 | 0.00 | 0.00 | 0.00 | 0.00 | 0.00 | 100 | 114.93 | 2.91 | 39.537 | 5 | 2.933 | 100.00 | 100.00 |
| Example 10 | 0.00 | 0.00 | 0.00 | 0.00 | 0.00 | 0.00 | 0.00 | 0.00 | 0.00 | 0.00 | 100 | 116.65 | 2.93 | 39.866 | 5 | 2.933 | 100.00 | 100.00 |
| Example 11 | 0.00 | 0.00 | 0.00 | 0.00 | 0.00 | 0.00 | 0.00 | 0.00 | 0.00 | 0.00 | 100 | 120.17 | 2.95 | 40.679 | 5 | 2.933 | 100.00 | 100.00 |
| Example 12 | 0.00 | 0.00 | 0.00 | 0.00 | 0.00 | 0.00 | 0.00 | 0.00 | 0.00 | 0.00 | 100 | 113.25 | 2.89 | 39.132 | 5 | 2.933 | 100.00 | 100.00 |
| Example 13 | 0.00 | 0.00 | 0.00 | 0.00 | 0.00 | 0.00 | 0.00 | 0.00 | 0.00 | 0.00 | 100 | 113.49 | 2.90 | 39.149 | 5 | 2.933 | 100.00 | 100.00 |
| Example 14 | 0.00 | 0.00 | 0.00 | 0.00 | 0.00 | 0.00 | 0.00 | 0.00 | 0.00 | 0.00 | 100 | 113.01 | 2.89 | 39.117 | 5 | 2.933 | 100.00 | 100.00 |
| Example 15 | 0.00 | 0.00 | 0.00 | 0.00 | 0.00 | 0.00 | 0.00 | 0.00 | 0.00 | 0.00 | 100 | 112.76 | 2.88 | 39.140 | 5 | 2.933 | 100.00 | 100.00 |
| Example 16 | 0.00 | 0.00 | 0.00 | 0.00 | 0.00 | 0.00 | 0.00 | 0.00 | 0.00 | 0.00 | 100 | 112.51 | 2.88 | 39.122 | 4 | 2.933 | 100.00 | 100.00 |
| Example 17 | 0.00 | 0.00 | 0.00 | 0.00 | 0.00 | 0.00 | 0.00 | 0.00 | 0.00 | 0.00 | 100 | 112.00 | 2.88 | 38.914 | 6 | 2.933 | 100.00 | 100.00 |
| Example 18 | 0.00 | 0.00 | 0.00 | 0.00 | 0.00 | 0.00 | 0.00 | 0.00 | 0.00 | 0.00 | 100 | 111.38 | 2.87 | 38.843 | 6 | 2.933 | 100.00 | 100.00 |
| Example 19 | 0.00 | 0.00 | 0.00 | 0.00 | 0.00 | 0.00 | 0.00 | 0.00 | 0.00 | 0.00 | 100 | 112.62 | 2.89 | 39.023 | 6 | 2.933 | 100.00 | 100.00 |
| Example 20 | 0.00 | 0.00 | 0.00 | 0.00 | 0.00 | 0.00 | 0.00 | 0.00 | 0.00 | 0.00 | 100 | 111.06 | 2.87 | 38.697 | 6 | 2.933 | 100.00 | 100.00 |
| Example 21 | 0.00 | 0.00 | 0.00 | 0.00 | 0.00 | 0.00 | 0.00 | 0.00 | 0.00 | 0.00 | 100 | 110.74 | 2.86 | 38.719 | 6 | 2.933 | 100.00 | 100.00 |
| Example 22 | 0.00 | 0.00 | 0.00 | 0.00 | 0.00 | 0.00 | 0.00 | 0.00 | 0.00 | 0.00 | 100 | 109.48 | 2.84 | 38.522 | 4 | 2.933 | 100.00 | 100.00 |
| Example 23 | 0.00 | 0.00 | 0.00 | 0.00 | 0.00 | 0.00 | 0.00 | 0.00 | 0.00 | 0.00 | 100 | 105.42 | 2.77 | 38.113 | 5 | 2.933 | 100.00 | 100.00 |
| Example 24 | 0.00 | 0.00 | 0.00 | 0.00 | 0.00 | 0.00 | 0.00 | 0.00 | 0.00 | 0.00 | 100 | 107.86 | 2.84 | 38.020 | 5 | 2.933 | 100.00 | 100.00 |
| Example 25 | 0.00 | 0.00 | 0.00 | 0.00 | 0.00 | 0.00 | 0.00 | 0.00 | 0.00 | 0.00 | 100 | 116.92 | 2.95 | 39.606 | 7 | 2.933 | 100.01 | 100.00 |
| Example 26 | 0.00 | 0.00 | 0.00 | 0.00 | 0.00 | 0.00 | 0.00 | 0.00 | 0.00 | 0.00 | 100 | 116.15 | 2.94 | 39.484 | 7 | 2.933 | 100.01 | 100.00 |
| Example 27 | 0.00 | 0.00 | 0.00 | 0.00 | 0.00 | 0.00 | 0.00 | 0.00 | 0.00 | 0.00 | 100 | 106.25 | 2.73 | 38.962 | 6 | 2.933 | 100.01 | 100.00 |
| Example 28 | 0.00 | 0.00 | 0.00 | 0.00 | 0.00 | 0.00 | 0.00 | 0.00 | 0.00 | 0.00 | 100 | 103.59 | 2.74 | 38.957 | 6 | 2.933 | 100.01 | 100.00 |
| Example 29 | 0.00 | 0.00 | 0.00 | 0.00 | 0.00 | 0.00 | 0.00 | 0.00 | 0.00 | 0.00 | 100 | 107.73 | 2.87 | 37.602 | 5 | 2.933 | 100.00 | 100.00 |
| Example 30 | 0.00 | 0.00 | 0.00 | 0.00 | 0.00 | 0.00 | 0.00 | 0.00 | 0.00 | 0.00 | 100 | 105.07 | 2.81 | 37.378 | 5 | 2.933 | 100.00 | 100.00 |
| Example 31 | 0.00 | 0.00 | 0.00 | 0.00 | 0.00 | 0.00 | 0.00 | 0.00 | 0.00 | 0.00 | 100 | 105.22 | 2.80 | 37.606 | 4 | 2.933 | 100.00 | 100.00 |
| Example 32 | 0.00 | 0.00 | 0.00 | 0.00 | 0.00 | 0.00 | 0.00 | 0.00 | 0.00 | 0.00 | 100 | 111.68 | 2.98 | 37.446 | 4 | 2.933 | 100.00 | 100.00 |
| Example 33 | 0.00 | 0.00 | 0.00 | 0.00 | 0.00 | 0.00 | 0.00 | 0.00 | 0.00 | 0.00 | 100 | 118.40 | 3.09 | 38.316 | 4 | 2.933 | 100.00 | 100.00 |
| Example 34 | 0.00 | 0.00 | 0.00 | 0.00 | 0.00 | 0.00 | 0.00 | 0.00 | 0.00 | 0.00 | 100 | 110.46 | 2.87 | 38.448 | 4 | 2.933 | 100.00 | 100.00 |
| Example 35 | 0.00 | 0.00 | 0.00 | 0.00 | 0.00 | 0.00 | 0.00 | 0.00 | 0.00 | 0.00 | 100 | 103.89 | 2.76 | 37.601 | 5 | 2.933 | 100.00 | 100.00 |
| Example 36 | 0.00 | 0.00 | 0.00 | 0.00 | 0.00 | 0.00 | 0.00 | 0.00 | 0.00 | 0.00 | 100 | 110.05 | 2.87 | 38.305 | 6 | 2.950 | 100.00 | 100.00 |
| Example 37 | 0.00 | 0.00 | 0.00 | 0.00 | 0.00 | 0.00 | 0.00 | 0.00 | 0.00 | 0.00 | 100 | 107.11 | 2.85 | 37.530 | 5 | 2.951 | 100.00 | 100.00 |
| Example 38 | 0.00 | 0.00 | 0.00 | 0.00 | 0.00 | 0.00 | 0.00 | 0.00 | 0.00 | 0.00 | 100 | 111.54 | 2.83 | 39.440 | 4 | 2.964 | 100.00 | 100.00 |
| Example 39 | 0.00 | 0.00 | 0.00 | 0.00 | 0.00 | 0.00 | 0.00 | 0.00 | 0.00 | 0.00 | 100 | 109.22 | 2.90 | 37.677 | 4 | 2.964 | 100.00 | 100.00 |
| Example 40 | 0.00 | 0.00 | 0.00 | 0.00 | 0.00 | 0.00 | 0.00 | 0.00 | 0.00 | 0.00 | 100 | 109.27 | 2.90 | 37.730 | 6 | 2.971 | 100.00 | 100.00 |
| Example 41 | 0.00 | 0.00 | 0.00 | 0.00 | 0.00 | 0.00 | 0.00 | 0.00 | 0.00 | 0.00 | 100 | 108.56 | 2.91 | 37.256 | 6 | 2.990 | 100.00 | 100.00 |
| Example 42 | 0.00 | 0.00 | 0.00 | 0.00 | 0.00 | 0.00 | 0.00 | 0.00 | 0.00 | 0.00 | 100 | 107.34 | 2.77 | 38.794 | 4 | 3.000 | 100.00 | 100.00 |
| Example 43 | 0.00 | 0.00 | 0.00 | 0.00 | 0.00 | 0.00 | 0.00 | 0.00 | 0.00 | 0.00 | 100 | 104.48 | 2.68 | 38.935 | 4 | 3.000 | 100.00 | 100.00 |
| Example 44 | 0.00 | 0.00 | 0.00 | 0.00 | 0.00 | 0.00 | 0.00 | 0.00 | 0.00 | 0.00 | 100 | 109.52 | 2.88 | 38.095 | 9 | 3.004 | 100.00 | 100.00 |
| Example 45 | 0.00 | 0.00 | 0.00 | 0.00 | 0.00 | 0.00 | 0.00 | 0.00 | 0.00 | 0.00 | 100 | 104.43 | 2.70 | 38.676 | 5 | 3.009 | 100.00 | 100.00 |
| Example 46 | 0.00 | 0.00 | 0.00 | 0.00 | 0.00 | 0.00 | 0.00 | 0.00 | 0.00 | 0.00 | 100 | 107.85 | 2.94 | 36.745 | 6 | 3.010 | 100.00 | 100.00 |

TABLE 2-continued

| Example Comparative Example No | $B_2O_3$ (mol %) | $SiO_2$ (mol %) | $Ta_2O_5$ (mol %) | $TiO_2$ (mol %) | $ZrO_2$ (mol %) | $Nb_2O_5$ (mol %) | $WO_3$ (mol %) | $Bi_2O_3$ (mol %) | $Cs_2O$ (mol %) | $V_2O_5$ (mol %) | Total (mol %) | Molar molecular weight M(g/mol) | Specific gravity (g/cc) | Molar volume (cc/mol) | Number of cations selected from main cation group | O/P ratio | Total content of oxides of main cations (mo %) | O ion content (anionic %) |
|---|---|---|---|---|---|---|---|---|---|---|---|---|---|---|---|---|---|---|
| Example 47 | 0.00 | 0.00 | 0.00 | 0.00 | 0.00 | 0.00 | 0.00 | 0.00 | 0.00 | 0.00 | 100 | 102.29 | 2.73 | 37.484 | 5 | 3.063 | 100.00 | 100.00 |
| Example 48 | 0.00 | 0.00 | 0.00 | 0.00 | 0.00 | 0.00 | 0.00 | 0.00 | 0.00 | 0.00 | 100 | 100.17 | 2.74 | 36.560 | 4 | 3.113 | 100.00 | 100.00 |
| Example 49 | 0.00 | 0.00 | 0.00 | 0.00 | 0.00 | 0.00 | 0.00 | 0.00 | 0.00 | 0.00 | 100 | 100.13 | 2.76 | 36.253 | 5 | 3.124 | 100.00 | 100.00 |
| Example 50 | 0.00 | 0.00 | 0.00 | 0.00 | 0.00 | 0.00 | 0.00 | 0.00 | 0.00 | 0.00 | 100 | 110.24 | 2.85 | 38.695 | 9 | 3.002 | 100 | 100.00 |
| Example 51 | 0.00 | 0.00 | 0.00 | 0.00 | 0.00 | 0.00 | 0.00 | 0.00 | 0.00 | 0.00 | 100 | 103.07 | 2.76 | 37.414 | 5 | 3.060 | 100 | 100.00 |
| Example 52 | 0.00 | 0.00 | 0.00 | 0.00 | 0.00 | 0.00 | 0.00 | 0.00 | 0.00 | 0.00 | 100 | 101.97 | 2.83 | 36.019 | 5 | 3.115 | 100 | 100.00 |
| Example 53 | 0.00 | 0.00 | 0.00 | 0.00 | 0.00 | 0.00 | 0.00 | 0.00 | 0.00 | 0.00 | 100 | 112.23 | 2.93 | 38.290 | 6 | 2.933 | 100.00 | 100.00 |
| Example 54 | 0.00 | 0.00 | 0.00 | 0.00 | 0.00 | 0.00 | 0.00 | 0.00 | 0.00 | 0.00 | 100 | 113.72 | 2.95 | 38.509 | 6 | 2.933 | 100.00 | 100.00 |
| Example 55 | 0.00 | 0.00 | 0.00 | 0.00 | 0.00 | 0.00 | 0.00 | 0.00 | 0.00 | 0.00 | 100 | 115.21 | 2.97 | 38.751 | 6 | 2.933 | 100.00 | 100.00 |
| Example 56 | 0.00 | 0.00 | 0.00 | 0.00 | 0.00 | 0.00 | 0.00 | 0.00 | 0.00 | 0.00 | 100 | 108.37 | 2.75 | 39.421 | 9 | 3.006 | 100.00 | 100.00 |
| Example 57 | 0.00 | 0.00 | 0.00 | 0.00 | 0.00 | 0.00 | 0.00 | 0.00 | 0.00 | 0.00 | 100 | 109.12 | 2.73 | 40.046 | 9 | 3.005 | 100 | 100.00 |
| Example 58 | 0.00 | 0.00 | 0.00 | 0.00 | 0.00 | 0.00 | 0.00 | 0.00 | 0.00 | 0.00 | 100 | 109.89 | 2.70 | 40.670 | 9 | 3.004 | 100 | 100.00 |
| Example 59 | 0.00 | 0.00 | 0.00 | 0.00 | 0.00 | 0.00 | 0.00 | 0.00 | 0.00 | 0.00 | 100 | 102.41 | 2.76 | 37.091 | 4 | 2.933 | 100.00 | 100.00 |
| Example 60 | 0.00 | 0.00 | 0.00 | 0.00 | 0.00 | 0.00 | 0.00 | 0.00 | 0.00 | 0.00 | 100 | 108.85 | 2.90 | 37.505 | 4 | 2.933 | 100.00 | 100.00 |
| Comp. Ex. X | 0.00 | 0.00 | 0.00 | 0.00 | 0.00 | 0.00 | 0.00 | 0.00 | 0.00 | 0.00 | 100 | 111.44 | 2.66 | 41.958 | 9 | 3.001 | 100 | 100.00 |
| Comp. Ex. A | 0.00 | 0.00 | 0.00 | 0.00 | 0.00 | 0.00 | 0.00 | 0.00 | 0.00 | 0.00 | 100 | 103.40 | 2.79 | 37.113 | 3 | 2.933 | 100 | 100.00 |
| Comp. Ex. B | 0.00 | 0.00 | 0.00 | 0.00 | 0.00 | 0.00 | 0.00 | 0.00 | 0.00 | 0.00 | 100 | 106.66 | 2.89 | 36.882 | 3 | 2.933 | 100 | 100.00 |
| Comp. Ex. C | 0.00 | 0.00 | 0.00 | 0.00 | 0.00 | 0.00 | 0.00 | 0.00 | 0.00 | 0.00 | 100 | 101.67 | 2.73 | 37.243 | 3 | 2.933 | 100 | 100.00 |
| Comp. Ex. D | 0.00 | 0.00 | 0.00 | 0.00 | 0.00 | 0.00 | 0.00 | 0.00 | 0.00 | 0.00 | 100 | 95.62 | 2.95 | 32.413 | 9 | 3.478 | 99.99 | 100.00 |
| Example 61 | 0.00 | 0.00 | 0.00 | 0.00 | 0.00 | 0.00 | 0.00 | 0.00 | 0.00 | 0.00 | 100.0 | 132.70 | 3.40 | 39.03 | 5 | 3.00 | 100 | 100.00 |
| Example 62 | 0.00 | 0.00 | 0.00 | 0.00 | 0.00 | 0.00 | 0.00 | 0.00 | 0.00 | 0.00 | 100.0 | 134.08 | 3.42 | 39.24 | 7 | 3.02 | 100 | 100.00 |
| Example 63 | 0.00 | 0.00 | 0.00 | 0.00 | 0.00 | 0.00 | 0.00 | 0.00 | 0.00 | 0.00 | 100.0 | 129.49 | 3.25 | 39.84 | 6 | 3.00 | 100 | 100.00 |
| Example 64 | 0.00 | 0.00 | 0.00 | 0.00 | 0.00 | 0.00 | 0.00 | 0.00 | 0.00 | 0.00 | 100.0 | 130.67 | 3.39 | 38.55 | 7 | 3.02 | 100 | 100.00 |
| Example 65 | 0.00 | 0.00 | 0.00 | 0.00 | 0.00 | 0.00 | 0.00 | 0.00 | 0.00 | 0.00 | 100.0 | 132.70 | 3.30 | 39.14 | 8 | 3.06 | 100 | 100.00 |
| Example 66 | 0.00 | 0.00 | 0.00 | 0.00 | 0.00 | 0.00 | 0.00 | 0.00 | 0.00 | 0.00 | 100.0 | 134.10 | 3.43 | 39.10 | 8 | 3.04 | 100 | 100.00 |

TABLE 3

| Example Comparative Example No | $MgO + Al_2O_3$ (mol %) | $(Na_2O + K_2O + ZnO)/Li_2)$ | O(P) | O(others) | O(P) − O(others) | $A_1$ = (O(P) − O(others)) × Cu | $A_2$ = (O(P) − O(others)) × C | C (mmol/cc) | $\alpha_1$ = 70400 × exp(−2.855 × R) | $\alpha_2$ = 76522 × exp(−2.855 × R) | C − 3200 × exp(−2.278 × R) | C − 3478 × exp(−2.278 × R) |
|---|---|---|---|---|---|---|---|---|---|---|---|---|
| Example 1 | 1.45 | 0.00 | 306.788 | 42.994 | 263.794 | 6941.68 | 1688.85 | 6.40 | 20.58 | 22.37 | 1.56 | 1.14 |
| Example 2 | 3.69 | 0.00 | 295.806 | 43.795 | 252.011 | 6754.81 | 1690.23 | 6.73 | 19.45 | 21.14 | 2.10 | 1.70 |
| Example 3 | 1.50 | 0.00 | 300.182 | 44.464 | 255.718 | 6859.24 | 1717.61 | 6.72 | 19.44 | 21.13 | 2.09 | 1.69 |
| Example 4 | 3.81 | 0.00 | 289.362 | 45.177 | 244.185 | 6751.70 | 1722.29 | 7.05 | 18.36 | 19.98 | 2.83 | 2.25 |
| Example 5 | 1.55 | 0.00 | 293.822 | 45.880 | 247.942 | 6962.41 | 1744.62 | 7.04 | 18.36 | 19.95 | 2.61 | 2.23 |
| Example 6 | 1.60 | 0.00 | 287.781 | 47.224 | 240.557 | 6952.94 | 1765.65 | 7.34 | 17.34 | 18.85 | 3.11 | 2.75 |
| Example 7 | 3.92 | 0.00 | 283.059 | 46.529 | 238.530 | 6735.74 | 1745.78 | 7.38 | 17.31 | 18.81 | 3.16 | 2.79 |
| Example 8 | 0.00 | 0.00 | 288.584 | 49.934 | 238.650 | 7299.89 | 1812.77 | 7.60 | 16.27 | 17.69 | 3.58 | 3.23 |
| Example 9 | 0.00 | 0.00 | 283.629 | 49.077 | 234.552 | 7051.38 | 1783.51 | 7.80 | 16.27 | 17.68 | 3.59 | 3.24 |
| Example 10 | 0.00 | 0.00 | 286.085 | 49.502 | 236.583 | 7174.03 | 1799.55 | 7.61 | 16.27 | 17.68 | 3.59 | 3.24 |
| Example 11 | 0.00 | 0.00 | 291.127 | 50.274 | 240.752 | 7429.10 | 1826.28 | 2.59 | 16.27 | 17.69 | 3.57 | 3.22 |
| Example 12 | 0.00 | 0.00 | 281.214 | 48.660 | 232.554 | 6931.77 | 1771.40 | 7.82 | 16.27 | 17.68 | 3.60 | 3.25 |
| Example 13 | 0.00 | 0.00 | 281.214 | 48.660 | 232.554 | 8931.77 | 1770.60 | 7.61 | 16.27 | 17.69 | 3.60 | 3.25 |
| Example 14 | 0.00 | 0.00 | 281.214 | 48.860 | 232.354 | 6931.77 | 1772.07 | 7.62 | 16.27 | 17.69 | 3.60 | 3.25 |
| Example 15 | 0.00 | 0.00 | 281.214 | 48.660 | 232.354 | 6931.77 | 1771.03 | 7.62 | 16.27 | 17.69 | 3.60 | 3.25 |
| Example 16 | 0.00 | 0.00 | 281.214 | 48.660 | 232.554 | 6931.77 | 1771.83 | 7.62 | 16.27 | 17.69 | 3.60 | 3.25 |
| Example 17 | 0.83 | 0.00 | 281.190 | 48.681 | 232.509 | 6929.83 | 1780.78 | 7.66 | 16.26 | 17.67 | 3.64 | 3.30 |
| Example 18 | 1.23 | 0.00 | 281.190 | 49.681 | 232.509 | 6928.83 | 1784.07 | 7.67 | 16.26 | 17.67 | 3.66 | 3.31 |
| Example 19 | 0.42 | 0.00 | 281.190 | 48.681 | 232.509 | 6929.89 | 1775.82 | 7.64 | 16.26 | 17.67 | 3.62 | 3.27 |
| Example 20 | 1.65 | 0.00 | 281.176 | 48.694 | 232.482 | 6928.69 | 1790.50 | 7.70 | 16.25 | 17.67 | 3.69 | 3.34 |
| Example 21 | 1.65 | 0.00 | 281.176 | 48.694 | 232.482 | 6928.89 | 1789.47 | 7.70 | 16.25 | 17.67 | 3.68 | 3.33 |
| Example 22 | 2.40 | 0.00 | 281.176 | 48.694 | 232.482 | 6928.69 | 1798.65 | 7.74 | 16.25 | 17.67 | 3.72 | 3.37 |
| Example 23 | 4.04 | 0.00 | 276.631 | 47.908 | 298.724 | 5581.61 | 1464.50 | 6.40 | 16.25 | 17.67 | 2.39 | 2.04 |
| Example 24 | 4.04 | 0.00 | 276.631 | 47.908 | 228.724 | 6706.50 | 1763.95 | 7.71 | 16.25 | 17.67 | 3.70 | 3.35 |
| Example 25 | 1.65 | 0.00 | 281.176 | 48.700 | 232.475 | 4984.27 | 1258.45 | 5.41 | 16.25 | 17.67 | 1.40 | 1.05 |
| Example 26 | 1.65 | 0.00 | 281.176 | 48.700 | 232.475 | 5226.04 | 1323.27 | 5.69 | 16.25 | 17.67 | 1.68 | 1.33 |
| Example 27 | 1.65 | 0.00 | 281.176 | 48.703 | 232.473 | 4826.13 | 1238.69 | 5.03 | 16.25 | 17.66 | 1.32 | 0.97 |
| Example 28 | 1.65 | 0.00 | 281.176 | 48.703 | 237.473 | 4984.21 | 1279.42 | 5.50 | 16.25 | 17.66 | 1.49 | 1.14 |
| Example 29 | 2.35 | 0.00 | 267.043 | 46.411 | 221.532 | 5236.32 | 1392.58 | 6.29 | 16.25 | 17.66 | 2.27 | 1.92 |
| Example 30 | 4.70 | 0.00 | 267.943 | 46.411 | 221.532 | 5236.32 | 1400.92 | 6.32 | 16.25 | 17.66 | 2.31 | 1.86 |
| Example 31 | 0.00 | 0.00 | 267.941 | 48.412 | 221.529 | 5236.22 | 1392.38 | 6.29 | 16.25 | 17.66 | 2.27 | 1.92 |
| Example 32 | 0.00 | 0.00 | 267.941 | 48.412 | 221.529 | 5236.22 | 1398.36 | 6.31 | 16.25 | 17.68 | 2.30 | 1.95 |
| Example 33 | 0.00 | 0.00 | 267.941 | 46.412 | 221.529 | 5236.22 | 1386.59 | 6.17 | 16.25 | 17.66 | 2.16 | 1.81 |
| Example 34 | 2.57 | 0.00 | 281.732 | 48.803 | 232.929 | 7307.34 | 1800.57 | 8.16 | 16.25 | 17.66 | 4.15 | 3.80 |
| Example 35 | 5.58 | 0.00 | 272.206 | 47.158 | 225.048 | 5404.06 | 1437.23 | 6.39 | 16.25 | 17.66 | 2.37 | 2.03 |
| Example 36 | 1.68 | 0.00 | 276.361 | 49.765 | 226.496 | 6901.85 | 1801.82 | 7.95 | 15.47 | 16.82 | 4.09 | 3.76 |
| Example 37 | 4.13 | 0.00 | 271.708 | 48.963 | 222.745 | 6675.06 | 1778.59 | 7.98 | 15.46 | 16.80 | 4.13 | 3.79 |
| Example 38 | 5.65 | 0.00 | 788.611 | 53.583 | 235.027 | 6102.88 | 1547.37 | 6.58 | 14.87 | 16.16 | 2.85 | 2.52 |
| Example 39 | 2.67 | 0.00 | 273.160 | 50.715 | 222.445 | 7253.18 | 1925.11 | 8.65 | 14.87 | 16.16 | 4.92 | 4.59 |
| Example 40 | 1.73 | 0.00 | 270.861 | 50.989 | 219.872 | 6861.75 | 1818.05 | 8.27 | 14.60 | 15.87 | 4.59 | 4.27 |
| Example 41 | 1.76 | 0.00 | 265.938 | 52.084 | 213.854. | 6817.32 | 1829.86 | 8.56 | 13.83 | 15.03 | 5.03 | 4.72 |
| Example 42 | 5.90 | 0.00 | 279.470 | 55.902 | 223.567 | 4759.86 | 1226.95 | 5.49 | 13.42 | 14.59 | 2.04 | 1.74 |
| Example 43 | 5.90 | 0.00 | 279.470 | 55.902 | 223.567 | 3482.51 | 889.32 | 3.98 | 13.42 | 14.59 | 0.53 | 0.23 |
| Example 44 | 3.07 | 0.95 | 260.326 | 52.432 | 207.094 | 5550.91 | 1457.13 | 7.01 | 13.29 | 14.44 | 3.59 | 3.29 |
| Example 45 | 5.90 | 0.04 | 277.099 | 56.381 | 220.717 | 3417.79 | 883.68 | 4.00 | 13.09 | 14.23 | 0.83 | 0.33 |
| Example 46 | 1.80 | 0.00 | 260.911 | 53.203 | 207.708 | 6783.62 | 1840.69 | 8.86 | 13.05 | 14.19 | 5.49 | 5.20 |

TABLE 3-continued

| Example Comparative Example No | MgO + $Al_2O_3$ (mol %) | ($Na_2O$ + $K_2O$ + ZnO)/$Li_2$) | O(P) | O(others) | O(P) − O(others) | $A_1$ = (O(P) − O(others)) × Cu | $A_2$ = (O(P) − O(others)) × C | C (mmol/cc) | $\alpha_1$ = 70400 × exp(−2.855 × R) | $\alpha_2$ = 76522 × exp(−2.855 × R) | C − 3200 × exp(−2.278 × R) | C − 3478 × exp(−2.278 × R) |
|---|---|---|---|---|---|---|---|---|---|---|---|---|
| Example 47 | 6.24 | 0.04 | 264.423 | 59.587 | 204.941 | 3352.26 | 894.33 | 4.37 | 11.20 | 12.18 | 1.38 | 1.12 |
| Example 48 | 6.57 | 0.00 | 254.242 | 62.297 | 191.945 | 3312.83 | 906.14 | 4.72 | 9.73 | 10.58 | 2.06 | 1.82 |
| Example 49 | 6.58 | 0.04 | 251.589 | 62.834 | 186.758 | 3257.30 | 898.50 | 4.76 | 8.41 | 10.73 | 2.17 | 1.94 |
| Example 50 | 2.03 | 2.340 | 256.801 | 51.606 | 205.185 | 5505.96 | 1422.93 | 6.93 | 13.33 | 17.48 | 3.51 | 3.21 |
| Example 51 | 5.60 | 0.296 | 262.581 | 58.844 | 203.746 | 2065.91 | 766.008 | 3.76 | 11.30 | 12.28 | 0.76 | 0.50 |
| Example 52 | 5.31 | 0.570 | 248.020 | 61.007 | 187.013 | 2681.40 | 711.130 | 3.80 | 9.67 | 10.51 | 1.15 | 0.92 |
| Example 53 | 1.85 | 0.00 | 281.176 | 48.694 | 232.482 | 7628.14 | 1991.702 | 8.57 | 16.25 | 17.67 | 4.55 | 4.20 |
| Example 54 | 1.65 | 0.00 | 281.176 | 48.694 | 232.482 | 6323.59 | 2161.474 | 9.30 | 18.25 | 17.67 | 5.28 | 4.93 |
| Example 55 | 1.65 | 0.00 | 281.176 | 48.694 | 232.482 | 9021.03 | 2327.952 | 10.01 | 18.25 | 17.67 | 6.00 | 5.65 |
| Example 56 | 5.44 | 0.585 | 268.282 | 54.313 | 213.989 | 3029.48 | 768.50 | 3.59 | 13.19 | 14.34 | 0.10 | −0.10 |
| Example 57 | 4.35 | 1.179 | 264.610 | 53.447 | 211.103 | 3005.00 | 750.39 | 3.55 | 13.23 | 14.39 | 0.15 | −0.15 |
| Example 58 | 3.24 | 2.187 | 260.892 | 52.570 | 208.322 | 2980.18 | 732.77 | 3.52 | 13.23 | 14.43 | 0.1019 | −0.20 |
| Example 59 | 7.05 | 0.00 | 267.943 | 46.411 | 221.532 | 5236.32 | 1411.74 | 6.37 | 16.25 | 17.66 | 2.36 | 2.01 |
| Example 60 | 0.00 | 1.47 | 267.941 | 46.412 | 221.529 | 5236.22 | 1398.15 | 6.30 | 18.25 | 17.66 | 2.29 | 1.94 |
| Comp. Ex. X | 1.00 | 11.073 | 253.360 | 50.793 | 202.567 | 2927.50 | 697.72 | 3.44 | 13.38 | 14.54 | 0.009 | −0.25 |
| Comp. Ex. A | 0.00 | 0.000 | 267.943 | 46.411 | 221.532 | 6005.22 | | 7.30 | 16.25 | 17.66 | 3.29 | 2.94 |
| Comp. Ex. B | 0.00 | 0.000 | 267.943 | 46.411 | 221.532 | 7461.38 | | 9.13 | 16.25 | 17.66 | 5.12 | 4.77 |
| Comp. Ex. C | 0.00 | 0.000 | 267.943 | 46.411 | 221.532 | 6735.32 | | 6.35 | 16.25 | 17.66 | 2.33 | 1.98 |
| Comp. Ex. D | 6.06 | 0.44 | 180.350 | 70.560 | 109.790 | 1083.63 | | 3.05 | 3.43 | 3.73 | 1.89 | 1.78 |
| Example 61 | 1.45 | 0.00 | 258.228 | 51.64 | 206.59 | 3498.49 | 896.34 | 4.34 | 13.42 | 14.59 | 0.834 | 0.595 |
| Example 62 | 1.48 | 0.00 | 255.780 | 53.08 | 202.70 | 3275.81 | 834.73 | 4.12 | 12.68 | 13.78 | 0.827 | 0.541 |
| Example 63 | 1.50 | 2.06 | 265.000 | 52.91 | 212.09 | 3162.01 | 844.35 | 4.45 | 13.42 | 14.59 | 1.008 | 0.708 |
| Example 64 | 1.52 | 0.00 | 255.883 | 53.08 | 202.72 | 4188.47 | 1086.61 | 5.36 | 12.68 | 13.78 | 2.061 | 1.774 |
| Example 65 | 1.65 | 1.98 | 252.999 | 56.34 | 196.86 | 3509.55 | 890.57 | 4.66 | 11.47 | 12.47 | 1.520 | 1.266 |
| Example 66 | 1.60 | 1.96 | 253.970 | 55.13 | 198.84 | 3542.58 | 906.10 | 4.56 | 11.87 | 12.90 | 1.433 | 1.162 |

TABLE 4

| Example Comparative Example No | $B_2O_3$ + $SiO_2$ (mol %) | $P_2O_5$ + $Li_2O$ + CuO (mol %) | $Li_2O$ + $Na_2O$ + $K_2O$ (mol %) | $Na_2O$ + $K_2O$ (mol %) | $Na_2O$ + $K_2O$ + CaO + SrO + BaO (mol %) | $Al_2O_2$ + $Y_2O_3$ + $La_2O_3$ + $Gd_2O_3$ (mol %) | (3 × $Al_2O_3$ + $Y_2O_3$ + $La_2O_3$ + $Gd_2O_3$ + BaO/3 + (CaO + SrO)/6) (mol %) | (3 × $Al_2O_3$ + $Y_2O_3$ + $La_2O_3$ + $Gd_2O_3$ + BaO/3 + (CaO + SrO)/6)/($P_2O_5$ + $Li_2O$ + CuO) | O ion (Coefficient of oxide × molar percentage of cation) |
|---|---|---|---|---|---|---|---|---|---|
| Example 1 | 0.00 | 97.82 | 10.15 | 0.00 | 0.00 | 2.18 | 5.09 | 0.052 | 349.78 |
| Example 2 | 0.00 | 96.31 | 10.34 | 0.00 | 0.00 | 1.48 | 4.43 | 0.046 | 339.60 |
| Example 3 | 0.00 | 97.75 | 10.50 | 0.00 | 0.00 | 2.25 | 5.26 | 0.054 | 344.65 |
| Example 4 | 0.00 | 96.19 | 10.67 | 0.00 | 0.00 | 1.52 | 4.57 | 0.048 | 334.54 |
| Example 5 | 0.00 | 97.68 | 10.83 | 0.00 | 0.00 | 2.32 | 5.43 | 0.056 | 339.70 |
| Example 6 | 0.00 | 97.61 | 11.15 | 0.00 | 0.00 | 2.39 | 5.59 | 0.057 | 335.00 |
| Example 7 | 0.00 | 98.08 | 10.99 | 0.00 | 0.00 | 1.57 | 4.71 | 0.049 | 329.59 |
| Example 8 | 0.00 | 96.17 | 7.87 | 0.00 | 0.00 | 3.83 | 3.83 | 0.040 | 338.52 |
| Example 9 | 0.00 | 97.10 | 10.31 | 0.00 | 0.00 | 2.90 | 2.90 | 0.030 | 332.71 |
| Example 10 | 0.00 | 96.64 | 9.10 | 0.00 | 0.00 | 3.36 | 3.36 | 0.035 | 335.59 |
| Example 11 | 0.00 | 95.70 | 6.62 | 0.00 | 0.00 | 4.30 | 4.30 | 0.045 | 341.50 |
| Example 12 | 0.00 | 97.55 | 11.50 | 0.00 | 0.00 | 2.45 | 2.45 | 0.025 | 329.87 |
| Example 13 | 0.00 | 97.55 | 11.50 | 0.00 | 0.00 | 2.45 | 2.45 | 0.025 | 329.87 |
| Example 14 | 0.00 | 97.55 | 11.50 | 0.00 | 0.00 | 2.45 | 2.45 | 0.025 | 329.87 |
| Example 15 | 0.00 | 97.55 | 11.50 | 0.00 | 0.00 | 2.45 | 2.45 | 0.025 | 329.87 |
| Example 16 | 0.00 | 97.55 | 11.50 | 0.00 | 0.00 | 2.45 | 2.45 | 0.025 | 329.87 |
| Example 17 | 0.00 | 97.54 | 11.50 | 0.00 | 0.00 | 2.46 | 4.11 | 0.042 | 329.87 |
| Example 18 | 0.00 | 97.54 | 11.50 | 0.00 | 0.00 | 2.46 | 4.93 | 0.051 | 329.87 |
| Example 19 | 0.00 | 97.54 | 11.50 | 0.00 | 0.00 | 2.46 | 3.29 | 0.034 | 329.87 |
| Example 20 | 0.00 | 97.54 | 11.50 | 0.00 | 0.00 | 2.46 | 5.76 | 0.059 | 329.87 |
| Example 21 | 0.00 | 97.54 | 11.50 | 0.00 | 0.00 | 2.46 | 5.76 | 0.059 | 329.87 |
| Example 22 | 0.00 | 97.54 | 11.50 | 0.00 | 0.00 | 2.46 | 7.39 | 0.076 | 329.87 |
| Example 23 | 0.00 | 95.96 | 16.23 | 0.00 | 0.00 | 1.62 | 4.85 | 0.051 | 324.54 |
| Example 24 | 0.00 | 95.96 | 11.31 | 0.00 | 0.00 | 1.62 | 4.85 | 0.051 | 324.54 |
| Example 25 | 0.00 | 89.17 | 11.50 | 0.00 | 8.37 | 2.46 | 8.55 | 0.096 | 329.88 |
| Example 26 | 0.00 | 90.21 | 11.50 | 0.00 | 7.33 | 2.46 | 8.20 | 0.091 | 329.88 |
| Example 27 | 0.00 | 97.55 | 20.55 | 0.00 | 0.00 | 2.46 | 5.76 | 0.059 | 329.88 |
| Example 28 | 0.00 | 97.55 | 19.87 | 0.00 | 0.00 | 2.46 | 5.76 | 0.059 | 329.88 |
| Example 29 | 0.00 | 92.95 | 15.72 | 0.00 | 4.71 | 0.00 | 1.57 | 0.017 | 314.35 |
| Example 30 | 0.00 | 92.95 | 15.72 | 0.00 | 2.35 | 0.00 | 0.78 | 0.008 | 314.35 |
| Example 31 | 0.00 | 86.45 | 9.23 | 0.00 | 13.55 | 0.00 | 2.26 | 0.026 | 314.35 |
| Example 32 | 0.00 | 86.45 | 9.23 | 0.00 | 13.55 | 0.00 | 2.26 | 0.026 | 314.35 |
| Example 33 | 0.00 | 86.45 | 9.23 | 0.00 | 13.55 | 0.00 | 4.52 | 0.052 | 314.35 |
| Example 34 | 0.00 | 97.43 | 9.71 | 0.00 | 0.00 | 2.57 | 7.72 | 0.079 | 330.53 |
| Example 35 | 0.00 | 94.42 | 15.97 | 0.00 | 0.00 | 0.80 | 2.40 | 0.025 | 319.38 |
| Example 36 | 0.00 | 97.48 | 11.75 | 0.00 | 0.00 | 2.52 | 5.89 | 0.060 | 326.13 |
| Example 37 | 0.00 | 95.87 | 11.66 | 0.00 | 0.00 | 1.65 | 4.96 | 0.052 | 320.67 |
| Example 38 | 0.00 | 94.35 | 10.68 | 0.00 | 0.00 | 5.65 | 16.96 | 0.180 | 342.19 |
| Example 39 | 0.00 | 97.33 | 10.09 | 0.00 | 0.00 | 2.67 | 8.02 | 0.082 | 323.88 |
| Example 40 | 0.00 | 97.42 | 12.04 | 0.00 | 0.00 | 2.58 | 6.03 | 0.062 | 321.85 |
| Example 41 | 0.00 | 97.36 | 12.30 | 0.00 | 0.00 | 2.64 | 6.16 | 0.063 | 318.02 |
| Example 42 | 0.00 | 94.10 | 16.92 | 0.00 | 0.00 | 5.90 | 17.69 | 0.188 | 335.37 |
| Example 43 | 0.00 | 94.10 | 22.72 | 0.00 | 0.00 | 5.90 | 17.68 | 0.188 | 335.37 |
| Example 44 | 0.00 | 87.24 | 16.15 | 7.67 | 9.32 | 2.25 | 7.29 | 0.084 | 312.78 |
| Example 45 | 0.00 | 93.14 | 22.23 | 0.00 | 0.00 | 5.90 | 17.70 | 0.190 | 333.48 |
| Example 46 | 0.00 | 97.31 | 12.56 | 0.00 | 0.00 | 2.69 | 6.29 | 0.065 | 314.11 |
| Example 47 | 0.00 | 92.75 | 23.50 | 0.00 | 0.00 | 6.24 | 18.71 | 0.202 | 324.01 |
| Example 48 | 0.00 | 93.43 | 25.32 | 0.00 | 0.00 | 6.57 | 19.72 | 0.211 | 316.54 |
| Example 49 | 0.00 | 92.35 | 24.78 | 0.00 | 0.00 | 6.58 | 19.73 | 0.214 | 314.42 |
| Example 50 | 0.00 | 83.79 | 18.45 | 12.85 | 13.94 | 1.48 | 4.81 | 0.057 | 308.41 |
| Example 51 | 0.00 | 87.99 | 21.41 | 0.00 | 0.00 | 5.68 | 17.04 | 0.194 | 321.43 |
| Example 52 | 0.00 | 83.29 | 19.99 | 0.00 | 0.00 | 5.31 | 15.92 | 0.191 | 309.03 |
| Example 53 | 0.00 | 97.54 | 8.50 | 0.00 | 0.00 | 2.46 | 5.76 | 0.059 | 329.87 |
| Example 54 | 0.00 | 97.54 | 5.50 | 0.00 | 0.00 | 2.46 | 5.76 | 0.059 | 329.87 |
| Example 55 | 0.00 | 97.54 | 2.50 | 0.00 | 0.00 | 2.46 | 5.76 | 0.059 | 329.87 |
| Example 56 | 0.00 | 82.84 | 23.16 | 8.14 | 11.06 | 3.98 | 12.93 | 0.156 | 322.60 |
| Example 57 | 0.00 | 79.16 | 25.64 | 13.63 | 15.98 | 3.18 | 10.33 | 0.131 | 318.06 |
| Example 58 | 0.00 | 75.44 | 28.14 | 19.19 | 20.93 | 2.37 | 7.70 | 0.102 | 313.46 |
| Example 59 | 0.00 | 92.95 | 15.72 | 0.00 | 0.00 | 0.00 | 0.00 | 0.000 | 314.35 |
| Example 60 | 0.00 | 86.45 | 9.23 | 0.00 | 0.00 | 0.00 | 0.00 | 0.000 | 314.35 |
| Comp. Ex. X | 0.00 | 87.89 | 33.22 | 30.45 | 30.99 | 0.73 | 2.38 | 0.035 | 304.15 |
| Comp. Ex. A | 0.00 | 100.00 | 19.30 | 0.00 | 0.00 | 0.00 | 0.00 | 0.000 | 314.35 |
| Comp. Ex. B | 0.00 | 100.00 | 12.73 | 0.00 | 0.00 | 0.00 | 0.00 | 0.000 | 314.35 |
| Comp. Ex. C | 0.00 | 100.00 | 22.77 | 0.00 | 0.00 | 0.00 | 0.00 | 0.000 | 314.35 |
| Comp. Ex. D | 0.00 | 69.57 | 34.08 | 10.45 | 24.36 | 3.32 | 13.38 | 0.192 | 250.91 |
| Example 61 | 0.00 | 69.67 | 1.09 | 0.00 | 28.63 | 1.66 | 14.53 | 0.209 | 309.87 |
| Example 62 | 0.00 | 68.42 | 1.10 | 0.00 | 29.40 | 2.14 | 14.93 | 0.218 | 308.86 |
| Example 63 | 0.00 | 72.02 | 3.91 | 2.63 | 24.97 | 2.97 | 16.37 | 0.227 | 317.91 |
| Example 64 | 0.00 | 72.98 | 1.16 | 0.00 | 24.85 | 2.14 | 13.42 | 0.184 | 308.88 |
| Example 65 | 0.00 | 68.85 | 1.20 | 0.80 | 27.69 | 3.47 | 18.03 | 0.262 | 309.34 |
| Example 66 | 0.00 | 69.01 | 1.18 | 0.78 | 27.97 | 2.98 | 15.11 | 0.219 | 309.10 |

TABLE 5

| Example | Transmittance @ λ T50 = 645 nm | | | | | | Transmittance @ λ T50 = 633 nm | | | | | |
|---|---|---|---|---|---|---|---|---|---|---|---|---|
| Comparative Example No | Sheet thickness (mm) | T1200 (%) | Ave. T1100-800 (%) | T750 (%) | T600 (%) | T400 (%) | Sheet thickness (mm) | T1200 (%) | Ave. T1100-800 (%) | T750 (%) | T600 (%) | T400 (%) |
| Example 1 | 0.170 | 2.420 | 0.386 | 4.049 | 75.895 | 85.936 | 0.225 | 0.751 | 0.071 | 1.483 | 71.402 | 84.147 |
| Example 2 | 0.153 | 3.585 | 1.204 | 4.379 | 76.550 | 87.133 | 0.203 | 1.241 | 0.297 | 1.619 | 72.148 | 85.676 |
| Example 3 | 0.151 | 3.304 | 0.637 | 4.417 | 76.165 | 86.742 | 0.200 | 1.130 | 0.134 | 1.660 | 71.725 | 85.187 |
| Example 4 | 0.136 | 4.965 | 1.520 | 4.856 | 76.366 | 86.849 | 0.180 | 1.935 | 0.410 | 1.379 | 71.971 | 85.323 |
| Example 5 | 0.138 | 4.423 | 0.915 | 4.817 | 76.262 | 86.684 | 0.182 | 1.673 | 0.216 | 1.873 | 71.874 | 85.121 |
| Example 6 | 0.117 | 6.096 | 1.176 | 5.454 | 75.642 | 85.667 | 0.153 | 2.810 | 0.316 | 2.255 | 71.209 | 83.849 |
| Example 7 | 0.120 | 6.150 | 1.639 | 5.209 | 76.483 | 86.596 | 0.159 | 2.578 | 0.459 | 2.071 | 72.136 | 85.002 |
| Example 8 | 0.099 | 10.009 | 3.639 | 6.913 | 75.589 | 86.127 | 0.129 | 5.181 | 1.391 | 3.167 | 71.295 | 84.500 |
| Example 9 | 0.105 | 9.073 | 3.852 | 6.382 | 75.878 | 86.330 | 0.137 | 4.449 | 1.474 | 2.808 | 71.568 | 84.728 |
| Example 10 | 0.103 | 9.130 | 3.065 | 6.520 | 75.821 | 86.198 | 0.134 | 4.514 | 1.098 | 2.909 | 71.534 | 84.572 |
| Example 11 | 0.093 | 10.940 | 3.725 | 7.342 | 75.600 | 86.153 | 0.121 | 5.795 | 1.447 | 3.452 | 71.352 | 84.550 |
| Example 12 | 0.110 | 7.889 | 2.030 | 5.618 | 76.300 | 86.133 | 0.145 | 3.614 | 0.614 | 2.310 | 71.954 | 84.421 |
| Example 13 | 0.103 | 8.303 | 2.000 | 5.850 | 75.822 | 86.018 | 0.135 | 3.940 | 0.624 | 2.490 | 71.467 | 84.314 |
| Example 14 | 0.105 | 7.935 | 1.805 | 5.707 | 75.906 | 85.851 | 0.137 | 3.713 | 0.551 | 2.411 | 71.572 | 84.101 |
| Example 15 | 0.110 | 7.829 | 2.111 | 5.651 | 75.926 | 86.081 | 0.145 | 3.644 | 0.673 | 2.377 | 71.591 | 84.393 |
| Example 16 | 0.110 | 7.829 | 1.868 | 5.713 | 75.952 | 85.683 | 0.144 | 3.630 | 0.569 | 2.401 | 71.601 | 83.873 |
| Example 17 | 0.109 | 7.545 | 2.461 | 5.570 | 76.229 | 85.959 | 0.143 | 3.427 | 0.798 | 2.299 | 71.896 | 84.208 |
| Example 18 | 0.107 | 8.279 | 3.704 | 5.792 | 75.944 | 85.808 | 0.141 | 3.909 | 1.379 | 2.446 | 71.595 | 84.036 |
| Example 19 | 0.111 | 7.955 | 2.039 | 5.741 | 75.769 | 85.493 | 0.145 | 3.730 | 0.641 | 2.433 | 71.409 | 83.644 |
| Example 20 | 0.109 | 7.575 | 1.719 | 5.696 | 75.771 | 85.549 | 0.143 | 3.492 | 0.517 | 2.404 | 71.402 | 83.712 |
| Example 21 | 0.111 | 7.517 | 2.820 | 5.485 | 76.196 | 86.037 | 0.146 | 3.417 | 0.967 | 2.258 | 71.865 | 84.313 |
| Example 22 | 0.113 | 6.912 | 2.245 | 5.466 | 26.144 | 85.839 | 0.149 | 3.065 | 0.720 | 2.252 | 71.810 | 84.061 |
| Example 23 | 0.136 | 6.235 | 1.524 | 4.997 | 76.331 | 86.869 | 0.180 | 2.616 | 0.418 | 1.952 | 71.928 | 85.350 |
| Example 24 | 0.109 | 7.924 | 2.518 | 5.792 | 76.198 | 86.051 | 0.143 | 3.648 | 0.821 | 2.414 | 71.847 | 84.335 |
| Example 25 | 0.166 | 5.967 | 1.064 | 4.555 | 76.384 | 86.422 | 0.220 | 2.453 | 0.263 | 1.715 | 71.964 | 84.758 |
| Example 26 | 0.164 | 6.131 | 1.032 | 4.644 | 76.229 | 86.462 | 0.216 | 2.571 | 0.259 | 1.782 | 71.826 | 84.831 |
| Example 27 | 0.178 | 5.716 | 0.962 | 4.490 | 76.476 | 87.041 | 0.237 | 2.297 | 0.227 | 1.667 | 72.040 | 85.550 |
| Example 28 | 0.166 | 5.871 | 0.952 | 4.567 | 76.344 | 86.795 | 0.220 | 2.383 | 0.226 | 1.707 | 71.878 | 85.230 |
| Example 29 | 0.147 | 5.614 | 1.100 | 4.346 | 76.437 | 85.084 | 0.194 | 2.269 | 0.272 | 1.616 | 72.043 | 83.418 |
| Example 30 | 0.141 | 6.138 | 1.191 | 4.708 | 76.434 | 86.083 | 0.187 | 2.562 | 0.306 | 1.804 | 72.057 | 84.330 |
| Example 31 | 0.115 | 9.231 | 2.024 | 5.862 | 76.000 | 85.046 | 0.150 | 4.511 | 0.637 | 2.486 | 71.667 | 83.059 |
| Example 32 | 0.118 | 8.642 | 1.911 | 5.389 | 75.947 | 83.451 | 0.155 | 4.099 | 0.584 | 2.202 | 71.548 | 80.992 |
| Example 33 | 0.136 | 5.811 | 1.076 | 4.490 | 76.070 | 83.894 | 0.179 | 2.427 | 0.275 | 1.729 | 71.692 | 81.553 |
| Example 34 | 0.095 | 8.422 | 3.869 | 6.327 | 75.500 | 78.928 | 0.123 | 4.090 | 1.514 | 2.818 | 71.178 | 75.416 |
| Example 35 | 0.136 | 6.639 | 1.539 | 5.002 | 76.248 | 86.637 | 0.179 | 2.873 | 0.429 | 1.978 | 71.879 | 85.068 |
| Example 36 | 0.098 | 9.186 | 2.418 | 6.354 | 75.858 | 85.818 | 0.127 | 4.546 | 0.813 | 2.810 | 71.575 | 84.084 |
| Example 37 | 0.097 | 9.903 | 4.813 | 6.222 | 76.007 | 85.574 | 0.127 | 4.987 | 1.962 | 2.715 | 71.725 | 83.758 |
| Example 38 | 0.089 | 13.671 | 4.955 | 8.284 | 74.773 | 79.147 | 0.115 | 7.946 | 2.187 | 4.174 | 70.538 | 75.884 |
| Example 39 | 0.081 | 9.477 | 4.338 | 7.011 | 75.279 | 76.917 | 0.106 | 4.820 | 1.770 | 3.260 | 70.972 | 72.983 |
| Example 40 | 0.093 | 10.613 | 2.829 | 6.630 | 75.612 | 84.696 | 0.121 | 5.535 | 1.008 | 2.987 | 71.303 | 82.686 |
| Example 41 | 0.084 | 12.120 | 3.114 | 7.023 | 75.307 | 83.566 | 0.110 | 6.612 | 1.165 | 3.254 | 70.984 | 81.262 |
| Example 42 | 0.123 | 12.199 | 2.875 | 7.632 | 75.001 | 81.159 | 0.159 | 6.780 | 1.088 | 3.700 | 70.728 | 78.313 |
| Example 43 | 0.179 | 11.035 | 2.416 | 6.870 | 75.418 | 83.778 | 0.233 | 5.861 | 0.844 | 3.167 | 71.128 | 81.535 |
| Example 44 | 0.121 | 5.836 | 1.463 | 4.971 | 75.636 | 83.755 | 0.158 | 2.483 | 0.418 | 2.013 | 71.239 | 81.421 |
| Example 45 | 0.162 | 12.775 | 2.829 | 7.269 | 75.394 | 85.975 | 0.209 | 7.126 | 1.050 | 3.431 | 71.138 | 84.337 |
| Example 46 | 0.077 | 13.453 | 3.829 | 7.299 | 75.463 | 82.431 | 0.100 | 7.596 | 1.520 | 3.435 | 71.199 | 79.845 |
| Example 47 | 0.129 | 18.122 | 4.807 | 8.623 | 74.666 | 82.277 | 0.166 | 11.384 | 2.126 | 4.379 | 70.385 | 79.748 |
| Example 48 | 0.108 | 21.057 | 6.228 | 9.481 | 74.244 | 76.092 | 0.138 | 14.069 | 3.048 | 5.091 | 70.061 | 72.289 |
| Example 49 | 0.103 | 22.85 | 6.562 | 9.845 | 74.25 | 82.32 | 0.132 | 15.563 | 3.278 | 5.313 | 70.039 | 79.896 |
| Example 50 | 0.142 | 3.235 | 1.070 | 3.535 | 76.009 | 82.607 | 0.188 | 1.088 | 0.280 | 1.224 | 71.490 | 79.832 |
| Example 51 | 0.148 | 20.133 | 5.334 | 8.706 | 74.637 | 82.687 | 0.190 | 13.131 | 2.486 | 4.484 | 70.420 | 80.300 |
| Example 52 | 0.130 | 24.979 | 6.961 | 9.278 | 74.584 | 80.034 | 0.167 | 17.341 | 3.486 | 4.979 | 70.375 | 77.026 |
| Example 53 | 0.083 | 10.259 | | 6.783 | 75.366 | 85.528 | 0.108 | 5.336 | 2.408 | 3.119 | 71.071 | 83.757 |
| Example 54 | 0.077 | 10.318 | | 7.232 | 75.154 | 85.485 | 0.100 | 5.410 | 2.270 | 3.414 | 70.853 | 83.719 |
| Example 55 | 0.067 | 11.519 | | 7.812 | 74.967 | 85.190 | 0.087 | 6.304 | 4.105 | 3.819 | 70.694 | 83.375 |
| Example 56 | 0.232 | 6.624 | 1.108 | 4.899 | 75.666 | 82.733 | 0.304 | 2.925 | 0.295 | 1.969 | 71.265 | 80.314 |
| Example 57 | 0.271 | 4.010 | 0.540 | 3.549 | 76.269 | 81.762 | 0.359 | 1.441 | 0.108 | 1.225 | 71.798 | 78.739 |
| Example 58 | 0.315 | 2.547 | 0.268 | 2.575 | 76.479 | 79.774 | 0.421 | 0.766 | 0.041 | 0.777 | 71.951 | 76.121 |
| Example 59 | 0.136 | 7.005 | 1.547 | 6.102 | 76.193 | 86.207 | 0.179 | 3.076 | 0.432 | 2.024 | 71.797 | 84.506 |
| Example 60 | 0.123 | 9.383 | 2.532 | 5.946 | 76.147 | 86.607 | 0.162 | 4.617 | 0.847 | 2.539 | 71.859 | 85.069 |
| Comp. Ex. X | 0.352 | 1.846 | 0.156 | 2.059 | 73.631 | 69.056 | 0.463 | 0.538 | 0.023 | 0.621 | 68.694 | 63.135 |
| Comp. Ex. A | 0.125 | 5.963 | 2.057 | 4.579 | 76.344 | 81.915 | 0.166 | 2.459 | 0.610 | 1.733 | 71.929 | 76.960 |
| Comp. Ex. B | 0.091 | 7.734 | 4.856 | 5.651 | 75.965 | 83.367 | 0.119 | 3.561 | 1.965 | 2.368 | 71.619 | 80.912 |
| Comp. Ex. C | 0.147 | 5.181 | 0.938 | 4.201 | 76.536 | 85.249 | 0.196 | 2.010 | 0.217 | 1.521 | 72.100 | 83.212 |
| Comp. Ex. D | 0.089 | 36.027 | 13.809 | 13.887 | 72.114 | 87.082 | 0.111 | 28.827 | 8.950 | 8.852 | 68.090 | 86.005 |
| Example 61 | 0.160 | 9.22 | 1.689 | 5.851 | 75.040 | 86.070 | 0.209 | 4.578 | 0.536 | 2.527 | 70.664 | 84.520 |
| Example 62 | 0.165 | 11.38 | 2.359 | 6.472 | 74.730 | 86.550 | 0.214 | 6.136 | 0.837 | 2.950 | 70.410 | 85.180 |
| Example 63 | 0.160 | 8.30 | 1.562 | 5.826 | 74.868 | 86.022 | 0.210 | 4.009 | 0.482 | 2.527 | 70.485 | 84.474 |
| Example 64 | 0.120 | 11.00 | 2.498 | 6.542 | 74.889 | 86.311 | 0.156 | 5.850 | 0.879 | 2.977 | 70.580 | 84.867 |
| Example 65 | 0.119 | 13.52 | 2.865 | 7.513 | 74.388 | 83.546 | 0.154 | 7.806 | 1.158 | 3.662 | 70.124 | 81.432 |
| Example 66 | 0.127 | 12.87 | 2.981 | 7.126 | 74.576 | 85.270 | 0.164 | 7.230 | 1.159 | 3.363 | 70.256 | 83.564 |

TABLE 6

| Example Comparative Example No | Transmittance@ Sheet thickness 0.11 mm λ T50 (nm) | T1200 (%) | Ave. T1100-800 (%) | T750 (%) | T600 (%) | T400 (%) | Transmittance@ Sheet thickness 0.21 mm λ T50 (nm) | T1200 (%) | Ave. T1100-800 (%) | T750 (%) | T600 (%) | T400 (%) |
|---|---|---|---|---|---|---|---|---|---|---|---|---|
| Example 1 | 666 | 8.785 | 2.590 | 12.245 | 81.175 | 87.953 | 636 | 1.041 | 0.113 | 1.963 | 72.627 | 84.642 |
| Example 2 | 660 | 8.882 | 4.008 | 10.259 | 80.528 | 88.400 | 632 | 1.063 | 0.243 | 1.400 | 71.526 | 85.465 |
| Example 3 | 660 | 8.168 | 2.414 | 10.090 | 80.124 | 88.077 | 631 | 0.906 | 0.097 | 1.356 | 70.842 | 84.870 |
| Example 4 | 655 | 8.624 | 3.285 | 8.471 | 79.065 | 87.755 | 627 | 1.005 | 0.165 | 0.973 | 69.066 | 84.279 |
| Example 5 | 655 | 8.150 | 2.287 | 8.725 | 79.157 | 87.681 | 627 | 0.902 | 0.087 | 1.028 | 69.219 | 84.143 |
| Example 6 | 648 | 7.112 | 1.496 | 6.403 | 76.476 | 86.001 | 620 | 0.696 | 0.042 | 0.569 | 64.812 | 81.093 |
| Example 7 | 649 | 7.775 | 2.313 | 6.682 | 77.700 | 87.031 | 622 | 0.825 | 0.088 | 0.618 | 66.807 | 82.956 |
| Example 8 | 640 | 7.953 | 2.581 | 5.232 | 74.028 | 85.543 | 614 | 0.861 | 0.107 | 0.387 | 60.908 | 80.269 |
| Example 9 | 643 | 8.149 | 3.332 | 5.639 | 75.212 | 86.087 | 616 | 0.902 | 0.176 | 0.447 | 62.782 | 81.246 |
| Example 10 | 642 | 7.788 | 2.429 | 5.434 | 74.831 | 85.828 | 615 | 0.827 | 0.094 | 0.416 | 62.176 | 80.780 |
| Example 11 | 637 | 7.494 | 2.120 | 4.685 | 73.042 | 85.195 | 611 | 0.769 | 0.074 | 0.314 | 59.359 | 79.648 |
| Example 12 | 645 | 7.939 | 2.049 | 5.659 | 76.336 | 86.147 | 619 | 0.858 | 0.059 | 0.450 | 64.586 | 81.356 |
| Example 13 | 642 | 7.045 | 1.546 | 4.846 | 74.839 | 85.639 | 616 | 0.683 | 0.042 | 0.334 | 62.190 | 80.442 |
| Example 14 | 643 | 7.046 | 1.498 | 4.987 | 75.210 | 85.575 | 616 | 0.683 | 0.041 | 0.353 | 62.780 | 30.326 |
| Example 15 | 645 | 7.910 | 2.144 | 5.717 | 75.986 | 86.104 | 618 | 0.852 | 0.079 | 0.459 | 64.022 | 81.277 |
| Example 16 | 645 | 7.830 | 1.868 | 5.715 | 75.953 | 85.683 | 618 | 0.836 | 0.061 | 0.458 | 63.969 | 80.521 |
| Example 17 | 644 | 7.310 | 2.352 | 5.376 | 76.051 | 85.888 | 618 | 0.733 | 0.090 | 0.408 | 64.126 | 80.889 |
| Example 18 | 644 | 7.823 | 3.437 | 5.427 | 75.607 | 85.673 | 617 | 0.834 | 0.184 | 0.415 | 63.413 | 80.503 |
| Example 19 | 645 | 8.056 | 2.078 | 5.823 | 75.844 | 85.524 | 618 | 0.882 | 0.073 | 0.475 | 63.793 | 80.235 |
| Example 20 | 645 | 7.466 | 1.681 | 5.605 | 75.687 | 85.514 | 618 | 0.763 | 0.051 | 0.442 | 63.541 | 80.218 |
| Example 21 | 645 | 7.672 | 2.900 | 5.613 | 76.311 | 86.082 | 619 | 0.804 | 0.140 | 0.443 | 64.546 | 81.238 |
| Example 22 | 646 | 7.439 | 2.490 | 5.922 | 76.549 | 86.001 | 619 | 0.758 | 0.105 | 0.490 | 64.930 | 81.093 |
| Example 23 | 655 | 10.451 | 3.312 | 8.739 | 79.076 | 87.785 | 627 | 1.450 | 0.175 | 1.031 | 69.083 | 84.333 |
| Example 24 | 644 | 7.661 | 2.397 | 5.575 | 76.004 | 85.985 | 618 | 0.802 | 0.094 | 0.437 | 64.050 | 81.063 |
| Example 25 | 665 | 15.063 | 4.679 | 12.600 | 81.277 | 88.190 | 635 | 2.914 | 0.344 | 2.073 | 72.800 | 85.078 |
| Example 26 | 664 | 14.883 | 4.347 | 12.347 | 81.002 | 88.159 | 634 | 2.848 | 0.304 | 1.994 | 72.331 | 85.021 |
| Example 27 | 668 | 16.528 | 5.335 | 14.240 | 81.991 | 88.812 | 638 | 3.480 | 0.437 | 2.618 | 74.027 | 86.226 |
| Example 28 | 664 | 14.767 | 4.268 | 12.497 | 81.200 | 88.425 | 635 | 2.806 | 0.293 | 2.040 | 72.668 | 85.512 |
| Example 29 | 658 | 11.294 | 3.272 | 9.321 | 80.009 | 86.933 | 630 | 1.682 | 0.172 | 1.166 | 70.648 | 82.778 |
| Example 30 | 657 | 11.167 | 3.056 | 9.084 | 79.586 | 87.305 | 628 | 1.646 | 0.155 | 1.110 | 69.936 | 83.455 |
| Example 31 | 647 | 10.114 | 2.348 | 6.539 | 76.571 | 85.303 | 620 | 1.362 | 0.095 | 0.593 | 64.966 | 79.840 |
| Example 32 | 648 | 10.083 | 2.447 | 6.485 | 76.890 | 83.969 | 621 | 1.355 | 0.103 | 0.583 | 65.483 | 77.474 |
| Example 33 | 655 | 9.893 | 2.495 | 8.034 | 78.869 | 85.354 | 627 | 1.306 | 0.106 | 0.878 | 68.738 | 79.931 |
| Example 34 | 638 | 5.725 | 2.341 | 4.106 | 73.159 | 77.032 | 612 | 0.460 | 0.093 | 0.244 | 59.551 | 65.714 |
| Example 35 | 655 | 10.915 | 3.305 | 8.676 | 78.966 | 87.581 | 627 | 1.576 | 0.173 | 1.017 | 68.900 | 83.961 |
| Example 36 | 639 | 6.865 | 1.538 | 4.532 | 74.054 | 85.095 | 614 | 0.650 | 0.042 | 0.294 | 60.950 | 79.469 |
| Example 37 | 639 | 7.293 | 3.223 | 4.298 | 74.066 | 84.760 | 613 | 0.730 | 0.163 | 0.266 | 60.869 | 78.872 |
| Example 38 | 635 | 8.768 | 2.535 | 4.727 | 71.289 | 76.466 | 608 | 1.037 | 0.107 | 0.319 | 56.679 | 64.796 |
| Example 39 | 631 | 4.267 | 1.507 | 2.839 | 30.222 | 72.295 | 606 | 0.262 | 0.040 | 0.121 | 55.070 | 58.216 |
| Example 40 | 637 | 7.065 | 7.488 | 4.039 | 72.903 | 83.428 | 611 | 0.687 | 0.040 | 0.236 | 59.155 | 76.524 |
| Example 41 | 633 | 6.534 | 1.142 | 3.205 | 70.902 | 81.217 | 607 | 0.592 | 0.020 | 0.152 | 56.093 | 72.699 |
| Example 42 | 650 | 15.078 | 4.098 | 9.910 | 76.805 | 82.211 | 621 | 2.920 | 0.277 | 1.310 | 65.021 | 74.406 |
| Example 43 | 673 | 24.969 | 9.615 | 18.661 | 81.337 | 86.764 | 637 | 7.649 | 1.312 | 4.387 | 72.803 | 82.472 |
| Example 44 | 649 | 7.453 | 2.101 | 6.439 | 76.943 | 84.435 | 621 | 0.761 | 0.074 | 0.575 | 65.570 | 78.296 |
| Example 45 | 665 | 23.974 | 8.407 | 16.332 | 80.271 | 87.777 | 633 | 7.078 | 1.038 | 3.401 | 71.090 | 84.318 |
| Example 46 | 629 | 5.874 | 1.006 | 2.448 | 69.361 | 78.709 | 604 | 0.483 | 0.020 | 0.091 | 53.789 | 68.472 |
| Example 47 | 653 | 23.071 | 7.382 | 12.262 | 76.991 | 83.622 | 623 | 6.577 | 0.825 | 1.965 | 65.648 | 76.863 |
| Example 48 | 644 | 20.512 | 5.944 | 9.106 | 73.965 | 75.838 | 615 | 5.255 | 0.555 | 1.115 | 60.810 | 63.784 |
| Example 49 | 642 | 20.83 | 5.541 | 8.481 | 73.21 | 81.73 | 613 | 5.409 | 0.519 | 0.974 | 59.636 | 73.579 |
| Example 50 | 657 | 6.896 | 2.888 | 7.386 | 79.315 | 84.591 | 629 | 0.656 | 0.135 | 0.748 | 69.482 | 78.574 |
| Example 51 | 661 | 29.812 | 10.965 | 16.017 | 78.732 | 84.942 | 629 | 10.730 | 1.721 | 3.277 | 68.511 | 79.197 |
| Example 52 | 654 | 30.593 | 10.283 | 13.259 | 77.030 | 81.755 | 623 | 11.272 | 1.568 | 2.285 | 65.712 | 73.621 |
| Example 53 | 632 | 5.085 | 2.266 | 2.944 | 70.763 | 83.627 | 607 | 0.367 | 0.087 | 0.129 | 55.884 | 76.872 |
| Example 54 | 629 | 4.013 | 1.552 | 2.412 | 68.947 | 82.914 | 604 | 0.233 | 0.043 | 0.088 | 53.177 | 75.626 |
| Example 55 | 623 | 3.310 | 1.839 | 1.651 | 65.996 | 81.297 | 599 | 0.143 | 0.061 | 0.043 | 48.917 | 72.834 |
| Example 56 | 684 | 26.390 | 10.936 | 22.873 | 83.730 | 87.356 | 650 | 8.502 | 1.664 | 6.470 | 77.063 | 83.549 |
| Example 57 | 691 | 25.700 | 10.959 | 24.455 | 85.107 | 87.547 | 656 | 8.082 | 1.659 | 7.351 | 79.489 | 83.898 |
| Example 58 | 697 | 26.282 | 11.455 | 26.383 | 86.102 | 87.378 | 663 | 8.435 | 1.801 | 8.497 | 81.274 | 83.589 |
| Example 59 | 655 | 11.415 | 3.320 | 8.830 | 78.928 | 87.232 | 627 | 1.717 | 0.176 | 1.051 | 68.837 | 83.322 |
| Example 60 | 650 | 11.996 | 3.707 | 7.984 | 77.691 | 87.147 | 623 | 1.887 | 0.215 | 0.867 | 66.792 | 83.167 |
| Comp. Ex. X | 702 | 27.042 | 11.822 | 27.977 | 85.646 | 83.945 | 668 | 8.907 | 1.910 | 9.504 | 80.453 | 77.430 |
| Comp. Ex. A | 651 | 8.277 | 3.230 | 6.560 | 78.045 | 83.036 | 624 | 0.929 | 0.162 | 0.596 | 67.374 | 75.838 |
| Comp. Ex. B | 638 | 4.609 | 2.656 | 3.165 | 73.041 | 81.723 | 611 | 0.304 | 0.114 | 0.148 | 59.369 | 73.566 |
| Comp. Ex. C | 658 | 10.745 | 2.941 | 9.189 | 80.140 | 86.853 | 630 | 1.529 | 0.143 | 1.134 | 70.868 | 82.633 |
| Comp. Ex. D | 633 | 28.002 | 9.056 | 8.961 | 68.186 | 86.034 | 603 | 10.180 | 1.289 | 1.081 | 52.078 | 81.152 |
| Example 61 | 664.089 | 18.966 | 5.650 | 13.833 | 79.818 | 87.687 | 632.89 | 4.544 | 0.530 | 2.504 | 70.618 | 84.504 |
| Example 62 | 666.119 | 22.795 | 7.758 | 15.647 | 79.897 | 88.114 | 633.85 | 6.455 | 0.911 | 3.147 | 70.753 | 85.292 |
| Example 63 | 664.102 | 17.594 | 5.392 | 13.794 | 79.676 | 87.650 | 632.74 | 3.937 | 0.468 | 2.474 | 70.379 | 84.435 |
| Example 64 | 649.438 | 13.229 | 3.396 | 8.227 | 76.193 | 86.736 | 620.60 | 2.284 | 0.191 | 0.922 | 64.622 | 82.762 |
| Example 65 | 649.115 | 15.695 | 3.671 | 9.129 | 75.588 | 84.128 | 619.58 | 3.166 | 0.269 | 1.125 | 63.546 | 78.077 |
| Example 66 | 652.109 | 16.642 | 4.559 | 9.955 | 76.583 | 86.040 | 622.36 | 3.540 | 0.366 | 1.327 | 85.255 | 81.500 |

TABLE 7

| Example Comparative | Transmittance@Sheet thickness 0.23 mm | | | | Transmittance@Sheet thickness 0.25 mm | | | | DSC | | |
|---|---|---|---|---|---|---|---|---|---|---|---|
| Example No | λ T50 (nm) | T1200 (%) | T600 (%) | T400 (%) | λ T50 (nm) | T1200 (%) | T600 (%) | T400 (%) | Tg (° C.) | Tm (° C.) | Weathering resistance |
| Example 1 | 632 | 0.680 | 71.029 | 83.995 | 629 | 0.444 | 69.465 | 83.353 | 308 | 790 | B |
| Example 2 | 628 | 0.695 | 69.850 | 84.889 | 625 | 0.455 | 68.214 | 84.318 | 314 | 812 | B |
| Example 3 | 627 | 0.584 | 69.119 | 84.243 | 624 | 0.376 | 67.438 | 83.620 | 316 | 806 | B |
| Example 4 | 623 | 0.654 | 67.223 | 83.600 | 620 | 0.425 | 65.429 | 82.927 | 318 | 817 | B |
| Example 5 | 624 | 0.581 | 67.386 | 83.453 | 621 | 0.374 | 65.602 | 82.768 | 327 | 812 | B |
| Example 6 | 617 | 0.437 | 62.702 | 80.145 | 614 | 0.274 | 60.661 | 79.208 | 327 | 816 | A |
| Example 7 | 619 | 0.527 | 64.819 | 82.164 | 616 | 0.336 | 62.890 | 81.380 | 325 | 823 | A |
| Example 8 | 610 | 0.552 | 58.578 | 79.254 | 608 | 0.354 | 56.337 | 78.252 | 357 | 828 | B |
| Example 9 | 613 | 0.581 | 60.555 | 80.311 | 610 | 0.374 | 58.406 | 79.387 | 342 | 821 | B |
| Example 10 | 612 | 0.528 | 59.915 | 79.807 | 609 | 0.337 | 57.736 | 78.846 | 352 | 825 | B |
| Example 11 | 608 | 0.488 | 56.959 | 78.582 | 605 | 0.309 | 54.646 | 77.531 | 364 | 842 | B |
| Example 12 | 615 | 0.550 | 62.463 | 80.430 | 612 | 0.352 | 60.409 | 79.515 | 341 | 809 | B |
| Example 13 | 612 | 0.428 | 59.929 | 79.441 | 609 | 0.269 | 57.750 | 78.452 | 329 | 818 | B |
| Example 14 | 613 | 0.429 | 60.552 | 79.316 | 610 | 0.269 | 58.403 | 78.318 | 334 | 816 | B |
| Example 15 | 615 | 0.546 | 61.865 | 80.344 | 612 | 0.350 | 59.782 | 79.423 | 334 | 822 | B |
| Example 16 | 615 | 0.534 | 61.809 | 79.526 | 612 | 0.342 | 59.722 | 78.544 | 328 | 817 | B |
| Example 17 | 615 | 0.463 | 61.975 | 79.925 | 612 | 0.292 | 59.897 | 78.972 | 332 | 815 | A |
| Example 18 | 614 | 0.533 | 61.221 | 79.507 | 611 | 0.341 | 59.105 | 78.524 | 333 | 817 | A |
| Example 19 | 615 | 0.567 | 61.623 | 79.217 | 612 | 0.364 | 59.527 | 78.212 | 335 | 816 | A |
| Example 20 | 614 | 0.484 | 61.356 | 79.199 | 611 | 0.306 | 59.247 | 78.193 | 334 | 823 | A |
| Example 21 | 615 | 0.512 | 62.420 | 80.303 | 613 | 0.326 | 60.364 | 79.378 | 342 | 814 | A |
| Example 22 | 616 | 0.480 | 62.827 | 80.145 | 613 | 0.304 | 60.792 | 79.209 | 333 | 822 | A |
| Example 23 | 623 | 0.977 | 67.242 | 83.660 | 620 | 0.658 | 65.449 | 82.991 | | | B |
| Example 24 | 615 | 0.510 | 61.895 | 80.113 | 612 | 0.325 | 59.812 | 79.174 | 342 | 817 | A |
| Example 25 | 631 | 2.098 | 71.214 | 84.469 | 628 | 1.511 | 69.663 | 83.864 | 343 | 756 | A |
| Example 26 | 632 | 2.067 | 71.655 | 84.908 | 628 | 1.487 | 70.131 | 84.338 | 341 | 768 | A |
| Example 27 | 634 | 2.548 | 72.530 | 85.718 | 631 | 1.866 | 71.063 | 85.213 | 316 | 751 | B |
| Example 28 | 631 | 2.013 | 71.073 | 84.941 | 628 | 1.444 | 69.512 | 84.374 | 316 | 757 | B |
| Example 29 | 626 | 1.149 | 68.912 | 81.971 | 623 | 0.785 | 67.218 | 81.172 | | | B |
| Example 30 | 625 | 1.122 | 68.151 | 82.706 | 622 | 0.765 | 66.412 | 81.963 | | | B |
| Example 31 | 616 | 0.912 | 62.865 | 78.790 | 613 | 0.611 | 60.832 | 77.754 | 352 | 856 | B |
| Example 32 | 617 | 0.907 | 63.414 | 76.237 | 614 | 0.607 | 61.409 | 75.019 | 361 | 794 | B |
| Example 33 | 623 | 0.871 | 66.874 | 78.888 | 620 | 0.581 | 65.060 | 77.859 | 355 | 789 | A |
| Example 34 | 609 | 0.278 | 57.150 | 63.659 | 606 | 0.168 | 54.845 | 61.667 | 373 | 840 | B |
| Example 35 | 623 | 1.070 | 67.047 | 83.255 | 620 | 0.727 | 65.243 | 82.555 | | | B |
| Example 36 | 610 | 0.406 | 58.622 | 78.390 | 607 | 0.253 | 56.383 | 77.325 | 344 | 823 | B |
| Example 37 | 610 | 0.461 | 58.642 | 77.745 | 607 | 0.291 | 56.404 | 76.633 | 341 | 828 | B |
| Example 38 | 605 | 0.677 | 54.138 | 62.685 | 602 | 0.442 | 51.711 | 60.643 | 408 | 820 | S |
| Example 39 | 603 | 0.150 | 52.457 | 55.748 | 600 | 0.086 | 49.968 | 53.384 | 383 | 839 | B |
| Example 40 | 608 | 0.431 | 56.733 | 75.213 | 605 | 0.270 | 54.411 | 73.925 | 356 | 819 | B |
| Example 41 | 604 | 0.366 | 53.525 | 71.106 | 601 | 0.226 | 51.075 | 69.547 | 364 | 818 | B |
| Example 42 | 617 | 2.103 | 62.924 | 72.936 | 614 | 1.514 | 60.894 | 71.498 | 401 | 798 | S |
| Example 43 | 633 | 6.037 | 71.324 | 81.639 | 630 | 4.765 | 69.779 | 80.815 | 393 | 835 | S |
| Example 44 | 618 | 0.482 | 63.505 | 77.123 | 615 | 0.305 | 61.506 | 75.967 | 348 | 752 | A |
| Example 45 | 629 | 5.545 | 69.384 | 83.643 | 625 | 4.345 | 67.719 | 82.973 | 393 | 824 | S |
| Example 46 | 601 | 0.293 | 51.122 | 66.591 | 598 | 0.178 | 48.587 | 64.761 | 367 | 807 | B |
| Example 47 | 619 | 5.117 | 63.589 | 75.578 | 616 | 3.981 | 61.594 | 74.316 | | | S |
| Example 48 | 611 | 4.002 | 58.474 | 81.614 | 608 | 3.048 | 56.228 | 59.517 | 392 | 794 | S |
| Example 49 | 609 | 4.131 | 57.239 | 72.049 | 606 | 3.155 | 54.938 | 70.550 | 391 | 803 | S |
| Example 50 | 625 | 0.410 | 67.667 | 77.422 | 622 | 0.256 | 65.899 | 76.288 | 332 | 704 | B |
| Example 51 | 625 | 8.746 | 66.632 | 78.095 | 621 | 7.130 | 64.804 | 77.009 | | | B |
| Example 52 | 619 | 9.232 | 63.656 | 72.094 | 616 | 7.561 | 61.665 | 70.599 | 370 | 785 | B |
| Example 53 | 604 | 0.217 | 53.307 | 75.588 | 601 | 0.128 | 50.849 | 74.326 | 359 | 848 | B |
| Example 54 | 601 | 0.132 | 50.486 | 74.247 | 598 | 0.075 | 47.930 | 72.894 | 360 | 860 | B |
| Example 55 | 596 | 0.078 | 46.073 | 71.251 | 593 | 0.042 | 43.395 | 69.701 | 377 | 873 | B |
| Example 56 | 645 | 6.778 | 75.794 | 82.808 | 641 | 5.404 | 74.545 | 82.073 | 348 | 752 | S |
| Example 57 | 652 | 6.412 | 78.411 | 83.187 | 648 | 5.088 | 77.348 | 82.481 | 326 | 833 | B |
| Example 58 | 659 | 6.720 | 80.341 | 82.851 | 655 | 5.354 | 79.419 | 82.120 | 307 | 656 | B |
| Example 59 | 623 | 1.175 | 66.979 | 82.561 | 620 | 0.805 | 65.172 | 81.808 | | | C |
| Example 60 | 619 | 1.304 | 64.803 | 82.393 | 616 | 0.901 | 62.873 | 81.626 | 324 | 796 | D |
| Comp. Ex. X | 664 | 7.133 | 79.453 | 76.190 | 660 | 5.712 | 78.466 | 74.969 | 273 | 690 | E |
| Comp. Ex. A | 620 | 0.600 | 65.422 | 74.475 | 617 | 0.387 | 63.526 | 73.137 | | | E |
| Comp. Ex. B | 608 | 0.176 | 56.958 | 72.035 | 605 | 0.102 | 54.645 | 70.536 | | | E |
| Comp. Ex. C | 627 | 1.036 | 69.147 | 83.813 | 624 | 0.701 | 67.467 | 81.002 | 319 | 751 | E |
| Comp. Ex. D | 599 | 8.257 | 49.343 | 80.209 | 596 | 6.697 | 46.753 | 79.278 | 374 | 733 | S |
| Example 61 | 629 | 3.416 | 68.940 | 83.897 | 625 | 2.565 | 67.237 | 83.261 | 435 | | S |
| Example 62 | 630 | 5.013 | 69.031 | 84.727 | 628 | 3.892 | 67.333 | 84.156 | 440 | | S |
| Example 63 | 629 | 2.918 | 68.652 | 83.806 | 625 | 2.161 | 66.931 | 83.162 | 420 | | S |
| Example 64 | 617 | 1.608 | 62.531 | 81.992 | 614 | 1.131 | 60.471 | 81.208 | 440 | | S |
| Example 65 | 616 | 2.299 | 61.508 | 76.927 | 613 | 1.668 | 59.396 | 75.770 | 450 | | S |
| Example 66 | 619 | 2.600 | 63.233 | 80.640 | 615 | 1.906 | 61.209 | 79.753 | 456 | | S |

From the results shown in the tables above, it can be confirmed that the glasses of Examples 1 to 66 exhibited high transmittance of light in the visible region (the violet region to the red region), achieved excellent near-infrared cutting performance, and suppressed a reduction in weathering resistance.

With regard to weathering resistance, it can be confirmed from a comparison between Examples 1 to 58 and Example 59 that, relative to Example 59, in which the value calculated as "($3\times Al_2O_3+Y_2O_3+La_2O_3+Gd_2O_3+BaO/3+$ $(CaO+SrO)/6$)" was 0, Examples 1 to 58, in which this value was higher, exhibited better weathering resistance.

In a comparison between Example 59 and Example 60, Example 60, in which the value calculated as "($3\times Al_2O_3+Y_2O_3+La_2O_3+Gd_2O_3+BaO/3+$ $(CaO+SrO)/6$)" was 0 and the value of "$(Na_2O+K_2O+ZnO)/Li_2O$" was more than 1.4, which was higher than in Example 59, had a higher degree of deliquescence than Example 59, and had relatively poor weathering resistance.

In Comparative Example X, the value calculated as "($3\times Al_2O_3+Y_2O_3+La_2O_3+Gd_2O_3+BaO/3+$ $(CaO+SrO)/6$)" was more than 0, but the value of "$(Na_2O+K_2O+ZnO)/Li_2O$" was high, more than 11, and weathering resistance was low.

Comparative Example A, Comparative Example B and Comparative Example C are glasses comprising only three components, namely, $P_2O_5$, $Li_2O$ and CuO, and exhibit extremely low weathering resistance.

In Comparative Example D, the O/P ratio was more than 3.2, and the prescribed transmittance characteristics could not be achieved.

Among Examples in which the evaluation classification was S or A for the evaluation of weathering resistance by eye described above, haze values were determined for Examples 25, 33, 56 and 61 to 66 using a haze meter. Determined haze values are shown in Table 8.

Glasses 1 to 6, which are described in detail above, are provided by one aspect.

In one embodiment, Glasses 1 to 6 can have an $Al_2O_3$ content of less than 2.0 mol %.

In one embodiment, Glasses 1 to 6 can have a total content of $Al_2O_3$, $La_2O_3$, $Y_2O_3$ and $Gd_2O_3$ ($Al_2O_3+La_2O_3+Y_2O_3+Gd_2O_3$) of 0.1 mol % or more.

In one embodiment, Glasses 1 to 6 can have the following transmittance characteristics.

A glass for which the half value $\lambda_T50$, which is the wavelength at which the external transmittance including reflection losses becomes 50% at a wavelength of 550 nm or longer, is 633 nm has a thickness of 0.25 mm or less, and at this thickness, the external transmittance T600 including reflection losses at a wavelength of 600 nm is 50% or more, and the external transmittance T1200 including reflection losses at a wavelength of 1200 nm is 30% or less.

A glass for which the half value $\lambda_T50$, which is the wavelength at which the external transmittance including reflection losses becomes 50% at a wavelength of 550 nm or longer, is 633 nm has a thickness of 0.25 mm or less, and at this thickness, the external transmittance T600 including reflection losses at a wavelength of 600 nm is 50% or more, and the external transmittance T1200 including reflection losses at a wavelength of 1200 nm is β1% or less, β1 is a value calculated from Equation $B_1$ below:

$$\beta 1 = 64\times R - 170 \quad \text{(Equation B1)}$$

In equation $B_1$ above,

R is the ratio (O ion/P ion).

As transmittance characteristics calculated at a thickness of 0.11 mm, the half value $\lambda_T50$, which is the wavelength at

TABLE 8

| | Weathering resistance (evaluated by eye) | Haze value | O/P ratio | ($3\times Al_2O_3+Y_2O_3+La_2O_3+Gd_2O_3+BaO/3+(CaO+SrO)/6$) (mol %) | $(MgO+CaO+SrO+BaO+ZnO)/(Li_2O+Na_2O+K_2O)$ |
|---|---|---|---|---|---|
| Example25 | A | 43.2% | 2.93 | 8.55 | 0.73 |
| Example33 | A | 34.9% | 2.93 | 4.52 | 1.47 |
| Example56 | S | 0.0% | 3.01 | 12.93 | 0.22 |
| Example61 | S | 13.0% | 3.00 | 14.53 | 26.38 |
| Example62 | S | 8.0% | 3.02 | 14.93 | 26.64 |
| Example63 | S | 1.0% | 3.00 | 16.37 | 5.72 |
| Example64 | S | 10.0% | 3.02 | 13.42 | 21.45 |
| Example65 | S | 0.5% | 3.06 | 18.03 | 22.36 |
| Example66 | S | 0.4% | 3.04 | 15.11 | 23.00 |

As shown in Table 8, Examples 56 and 61 to 66, for which the evaluation classification was S for the evaluation of weathering resistance by eye, had haze values of 15% or less, which were lower in than Examples 25 and 33, for which the evaluation classification was A for the evaluation of weathering resistance by eye.

From the results above, it can be confirmed that in order to achieve both improved transmittance of light in the visible region and improved near-infrared cutting performance as well as achieve a haze value of 15% or less, the O/P ratio preferably falls within the range 3.00 to 3.15 and the value calculated as "($3\times Al_2O_3+Y_2O_3+La_2O_3+Gd_{203}+BaO/3+$ $(CaO+SrO)/6$)" (units: mol %) preferably falls within the range 10.0% to 40.0%.

Finally, the aspects described above will be summarized.

which the external transmittance including reflection losses becomes 50%, falls within the range 600 nm to 650 nm, the external transmittance T1200 including reflection losses at a wavelength of 1200 nm is 30% or less, and the external transmittance T400 including reflection losses at a wavelength of 400 nm is 70% or more.

As transmittance characteristics calculated at a thickness of 0.21 mm, the half value $\lambda_T50$, which is the wavelength at which the external transmittance including reflection losses becomes 50%, falls within the range 600 nm to 650 nm, the external transmittance T1200 including reflection losses at a wavelength of 1200 nm is 25% or less, and the external transmittance T400 including reflection losses at a wavelength of 400 nm is 70% or more.

A glass for which the half value $\lambda_T50$, which is the wavelength at which the external transmittance including reflection losses becomes 50% at a wavelength of 550 nm or longer, is 645 nm has a thickness of 0.25 mm or less, and at this thickness, the external transmittance T600 including reflection losses at a wavelength of 600 nm is 50% or more, and the external transmittance T1200 including reflection losses at a wavelength of 1200 nm is 30% or less.

A glass for which the half value $\lambda_7 50$, which is the wavelength at which the external transmittance including reflection losses becomes 50% at a wavelength of 550 nm or longer, is 645 nm has a thickness of 0.25 mm or less, and at this thickness, the external transmittance T600 including reflection losses at a wavelength of 600 nm is 50% or more, and the external transmittance T1200 including reflection losses at a wavelength of 1200 nm is $\beta 1$% or less, $\beta 1$ is a value calculated from equation B1 below:

$$\beta 1 = 64 \times R - 170 \quad \text{(Equation B1)}$$

In equation $B_1$ above,

R is the ratio (O ion/P ion).

Provided by one aspect is a near-infrared cut filter comprised of the above near-infrared absorbing glass.

The embodiments disclosed here are exemplifications in every sense and should not be considered to be limiting examples. The scope of the present invention is indicated by the claims, not by the explanations given above, and it is intended to cover all alternative forms falling within the spirit and scope of the invention.

For example, by subjecting the glass compositions exemplified above to compositional adjustments explained in the description, it is possible to obtain a near-infrared absorbing glass according to one aspect of the present invention.

In addition, it is of course possible to arbitrarily combine two or more matters that are described in the description as examples or preferred ranges.

The invention claimed is:

1. A near-infrared absorbing glass, which comprises at least four kinds of main cations selected from the group consisting of P ions, Li ions, Cu ions, Al ions, Ba ions, Sr ions, Ca ions, Zn ions, K ions, Na ions, La ions, Gd ions, and Y ions, comprises P ions, Li ions, and Cu ions as essential cations, and comprises at least O ions as anions, wherein a ratio of a content of O ions relative to a content of P ions (O ion/P ion) is 3.10 or less;

in a glass composition indicated by anion %, a content of O ions is 90.0 anion % or more; and in an oxide-based glass composition on a molar basis, a total content of oxides of the main cations is 90.0% or more, a content of $Al_2O_3$ is 8.0% or less, a content of MgO is 0%, a content of $V_2O_5$ is 0.1% or less, a ratio of a total content of $Na_2O$, $K_2O$, and ZnO relative to a content of $Li_2O$ (($Na_2O$+$K_2O$+ZnO)/$Li_2O$) is 2.4 or less, a total content of $B_2O_3$ and $SiO_2$ ($B_2O_3$+$SiO_2$) is 3.0% or less, and a content of CuO is $\alpha_1$% or more, where $\alpha_1$ is a value calculated by Equation 1 below, $$\alpha_1 = 70400 \times \exp(-2.855 \times R) \quad \text{(Equation 1)}$$

and in Equation 1 above,

R is the ratio (O ion/P ion), and as transmittance characteristics calculated at a thickness of 0.21 mm, an external transmittance T1200 including reflection losses at a wavelength of 1200 nm is 10% or less, and an external transmittance T400 including reflection losses at a wavelength of 400 nm is 70% or more.

2. A near-infrared absorbing glass, which comprises at least four kinds of main cations selected from the group consisting of P ions, Li ions, Cu ions, Al ions, Ba ions, Sr ions, Ca ions, Zn ions, K ions, Na ions, La ions, Gd ions, and Y ions, comprises P ions, Li ions, and Cu ions as essential cations, and comprises at least O ions as anions, wherein a ratio of a content of O ions relative to a content of P (O ion/P ion) ions is 3.10 or less;

in a glass composition indicated by anion %, a content of O ions is 90.0 anion % or more; and in an oxide-based glass composition on a molar basis, a total content of oxides of the main cations is 90.0% or more, a content of $Al_2O_3$ is 8.0% or less, a content of MgO is 0%, a content of $V_2O_5$ is 0.1% or less, a ratio of a total content of $Na_2O$, $K_2O$, and ZnO relative to a content of $Li_2O$ (($Na_2O$+$K_2O$+ZnO)/$Li_2O$) is 2.4 or less, a total content of $B_2O_3$ and $SiO_2$ ($B_2O_3$+$SiO_2$) is 3.0% or less, and which satisfies Equation 2 below:

$$C - 3200 \times \exp(-2.278 \times R) \geq 0 \quad \text{(Equation 2)}$$

and in Equation 2 above,

C is a content of CuO (units: mmol/cc) per molar volume of the glass, and

R is the ratio (O ion/P ion), and as transmittance characteristics calculated at a thickness of 0.21 mm, an external transmittance T1200 including reflection losses at a wavelength of 1200 nm is 10% or less, and an external transmittance T400 including reflection losses at a wavelength of 400 nm is 70% or more.

3. A near-infrared absorbing glass, which comprises at least four kinds of main cations selected from the group consisting of P ions, Li ions, Cu ions, Al ions, Ba ions, Sr ions, Ca ions, Zn ions, K ions, Na ions, La ions, Gd ions, Y ions, B ions and Si ions, comprises P ions, Li ions, and Cu ions as essential cations, and comprises at least O ions as anions, wherein a ratio of a content of O ions relative to a content of P ions (O ion/P ion) is 3.10 or less;

in a glass composition indicated by anion %, a content of O ions is 90.0 anion % or more; and in an oxide-based glass composition on a molar basis, a total content of oxides of the main cations is 90.0% or more, a content of $Al_2O_3$ is 8.0% or less, a content of MgO is 0%, a content of $V_2O_5$ is 0.1% or less, a ratio of a total content of $Na_2O$, $K_2O$, and ZnO relative to a content of $Li_2O$ (($Na_2O$+$K_2O$+ZnO)/$Li_2O$) is 2.4 or less, $A_1$, which is calculated by Equation 3 below, is 2500 or more, $$A_1 = \{O(P) - O(others)\} \times Cu \quad \text{(Equation 3)}$$

and in Equation 3 above,

O(P) denotes an amount of oxygen that constitutes an oxide of P ions in the oxide-based glass composition, O(others) denotes an amount of oxygen determined by subtracting the value of O(P) from an amount of oxygen that constitutes oxides of the main cations in the oxide-based glass composition, and Cu denotes a content of CuO on a molar basis in the oxide-based glass composition, and as transmittance characteristics calculated at a thickness of 0.21 mm, an external transmittance T1200 including reflection losses at a wavelength of 1200 nm is 10% or less, and an external transmittance T400 including reflection losses at a wavelength of 400 nm is 70% or more.

4. A near-infrared absorbing glass, which comprises at least four kinds of main cations selected from the group consisting of P ions, Li ions, Cu ions, Al ions, Ba ions, Sr ions, Ca ions, Zn ions, K ions, Na ions, La ions, Gd ions, Y ions, B ions and Si ions, comprises P ions, Li ions, and Cu ions as essential cations, and comprises at least O ions as anions, wherein a ratio of a content of O ions relative to a content of P ions (O ion/P ion) is 3.10 or less;

in a glass composition indicated by anion %, a content of O ions is 90.0 anion % or more; and in an oxide-based glass composition on a molar basis, a total content of oxides of the main cations is 90.0% or more, a content of $Al_2O_3$ is 8.0% or less, a content of MgO is 0%, a content of $V_2O_5$ is 0.1% or less, a ratio of a total content of $Na_2O$, $K_2O$, and ZnO relative to a content of $Li_2O$ (($Na_2O$+$K_2O$+ZnO)/$Li_2O$) is 2.4 or less, $A_2$, which is calculated by Equation 4 below, is 700 or more, $$A_2 = \{O(P) - O(others)\} \times C \quad \text{(Equation 4)}$$

and in Equation 4 above,

C is a content of CuO (units: mmol/cc) per molar volume of the glass,

O(P) denotes an amount of oxygen that constitutes an oxide of P ions in the oxide-based glass composition, and O(others) denotes an amount of oxygen determined by subtracting the value of O(P) from an amount of oxygen that constitutes oxides of the main cations in the oxide-based glass composition, and as transmittance characteristics calculated at a thickness of 0.21 mm, an external transmittance T1200 including reflection losses at a wavelength of 1200 nm is 10% or less, and an external transmittance T400 including reflection losses at a wavelength of 400 nm is 70% or more.

5. The near-infrared absorbing glass according to claim 1, wherein a total content of $Na_2O$ and $K_2O$ is less than 15.0 mol %.

6. The near-infrared absorbing glass according to claim 1, wherein a total content of $Al_2O_3$, $La_2O_3$, $Y_2O_3$ and $Gd_2O_3$ ($Al_2O_3$+$La_2O_3$+$Y_2O_3$+$Gd_2O_3$) is 0.1 mol % or more.

7. The near-infrared absorbing glass according to claim 1, wherein a glass for which a half value $\lambda_T50$, which is a wavelength at which an external transmittance including reflection losses becomes 50% at a wavelength of 550 nm or longer, is 633 nm has a thickness of 0.25 mm or less, and at the thickness, an external transmittance T600 including reflection losses at a wavelength of 600 nm is 50% or more, and an external transmittance T1200 including reflection losses at a wavelength of 1200 nm is 30% or less.

8. The near-infrared absorbing glass according to claim 1, wherein a glass for which a half value $\lambda_T50$, which is a wavelength at which an external transmittance including reflection losses becomes 50% at a wavelength of 550 nm or longer, is 633 nm has a thickness of 0.25 mm or less, and at the thickness, an external transmittance T600 including reflection losses at a wavelength of 600 nm is 50% or more, and an external transmittance T1200 including reflection losses at a wavelength of 1200 nm is β1% or less, β1 is a value calculated from Equation B1 below:

$$\beta 1 = 64 \times R - 170 \quad \text{(Equation B1)}$$

and in equation B1 above,

R is the ratio (O ion/P ion).

9. The near-infrared absorbing glass according to claim 1, wherein as transmittance characteristics calculated at a thickness of 0.11 mm, an external transmittance T1200 including reflection losses at a wavelength of 1200 nm is 30% or less, and an external transmittance T400 including reflection losses at a wavelength of 400 nm is 70% or more.

10. The near-infrared absorbing glass according to claim 1, wherein as transmittance characteristics calculated at a thickness of 0.21 mm, a half value $\lambda_T50$, which is a wavelength at which an external transmittance including reflection losses becomes 50%, falls within a range 600 nm to 650 nm.

11. The near-infrared absorbing glass according to claim 1, wherein a glass for which a half value $\lambda_T50$, which is a wavelength at which an external transmittance including reflection losses becomes 50% at a wavelength of 550 nm or longer, is 645 nm has a thickness of 0.25 mm or less, and at the thickness, an external transmittance T600 including reflection losses at a wavelength of 600 nm is 50% or more, and an external transmittance T1200 including reflection losses at a wavelength of 1200 nm is 30% or less.

12. The near-infrared absorbing glass according to claim 1, wherein a glass for which a half value $\lambda_T 50$, which is a wavelength at which an external transmittance including reflection losses becomes 50% at a wavelength of 550 nm or longer, is 645 nm has a thickness of 0.25 mm or less, and at the thickness, an external transmittance T600 including reflection losses at a wavelength of 600 nm is 50% or more, and an external transmittance T1200 including reflection losses at a wavelength of 1200 nm is β1% or less,

β1 is a value calculated from equation B1 below:

$$\beta 1 = 64 \times R - 170 \quad \text{(Equation B1)}$$

and in equation B1 above, R is the ratio (O ion/P ion).

13. A near-infrared cut filter, which is comprised of the near-infrared absorbing glass according to claim 1.

14. A near-infrared cut filter, which is comprised of the near-infrared absorbing glass according to claim 2.

15. A near-infrared cut filter, which is comprised of the near-infrared absorbing glass according to claim 3.

16. A near-infrared cut filter, which is comprised of the near-infrared absorbing glass according to claim 4.

* * * * *